United States Patent
Lavallo et al.

(10) Patent No.: US 11,189,862 B2
(45) Date of Patent: Nov. 30, 2021

(54) HIGH VOLTAGE 10, 11, AND 12-VERTEX CARBORANE AND BORANE ELECTROLYTES, THEIR USE IN RECHARGABLE BATTERIES, AND PROCESSES FOR THEIR PREPARATION

(71) Applicant: THE REGENTS OF THE UNIVERSITY OF CALIFORNIA, Oakland, CA (US)

(72) Inventors: Vincent Lavallo, Riverside, CA (US); Juchen Guo, Anaheim, CA (US); Scott G. McArthur, Riverside, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 16/866,443

(22) Filed: May 4, 2020

(65) Prior Publication Data
US 2020/0313242 A1    Oct. 1, 2020

Related U.S. Application Data

(60) Division of application No. 15/887,850, filed on Feb. 2, 2018, now abandoned, which is a
(Continued)

(51) Int. Cl.
*H01M 10/26* (2006.01)
*B01J 31/22* (2006.01)
(Continued)

(52) U.S. Cl.
CPC ......... *H01M 10/26* (2013.01); *B01J 31/2273* (2013.01); *C07F 5/05* (2013.01);
(Continued)

(58) Field of Classification Search
CPC .......... H01M 10/054; H01M 10/0568; H01M 10/26; C07F 5/05
(Continued)

(56) References Cited

U.S. PATENT DOCUMENTS 5,529,860 A   6/1996   Skotheim et al.
5,686,201 A   11/1997  Chu
(Continued)

OTHER PUBLICATIONS

Carter et al. Boron Cluster as Highly Stable Magnesium-Battery Electrolytes. Angew. Chem. Intl. Ed. vol. 53, 2014, pp. 3173-3177. Retrieved from <URL: https://onlinelibrary.wiley.com/doi/pdf/10.1002/ange.201310317> (Year: 2014).*
(Continued)

*Primary Examiner* — James M Erwin
(74) *Attorney, Agent, or Firm* — Mintz, Levin, Cohn, Ferris, Glovsky and Popeo, P.C.

(57) ABSTRACT

The present disclosure provides electrolytes for an electrochemical device. In some embodiments, these electrolytes are Mg salts comprising 10-vertex or 12-vertex carborane anions. The present disclosure also provides processes for preparing electrolytes for an electrochemical device. In some embodiments, the process comprises reduction of a reactive cation complexed with a 10-vertex or 12-vertex carborane or 12-vertex borate anion to form metal carborane or borate electrolytes. In some embodiments, the process comprises comproportionating a $Mg^{+2}$ 10-vertex or 12-vertex carborane salt to form a $Mg^{+1}$ electrolyte comprising a 10-vertex or 12-vertex carborane. The present disclosure further provides electrochemical devices comprising the electrolytes disclosed herein. In some embodiments, the electrochemical device comprises an electrolyte that is stable at an electrical potential greater than 4 V vs $Mg^{0/+2}$. Also provided herein are heterocyctes bearing the 10, 11,
(Continued)

and 12 vertex carborane anions for application as catalyst and battery electrolyte components. The methods of making are also disclosed.

15 Claims, 8 Drawing Sheets

Related U.S. Application Data continuation-in-part of application No. PCT/US2016/045330, filed on Aug. 3, 2016.

(60) Provisional application No. 62/201,026, filed on Aug. 4, 2015, provisional application No. 62/478,926, filed on Mar. 30, 2017.

(51) Int. Cl.
| | |
|---|---|
| *C07F 5/05* | (2006.01) |
| *H01M 10/054* | (2010.01) |
| *H01M 10/0568* | (2010.01) |
| *H01M 10/0569* | (2010.01) |
| *H01M 10/052* | (2010.01) |

(52) U.S. Cl.
CPC ..... *H01M 10/054* (2013.01); *H01M 10/0568* (2013.01); *H01M 10/0569* (2013.01); *B01J 2231/54* (2013.01); *B01J 2231/641* (2013.01); *H01M 10/052* (2013.01); *H01M 2300/0022* (2013.01); *H01M 2300/0025* (2013.01); *H01M 2300/0082* (2013.01)

(58) Field of Classification Search
USPC .......................................................... 429/324
See application file for complete search history.

(56) References Cited

U.S. PATENT DOCUMENTS

| | | | |
|---|---|---|---|
| 5,690,702 A | 11/1997 | Skotheim et al. | |
| 5,731,470 A | 3/1998 | Michl et al. | |
| 8,703,329 B2* | 4/2014 | Barbarich | H01M 10/0567 |
| | | | 429/188 |
| 9,455,473 B1* | 9/2016 | Mohtadi | H01M 10/054 |
| 2007/0048605 A1 | 3/2007 | Pez et al. | |
| 2014/0349178 A1 | 11/2014 | Mohtadi et al. | |

OTHER PUBLICATIONS

Tutusaus et al. An Efficient Holgen-Free Electrolyte for Use in Rechargeable Magnesium Batteries. Agnew. Chem. Intl. Ed. vol. 54, 2015, pp. 7900-7904. Retrieved from <URL: https://onlinelibrary.wiley.com/doi/epdf/10.1002/anie.201412202> (Year: 2015).*
Ionica-Bousquet et al., Polyflourinated Born Cluster Based Salts: A new Electrolyte for Application in Nonaqueous Asymmetric AC/$Li_4Ti_5O_{12}$ Supercapcitators, Journal of Power Sources, Feb. 2011, pp. 1626-1631, 196(3), Abstract.
International Search Report for PCT/US2016/045330 dated Oct. 17, 2016, 3 pages.
Tutusaus et al., Supporting Information An Efficient Halogen-Free Electrolyte for Use in Rechargeable Magnesium Batteries**, Angewandte Chemie, 2015, 41 pages.
Written Opinion of the International Searching Authority for PCT/US2016/045330 dated Oct. 17, 2016, 5 pages.

* cited by examiner

HIGH VOLTAGE 10, 11, AND 12-VERTEX CARBORANE AND BORANE ELECTROLYTES, THEIR USE IN RECHARGABLE BATTERIES, AND PROCESSES FOR THEIR PREPARATION

CROSS-REFERENCES TO RELATED APPLICATIONS

This application is a divisional of U.S. application Ser. No. 15/887,850, filed Feb. 2, 2018, which is a continuation-in-part of PCT Application Serial No. PCT/US2016/045330 filed on Aug. 3, 2016 and published as WO/2017/024023, which claims the benefit of priority under 35 U.S.C. § 119(e) to U.S. Provisional Application Ser. No. 62/201,026 filed Aug. 4, 2015; this application further claims the benefit of priority under 35 U.S.C. § 119(e) to U.S. Provisional Application Ser. No. 62/478,926 filed Mar. 30, 2017, the disclosure of each application is incorporated herein by reference in their entirety.

STATEMENT AS TO RIGHTS TO INVENTIONS MADE UNDER FEDERALLY SPONSORED RESEARCH AND DEVELOPMENT

This invention was made with government support under DMR-1508537 awarded by the National Science Foundation. The government has certain rights in the invention.

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

Over the last decade there has been an explosion of technological advances in rechargeable portable devices and electric vehicles. However, innovations that reduce the cost, improve the sustainability, and increase the storage capacity offered by state-of-the-art Li-ion technology have not kept pace with this revolution.

Li-ion batteries have disadvantages. Lithium is expensive, not earth abundant (Li+, 0.0017% of the earth's crust), very pyrophoric, and prone to hazardous dendrite formation.

To avoid dendrite formation intercalation type anodes (e.g. graphite) must typically be used in Li-ion batteries, significantly reducing the possible amount of energy stored both gravimetrically and volumetrically.

Mg-based batteries are an attractive alternative to Li-ion systems because Mg is less expensive, much more abundant (4% of the earth's crust), more tolerant of air, and does not form dendrites. The absence of dendrite formation during Mg deposition allows the utilization of pure Mg anodes, which drastically increases the energy storage capacity of the battery. In addition, since Mg is a small divalent atom it can store twice the amount of charge compared to Li.

In contrast to Li, however, Mg has a unique chemistry that limits suitable solvents to aprotic and relatively non-polar ethers (e.g. dimethoxyethane (DME), and higher glymes). Mg salts that are analogous to Li electrolytes, such as magnesium $[Mg][PF_6]_2$, are not suitable solutes for Mg-ion batteries because the anions of these salts degrade during the required electrochemical processes and form a solid organic/inorganic film covering the Mg anode. Due to its divalency, Mg-ions cannot penetrate this solid layer, hence reversible Mg deposition and stripping cannot be achieved utilizing these common salts.

Therefore, in order to achieve efficient Mg deposition and stripping, Mg electrolytes that contain counter anions that are inert toward oxidation and reduction must be implemented. In addition, recent studies have shown that the presence of halide ions leads to the corrosion of non-noble metals (e.g. aluminum, nickel and stainless steel), which limits charging in a coin cell battery configuration to under 2.5 V, since such metals are utilized in casing and current collector materials. Table 1 summarizes key electrolytes that have been investigated for applications in rechargeable Mg batteries. Importantly, nearly all of these electrolytes contain corrosive chloride ions.

TABLE 1

| Electrolytes | Entry | Composition | $E_{ox}$ on Pt vs $Mg^{0/+2}$ | Comments |
|---|---|---|---|---|
| Organo Borates | 1) | $Mg(BPh_2Bu_2)_2$ | 1.9 | |
| | 2) | 2:1 $PhMgCl/Me_3B$ | 3.5 | $E_{ox}$ = 2.2 V on SS |
| | 3) | $(Mg_2(Cl)_3)[B(C_6F_5)_3Ph]$ | 3.7 | $E_{ox}$ = 2.2 V on SS |
| Grignard/ | 4) | DCC = 1:2 $Bu_2Mg:EtAlCl_2$ | 2.2 | |
| Halo-Aluminate | 5) | APC = 2:1 $PhMgCl:AlCl_3$ | 3.2 | $E_{ox}$ = 2.2 V on SS |
| Mg Alkoxides | 6) | 2:1 $AlkylOMgCl:AlCl_3$ | 2.6 | |
| | 7) | 2:1 $(C_6F_5)OMgCl:AlCl_3$ | 2.9 | less air sensitive |
| | 8) | 6:1 $Me_3SiOMgCl:AlCl_3$ | 2.5 | |
| Mg Amides | 9) | 3:1 $(HMDS)MgCl:AlCl_3$ | 3.2 | $E_{ox}$ = 2.2 V on SS |
| | | 2:1 $Mg(HMDS)_2:AlCl_3$ | 3.5 | $E_{ox}$ = 2.6 V on SS weak nucleophile |
| Borohydrides | 10) | $Mg(BH_4)_2$ | 1.7 | $E_{ox}$ = 2.2 V on SS |
| | 11) | $MgB_{12}H_{12}$ | | insoluble in ethers |
| Dicarbaborane Grignard | 12) | $1\text{-}(1,7\text{-}C_2B_{10}H_{11})$ MgCl | 3.3 | $E_{ox}$ > 3.0 V on SS, Al |
| Carborane Anion 12-vertex | 13) | $Mg(HCB_{11}H_{11})_2$ | 3.3 | $E_{ox}$ > 3.8 V on Al only soluable in triglyme and tetraglyme |

Borohydrides as Electrolytes:

Researchers have recently reported some promising new systems based on borohydrides. They first reported a simple halide free electrolyte, magnesium borohydride (Mg(BH$_4$)$_2$), that shows excellent Mg deposition-stripping behavior but lacks significant oxidative stability (1.7 V vs. Mg$^{0/+2}$ on Pt working electrode) (TABLE 1, entry 10). More recently they reported their investigation into the use of a magnesium salt of the icosahedral B$_{12}$H$_{12}$$^{2-}$ dianion 1/Mg$^{+2}$ (FIG. 1). This cluster anion is a poor nucleophile and has an oxidative stability above 4.0 V versus Mg$^{0/+2}$. Thus, it should be ideally suited for a component of a Mg battery electrolyte.[4c] Unfortunately, 1/Mg$^{+2}$ is completely insoluble in all ethereal solvents (TABLE 1, entry 11) and thus, this derivative is not useful as a soluble solution-based electrolyte.

Grignard Reagents of Dicarbaboranes (H$_2$C$_2$B$_{10}$H$_{10}$) as Electrolytes:

Neutral icosahedral dicarbaboranes (formula=H$_2$C$_2$B$_{10}$H$_{10}$) are isoelectronic with the B$_{12}$H$_{12}$$^{-2}$ dianion, 1/Mg$^{+2}$. Replacement of 2 boron atoms of B$_{12}$H$_{12}$$^{-2}$ with two carbon atoms renders the cluster (H$_2$C$_2$B$_{10}$H$_{10}$) neutral, since carbon has four valence electrons compared to boron's three. Researchers have reported that treatment of the dicarbaborane with methyl magnesium chloride produced a complex ion pair, comprised of an anionic dicarbaborane Grignard [Mg$_2$Cl$_3$$^{+1}$][MgCl(HC$_2$B$_{10}$H$_{10}$)$_2$$^{-1}$]. This electrolyte formulation displays excellent magnesium deposition-stripping behavior and twice the oxidative stability of the simple borohydride Mg(BH$_4$)$_2$ (TABLE 1, entry 12). However, this formulation has high chloride content and is nucleophilic.

Mg Salt of the 12-Vertex Carborane Anion (HCB$_{11}$H$_{11}$$^{-1}$):

Another carborane that is isoelectronic with 1 is the icosahedral monocarbaborane 2 (FIG. 2). In this case, only a single boron atom has been replaced by carbon, hence the molecule bears a single negative charge. For coulombic reasons this anion has an inherently greater solubility compared to dianionic 1. The charge of carborane anion 2 is delocalized over the 12 cage atoms, hence this cluster is a very poor nucleophile and is extraordinarily stable. The measured oxidation potential of 2 is +2.35 V versus Fe$^{0/+}$ (approx. +5.36 V vs. Mg$^{0/+2}$) in SO$_2$. Recently researchers reported the preparation of halide free 2/Mg$^{+2}$ via salt metathesis of MgBr$_2$ with non-commercially available 2/Ag$^{+1}$ in THF (FIG. 3). From an economic perspective this strategy is not practical since two equivalents of precious metal salt byproduct (AgBr) are produced per molar equivalent of Mg'. Moreover, the crude 2/Mg$^{+2}$ product is not sufficiently pure for electrochemistry without an unusual purification procedure. When produced in THF 2/Mg$^{+2}$ precipitates as a completely insoluble white powder, which is only appreciably soluble in triglyme and tetraglyme. In these solvents this electrolyte shows electrochemical stability up to the limit of the solvent (3.8 V vs. Mg$^{0/+2}$ on Al; (TABLE 1, entry 13) but only moderate conductivity. The modest conductivity of 2/Mg$^{+2}$, is likely due to the strong coulombic attraction between the dipositively charged Mg$^{+2}$ ion and the carborane anions. This electrolyte is non-corrosive and is a suitable electrolyte for Mg batteries containing a standard Mo$_6$S$_8$ cathode.

10-Vertex Carborane Anions:

A distinct carborane anion is the 10-vertex species HCB$_9$H$_9$$^{-1}$ 3 (FIG. 4). Although the electrochemical properties of this anion have not thoroughly been investigated there is evidence in the literature that it has chemical inertness and weak nucleophilicity comparable to that of 12-vertex cluster 2.

From the foregoing, it can be seen that there is a need in the art for a general and economical process for preparing new and more robust electrolytes for Mg batteries as well as processes for their preparation. The present disclosure provides, inter alia, electrolytes for use in electrochemical devices, such as Mg batteries as well as processes for their preparation.

BRIEF SUMMARY OF THE INVENTION

In one aspect, the present disclosure provides an electrolyte for an electrochemical device comprising: a magnesium salt selected from formulas (I), (II), (III), (VII), and (VIII):

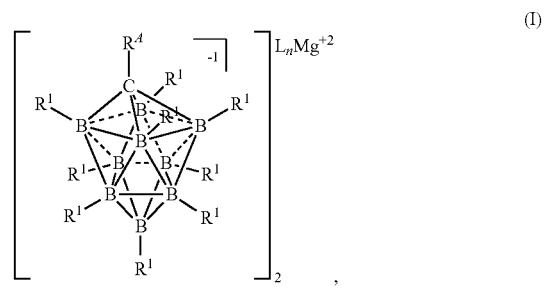

(I)

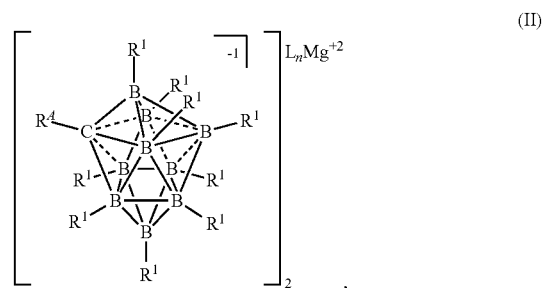

(II)

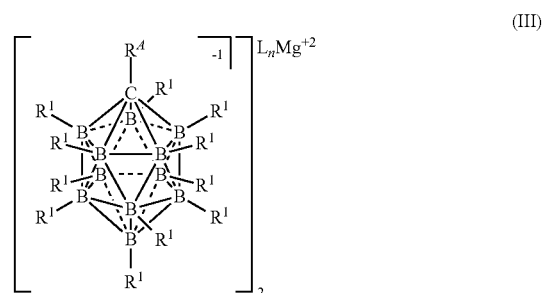

(III)

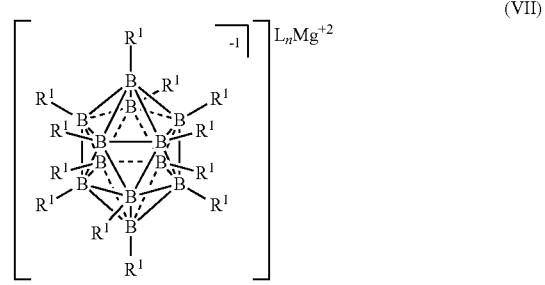

(VII)

-continued

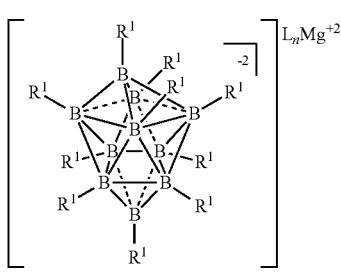
(VIII)

wherein
each L is an ethereal solvent or other L-type ligands
n is an integer from 0 to 6;
$R^A$ is selected from the group consisting of H, $C_{1-30}$ alkyl, aryl, $OR^a$, $SR^a$, $NR^a_2$, F, Cl, Br, I, $C_{1-30}$ haloalkyl, and perfluoroaryl;
each $R^1$ is independently selected from the group consisting of H, $C_{1-30}$ alkyl, aryl, $OR^a$, $SR^a$, $NR^a_2$, F, Cl, Br, I, $C_{1-30}$ haloalkyl, and perfluoroaryl; and
each $R^a$ is independently selected from the group consisting of H, $C_{1-30}$ alkyl, aryl, and silyl;
provided that when the magnesium salt has formula (III), at least one of $R^A$ and $R^1$ is other than H, and that when the magnesium salt has formula VII at least one $R^1$ is other than H.

In another aspect, the present disclosure provides an electrolyte for an electrochemical device comprising: a magnesium salt selected from formulas (IV), (V), and (VI):

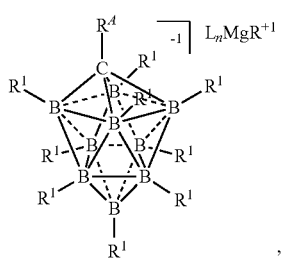
(IV)

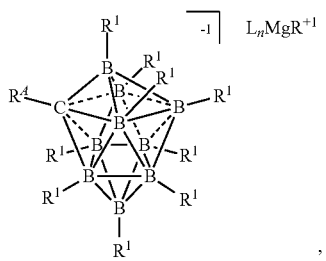
(V)

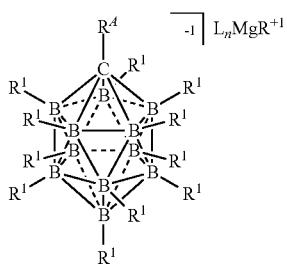
(VI)

wherein
each L is an ethereal solvent or other L-type ligands
n is an integer from 0 to 6;
$R^A$ is selected from the group consisting of H, $C_{1-30}$ alkyl, aryl, $OR^a$, $SR^a$, $NR^a_2$, F, Cl, Br, I, $C_{1-30}$ haloalkyl, perfluoroaryl, or;
each $R^1$ is independently selected from the group consisting of H, $C_{1-30}$ alkyl, aryl, $OR^a$, $SR^a$, $NR^a_2$, F, Cl, Br, I, $C_{1-30}$haloalkyl, and perfluoroaryl;
each $R^a$ is independently selected from the group consisting of H, $C_{1-30}$ alkyl, aryl, and silyl; and
each R is independently selected from the group consisting of $C_{1-30}$alkyl and aryl.

In another aspect, the present disclosure provides a process for preparing an electrolyte for an electrochemical device comprising the step of reacting active cations with a metal, metal hydride, or metal alkyl according to formulas i or ii $$xi([Cation]_y[Anion^{-y}]) \xrightarrow[-x\ e-]{M} [L_nM^{+x}]_y[Anion^{-y}]_{xi} \quad (i)$$

$$ci([Cation]_b[Anion^{-b}]) \xrightarrow{L_nM^{+c}Z_c} [L_nM^{+c}]_b[Anion^{-b}]_{ci} \quad (ii)$$

in a solvent, wherein,
M is a metal selected from the group consisting of Mg, Al, Ca, Na, and Li;
each Z is independently selected from the group consisting of H, $C_{1-8}$alkyl;
x and xi are equal integers from 1 to 3;
c and ci are equal integers from 1 to 3;
y and b are 1 or 2;
the solvent is L;
the cation is selected from the group consisting of $NH_4^+$, $H_3NR^{c+}$, $H_2NR^c_2{}^+$, $HNR^c_3{}^+$, $H^+$, and $HOR^c_2{}^+$.
each L is independently selected from $OR^b_2$, THF, hexane, dimethoxyethane, diglyme, triyglyme, tetraglyme, pentaglyme, and mixtures thereof;
n is an integer from 0 to 6;
the anion is selected from the group consisting of formulas Ia, IIa, IIIa, VIIa, and VIIIa

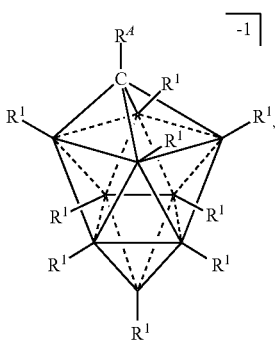
(Ia)

-continued (IIa)

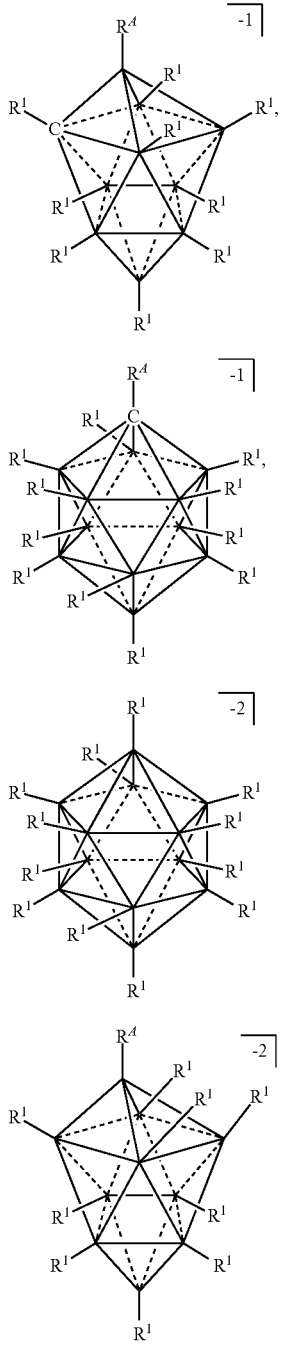

(IIIa)

(VIIa)

(VIIIa)

wherein,
$R^A$ is selected from the group consisting of H, $C_{1-30}$ alkyl, aryl, $OR^1$, $NR^a_2$, F, Cl, Br, I, $C_{1-30}$ haloalkyl, and perfluoroaryl;
each $R^1$ is independently selected from the group consisting of H, $C_{1-8}$alkyl, aryl, $OR^a$, $NR^a_2$, F, Cl, Br, I, $C_{1-30}$haloalkyl, and perfluoroaryl;
each $R^a$ is independently selected from the group consisting of H, $C_{1-30}$alkyl, aryl, and silyl,
each $R^b$ is $C_{1-8}$alkyl; and
each $R^c$ is independently selected from the group consisting of $C_{1-8}$alkyl and aryl;

provided that when M is Mg or Ca and the anion is formula VIIa or VIIIa, x or c is 2 and xi or ci is 1.

In yet another aspect, the present disclosure provides a process for preparing an electrolyte for an electrochemical device comprising the step of comproportionating an Mg salt selected from formulas I, II, or III (I)

(II)

(III)

and a magnesium reagent of the general formula $MgR_2$ according to formula (iii)
$$[L_nMg^{+2}][Anion^{-1}]_2 \xrightarrow{MgR_2} 2\,[L_nMgR^{+1}][Anion^{-1}]$$

in a solvent wherein,
the solvent is L;
each L is independently selected from $OR^b_2$, THF, dimethoxyethane, diglyme, triyglyme, tetraglyme, pentaglyme, and mixtures thereof;
n is an integer from 0 to 6;
the anion is a carborane anion as shown in formulas I, II, and III;
each R is independently selected from $C_{1-30}$ alkyl and aryl;
$R^A$ is selected from the group consisting of H, $C_{1-30}$ alkyl, aryl, $OR^a$, $SR^a$, $NR^a_2$, F, Cl, Br, I, $C_{1-30}$haloalkyl, and perfluoroaryl;
each $R^1$ is independently selected from H, $C_{1-30}$alkyl, aryl, $OR^a$, $SR^a$, $NR^a_2$, F, Cl, Br, I, $C_{1-30}$ haloalkyl, and perfluoroaryl each $R^a$ is independently selected from the group consisting of H, $C_{1-8}$alkyl, aryl, and silyl; and each $R^b$ is $C_{1-8}$alkyl.

In still another aspect, the present disclosure provides a catalyst or battery component comprising a compound or complex selected from formulas (XIV), (XIVa), and (XIVb)

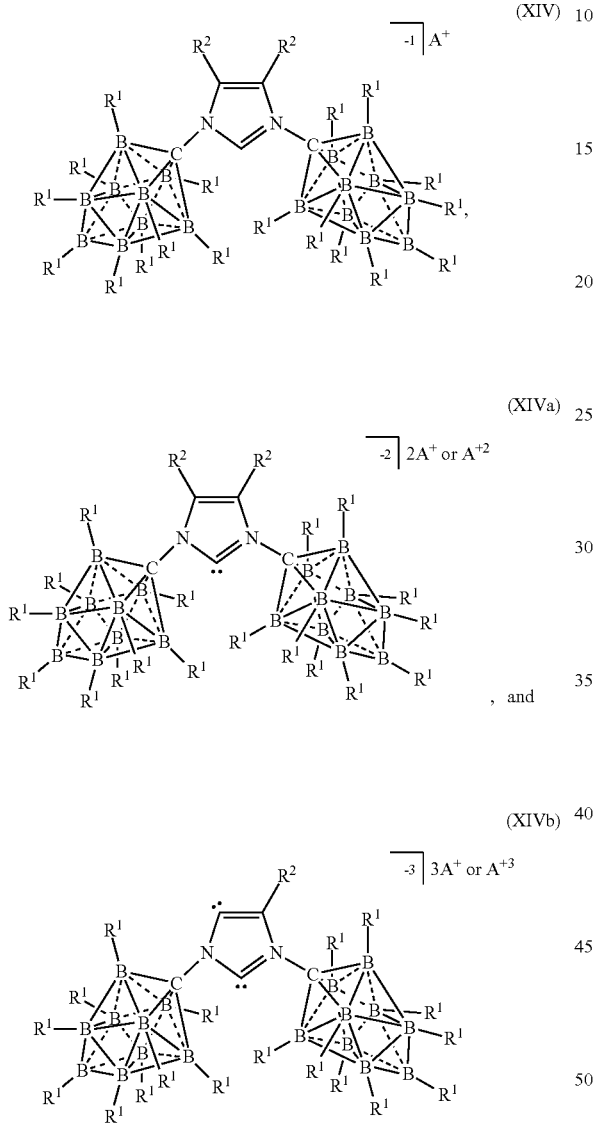

wherein

A is a cation;

each $R^1$ is independently selected from the group consisting of H, $C_{1-30}$ alkyl, aryl, $OR^a$, $SR^a$, $NR^a{}_2$, F, Cl, Br, I, $C_{1-30}$haloalkyl, and perfluoroaryl;

each $R^2$ is H, F, Cl, Br, I, $C_{1-30}$ alkyl, $C_{1-30}$ haloalkyl, $C_{1-30}$ alkoxy, $OR^a$, and $SR^a$; and each $R^a$ is independently selected from the group consisting of H, $C_{1-30}$alkyl, aryl, and silyl.

In some aspects, the present disclosure provides a catalyst or battery component comprising a compound or complex selected from the formulas (XV), (XVa), (XVb), and (XVc)

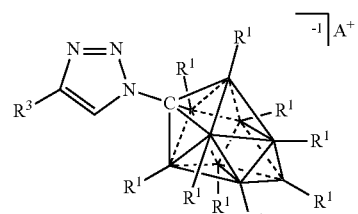

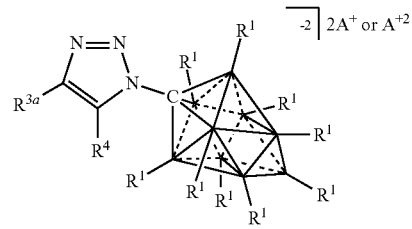

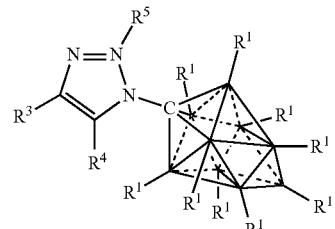

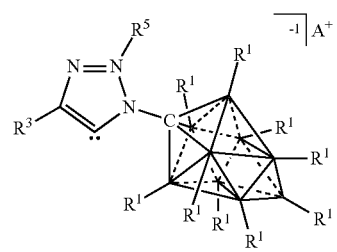

wherein

A is a cation;

each $R^1$ is independently selected from the group consisting of H, $C_{1-30}$ alkyl, aryl, $OR^a$, $SR^a$, $NR^a{}_2$, F, Cl, Br, I, $C_{1-30}$haloalkyl, and perfluoroaryl; and $R^3$ is an optionally substituted aryl or an optionally substituted heteroaryl;

$R^{3a}$ is a twelve vertex carborane anion of Formula IIIa or a ten vertex carborane anion of Formula Ia or IIa

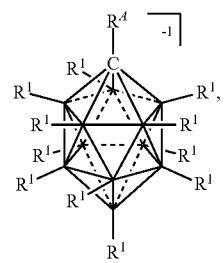

(Ia)

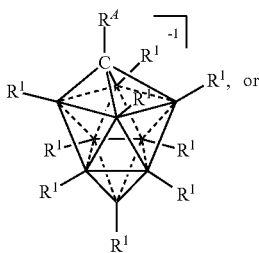

(IIa)

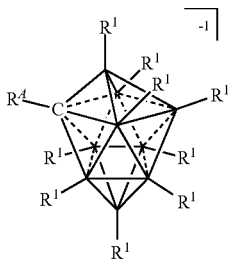

wherein each $R^1$ group of the twelve vertex carboarane anion or ten vertex carborane anion are selected from the $R^1$ groups shown above, $R^A$ is selected from the group consisting of H, $C_{1-30}$alkyl, aryl, $OR^a$, $SR^a$, $NR^a{}_2$, F, Cl, Br, I, $C_{1-30}$haloalkyl, and perfluoroaryl, and any $R^1$ or $R^A$ can serve as the point of attachment to the remainder of the compound;

$R^4$ is H, F, Cl, Br, I, $C_{1-30}$ alkyl, $C_{1-30}$ haloalkyl, $C_{1-30}$ alkoxy, $OR^a$, and $SR^a$;

$R^5$ is aryl, perflouoroaryl, $C_{1-30}$ alkyl or $C_{1-30}$ haloalkyl; and each $R^a$ is independently selected from the group consisting of H, $C_{1-30}$ alkyl, aryl, and silyl.

In some aspects, the present disclosure provides a catalyst or battery component comprising a compound or complex selected from the formulas (XVI), (XVII), (XVIIa), (XVIIb), and (XVIIc)

(XVI)

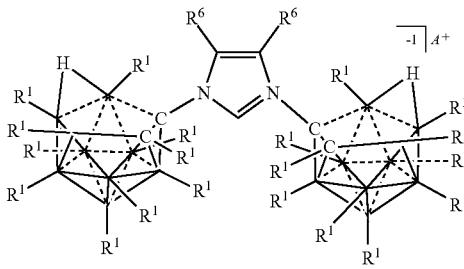

(XVII)

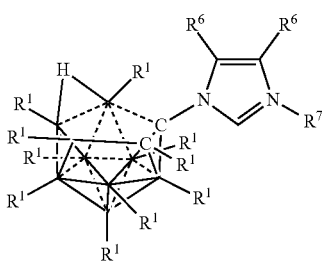

(XVIIa)

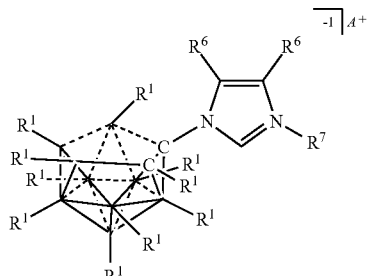

(XVIIb)

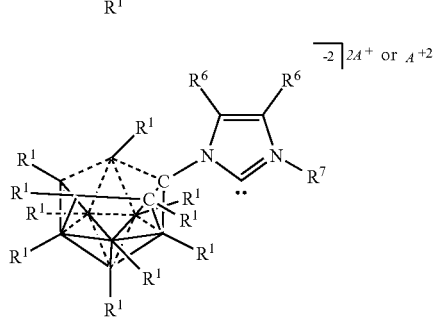

(XVIIc)

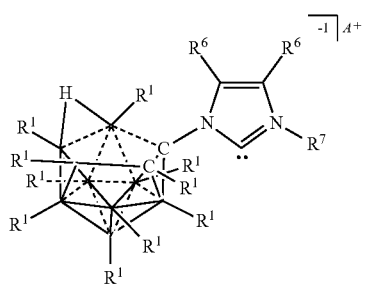

wherein

A is a cation;

each $R^1$ is independently selected from the group consisting of H, $C_{1-30}$ alkyl, aryl, $OR^a$, $SR^a$, $NR^a{}_2$, F, Cl, Br, I, $C_{1-30}$haloalkyl, and perfluoroaryl; and each $R^6$ is H, F, Cl, Br, I, $C_{1-30}$ alkyl, $C_{1-30}$ haloalkyl, $C_{1-30}$ alkoxy, $OR^a$, and $SR^a$;

$R^7$ is an optionally substituted aryl or an optionally substituted heteroaryl; and each $R^a$ is independently selected from the group consisting of H, $C_{1-30}$alkyl, aryl, and silyl.

In another aspect, the present disclosure provides an electrochemical device, comprising:
an anode;
a cathode; and
an electrolyte of formula I, II, III, IV, V, VI, VII, VIII, IX, X, XI, XII, or XIII in contact with the anode and the cathode.

Other objects, features, and advantages of the present invention will be apparent to one of skill in the art from the following detailed description and figures.

DETAILED DESCRIPTION OF THE INVENTION

I. General

Figure 1:
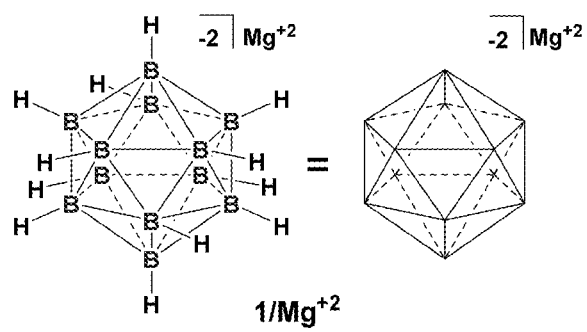
FIG. 1 shows a complete molecular structure of the $B_{12}H_{12}{}^{-2}$ dianion with a $Mg^{+2}$ countercation in accordance with an embodiment. As used herein, this molecule is referred to as $1/Mg^{2+}$. On the left $1/Mg^{2+}$ is shown with the Boron at each vertex, and a simplified drawing of $1/Mg^{+2}$ is shown on the right. Unlabeled vertices=B—H.
Figure 2:
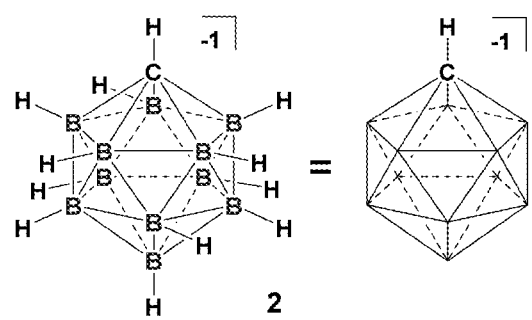
FIG. 2 shows a complete molecular structure a 12-vertex monocarborane anion. As used herein, this compound is referred to as chemical formula 2 or "2." Chemical formula: 2 is $HCB_{11}H_{11}^{-1}$. On the left chemical formula 2 is shown with the Boron at each vertex, and a simplified drawing of chemical formula 2 is shown on the right. Unlabeled vertices=B—H.

The present disclosure provides electrolytes for an electrochemical device. In some embodiments, these electrolytes are Mg salts comprising 10-vertex or 12-vertex carborane anions. The present disclosure also provides processes for preparing electrolytes for an electrochemical device. In some embodiments, the process comprises reduction of a reactive cation complexed with a 10-vertex or 12-vertex carborane, or 10-vertex or 12-vertex borate anion to form metal carborane or borate electrolytes. In some embodiments, the process comprises comproportionating a $Mg^{+2}$ 10-vertex or 12-vertex carborane salt to form a $Mg^{+1}$ electrolyte comprising a 10-vertex or 12-vertex carborane. The present disclosure further provides electrochemical devices comprising the electrolytes disclosed herein. In some embodiments, the electrochemical device comprises an electrolyte that is stable at an electrical potential greater than 4 V vs $Mg^{0/+2}$. In some embodiments, the electrolytes are in solution. In some embodiments, the electrolytes described herein are ionic liquids. In some embodiments, the electrolytes are solid phase electrolytes.

In additional aspects, the present disclosure provides catalyst or battery components, including but not limited to, N-heterocyclic carbenes with 10, 11, and 12-vertex carborane anions as well as methods of making the same. The heterocycles act as superior ligands for transition metal catalysts. The distinct advantage of utilizing a carborane anion in a ligand framework is the resistivity to decomposition. In contrast to the carbon structures typically used in catalyst ligand design, anionic carboranes are thermally and chemically more robust. The charged nature of the cluster incorporates unique properties and stabilizes low valence metal centers. In addition, the sterically bulky shape of the carborane clusters directs reactivity at the center. The combination of these properties is advantageous for developing catalysts that provide unique reaction pathways. Unexplored reaction pathways can potentially provide more efficient, faster routes to chemical materials. These are compounds are useful in the field of catalysis and energy storage.

II. Definitions

As used herein, the following terms and variations thereof have the meanings given below, unless a different meaning is clearly intended by the context in which such term is used.

The terms "a," "an," and "the" and similar referents used herein are to be construed to cover both the singular and the plural unless their usage in context indicates otherwise.

The term "comprise" and variations of the term, such as "comprising" and "comprises," are not intended to exclude other additives, components, integers, ingredients or steps.

The term "twelve vertex carborane anions" refers to compounds having the formula $[R^4CB_{11}(R^1)_{11}]^{-1}$ as depicted below:

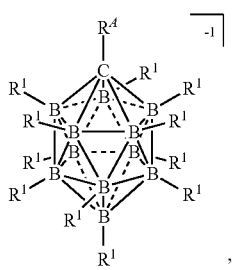

wherein $R^1$ is independently selected from H, halogen, alkyl, aryl, silyl, siloxy, trifluoromethyl, alkylcarbonyl, cyano, carbamoyl, alkoxycarbamoyl, methylendioxy, carboxy, alkoxycarbonyl, aminocarbonyl, alkyaminocarbonyl, dialkylaminocarbonyl, hydroxy, nitro, and alkoxy. In certain embodiments, $R^1$ is selected from H, halogen, alkyl, aryl, silyl, siloxy, and alkoxy. $R^A$ represents the remaining portion of the twelve vertex carborane anion. In certain embodiments $R^A$ is selected from H, halogen, alkyl, aryl, silyl, siloxy, trifluoromethyl, alkylcarbonyl, cyano, carbamoyl, alkoxycarbamoyl, methylendioxy, carboxy, alkoxycarbonyl, aminocarbonyl, alkyaminocarbonyl, dialkylaminocarbonyl, hydroxy, nitro, and alkoxy.

In some embodiments, the twelve vertex carborane anions are represented by formula IIIa:

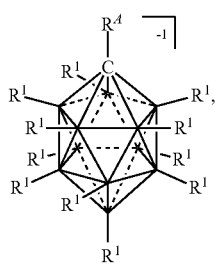

(IIIa)

wherein the vertices which are not labeled "C" represent B—$R^1$. $R^A$ represents the remaining portion of the molecule to which the twelve vertex carborane substituent is covalently bound.

In some embodiments, the twelve vertex carborane anion is represented by formula IIIb:

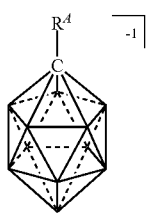

(IIIb)

wherein the vertices which are not labeled represent B—H. $R^A$ represents the remaining portion of the molecule to which the twelve vertex carborane substituent is covalently bound.

As shown in the image immediately above, for example, this structure is a twelve vertex carborane anion wherein $R^A$ is substituent covalently linked to C, and each unlabeled vertex represents a boron atom substituted with $R^1$, and each $R^1$ is H. In certain embodiments, $R^A$ is a an alkyl or aryl substituent wherein a alkyl or aryl group is covalently bound to the carbon atom of a twelve vertex carborane anion. $R^A$ can be, but is not limited to H, alkyl, aryl, hydroxyl, amino, and ether groups.

The term "eleven vertex carborane anions (−1)" refers to compounds having the formula $[HR^BC_2B_9(R^1)_9]^{-1}$ as depicted below:

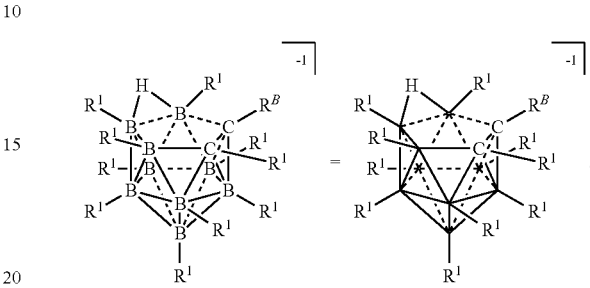

$R^1$ is as defined below, and in the embodiments described herein, $R^B$ represents the point of attachment to a heteroaryl ring.

The term "eleven vertex carborane anions (−2)" refers to compounds having the formula $[R^BC_2B_9(R^1)_9]^{-2}$ as depicted below:

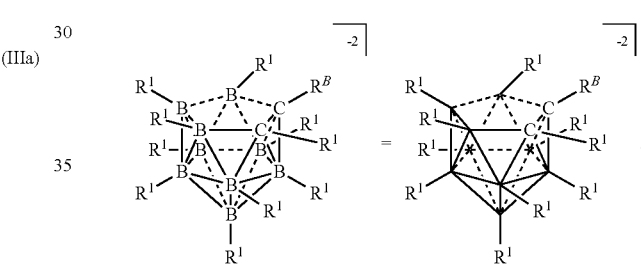

$R^1$ is as defined below, and in the embodiments described herein, $R^B$ represents the point of attachment to a heteroaryl ring.

The term "ten vertex carborane anions" refers to compounds having the formula $[R^ACB_9(R^1)_9]^{-1}$ wherein $R^1$ is independently selected from H, halogen, alkyl, aryl, silyl, siloxy, trifluoromethyl, alkylcarbonyl, cyano, carbamoyl, alkoxycarbamoyl, methylendioxy, carboxy, alkoxycarbonyl, aminocarbonyl, alkyaminocarbonyl, dialkylaminocarbonyl, hydroxy, nitro, and alkoxy. In certain embodiments, $R^1$ is selected from H, halogen, alkyl, aryl, silyl, siloxy, and alkoxy. $R^A$ represents the remaining portion of the twelve vertex carborane anion. As depicted below there are two isomers associated with such structures:

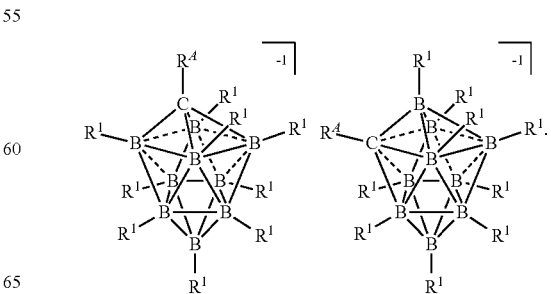

In some embodiments, ten vertex carborane anions are represented by formulas Ia or IIa:

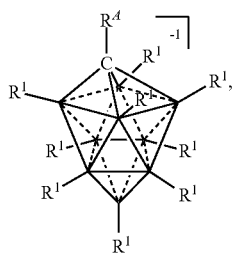
(Ia)

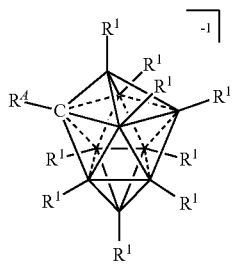
(IIa)

wherein the vertices which are not labeled "C" represent B—R$^1$. R$^A$ represents the remaining portion of the molecule to which the ten vertex carborane substituent is covalently bound.

In some embodiments, ten vertex carborane anions are represented by formulas Ib or IIb:

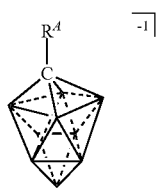
(Ib)

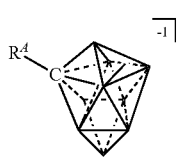
(IIb)

wherein the vertices which are not labeled represent B—H. R$^A$ represents the remaining portion of the molecule to which the twelve vertex carborane substituent is covalently bound.

As shown in the image immediately above, for example, this structure is a ten vertex carborane anion wherein R$^A$ is a covalently linked substituent, and each unlabeled vertex represents a boron atom substituted with R$^1$, and each R$^1$ is H. In certain embodiments, R$^A$ is an alkyl or aryl substituent wherein a alkyl or aryl group is covalently bound to the carbon atom of a twelve vertex carborane anion. R$^A$ can be, but is not limited to alkyl, aryl, hydroxyl, amino, and ether.

The term "twelve vertex borane anions" refers to compounds having the formula $[B_{12}(R^1)_{12}]^{-2}$ as depicted below:

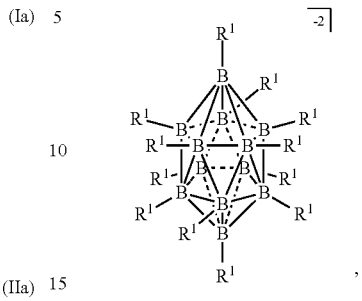

wherein R$^1$ is independently selected from H, halogen, alkyl, aryl, silyl, siloxy, trifluoromethyl, alkylcarbonyl, cyano, carbamoyl, alkoxycarbamoyl, methylendioxy, carboxy, alkoxycarbonyl, aminocarbonyl, alkyaminocarbonyl, dialkylaminocarbonyl, hydroxy, nitro, and alkoxy. In certain embodiments, R$^1$ is selected from H, halogen, alkyl, aryl, silyl, siloxy, and alkoxy.

In some embodiments, the twelve vertex borane anions are represented by formula IIIa:

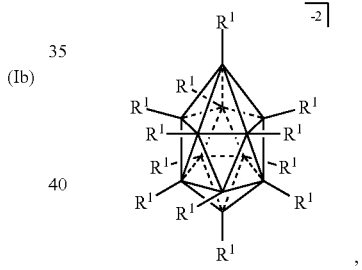
(VIIa)

wherein the vertices which are not labeled "C" represent B—R$^1$. R$^A$ represents the remaining portion of the molecule to which the twelve vertex carborane substituent is covalently bound.

In some embodiments, the twelve vertex borane anion is represented by formula VIIb:

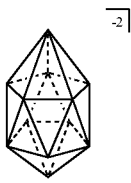
(VIIb)

wherein the vertices which are not labeled represent B—H.

The term "ten vertex borane anions" refers to compounds having the formula $[B_{10}(R^1)_{10}]^{-2}$ as depicted below:

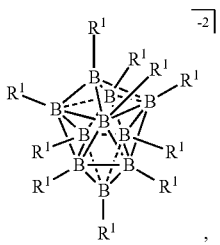

wherein $R^1$ is independently selected from H, halogen, alkyl, aryl, silyl, siloxy, trifluoromethyl, alkylcarbonyl, cyano, carbamoyl, alkoxycarbamoyl, methylendioxy, carboxy, alkoxycarbonyl, aminocarbonyl, alkyaminocarbonyl, dialkylaminocarbonyl, hydroxy, nitro, and alkoxy. In certain embodiments, $R^1$ is selected from H, halogen, alkyl, aryl, silyl, siloxy, and alkoxy.

In some embodiments, the ten vertex borane anions are represented by formula VIIIa:

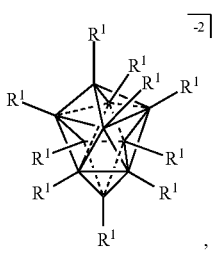

(VIIIa)

wherein the vertices which are not labeled "C" represent B—$R^1$. $R^A$ represents the remaining portion of the molecule to which the twelve vertex carborane substituent is covalently bound.

In some embodiments, the ten vertex borane anion is represented by formula VIIIb:

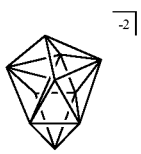

(VIIIb)

wherein the vertices which are not labeled represent B—H.

The term "reactive cation" refers to any positively charged ion that is chemically reduced by metallic Mg to produce byproducts that can easily be separated from the ensuing Mg electrolyte. $HNMe_3^+$ is one example of a positively charged ion (counter cation) that readily reacts with metallic Mg to liberate volatile $H_2$ and $NMe_3$ byproducts.

The term DME refers to dimethoxyethane.
The term THF refers to tetrahydrofuran.
The symbol Ph refers to a phenyl group.
The symbol Me refers to a methyl group.
The symbol Et refers to an ethyl group.

The term "L type ligand" refers to a neutral group which is bound to a metal. In some embodiments, the L-type ligand is $Mg^{2+}$. L is usually but not always an ethereal solvent molecule bound to the $Mg^{+2}$ by oxygen. In some embodiments, L-type ligands are amines ($NR_3$), $H_2O$, nitriles (RCN), aryls, heteroaryls (e.g. pyridine), nitromethane, $SO_2$, thioethers, esters (R—C(O)—O—R), or alkanes, wherein R refers to an organic group such as, but not limited to hydrogen, alkanes, alkenes, alkynes which may be optionally substituted with halogen, hydroxyl, or oxo groups)

The term "R type ligand" refers to an anionic group which is bound to a metal. In some embodiments, the L-type ligand is $Mg^{2+}$. R is usually but not always an organic group.

The term "chelating ligand" refers to a ligand that has more than one point of attachment to the $Mg^{+2}$ ion.

The term "comproportionation" refers to a reaction where two different reactants that share a common type of metallic element but differ in oxidation number react to produce a single reaction product.

The term "transmetalation" refers to a reaction that involves the transfer of ligands from one metallic element to a second metallic element.

The term "Alkyl" refers to a straight or branched, saturated, aliphatic radical having the number of carbon atoms indicated. Alkyl can include any number of carbons, such as $C_{1-2}$, $C_{1-3}$, $C_{1-4}$, $C_{1-5}$, $C_{1-6}$, $C_{1-7}$, $C_{1-8}$, $C_{1-9}$, $C_{1-10}$, $C_{2-3}$, $C_{2-4}$, $C_{2-5}$, $C_{2-6}$, $C_{3-4}$, $C_{3-5}$, $C_{3-6}$, $C_{4-5}$, $C_{4-6}$ and $C_{5-6}$. For example, $C_{1-6}$ alkyl includes, but is not limited to, methyl, ethyl, propyl, isopropyl, butyl, isobutyl, sec-butyl, tert-butyl, pentyl, isopentyl, hexyl, etc. Alkyl can also refer to alkyl groups having up to 30 carbons atoms, such as, but not limited to heptyl, octyl, nonyl, decyl, etc. Alkyl groups can be substituted or unsubstituted.

The term "Aryl" refers to an aromatic ring system having any suitable number of ring atoms and any suitable number of rings. Aryl groups can include any suitable number of ring atoms, such as, 6, 7, 8, 9, 10, 11, 12, 13, 14, 15 or 16 ring atoms, as well as from 6 to 10, 6 to 12, or 6 to 14 ring members. Aryl groups can be monocyclic, fused to form bicyclic or tricyclic groups, or linked by a bond to form a biaryl group. Representative aryl groups include phenyl, naphthyl and biphenyl. Other aryl groups include benzyl, having a methylene linking group. Some aryl groups have from 6 to 12 ring members, such as phenyl, naphthyl or biphenyl. Other aryl groups have from 6 to 10 ring members, such as phenyl or naphthyl. Some other aryl groups have 6 ring members, such as phenyl. Aryl groups can be substituted or unsubstituted. Suitable substituents include halo, $C_{1-30}$ alkyl, $C_{1-30}$ haloalkyl, hydroxyl, and $C_{1-10}$ alkoxy.

Some heteroaryl groups include those having from 5 to 10 ring members and from 1 to 3 ring atoms including N, O or S, such as pyrrole, pyridine, imidazole, pyrazole, triazole, pyrazine, pyrimidine, pyridazine, triazine (1,2,3-, 1,2,4- and 1,3,5-isomers), thiophene, furan, thiazole, isothiazole, oxazole, isoxazole, indole, isoindole, quinoline, isoquinoline, quinoxaline, quinazoline, phthalazine, cinnoline, benzothiophene, and benzofuran. Other heteroaryl groups include those having from 5 to 8 ring members and from 1 to 3 heteroatoms, such as pyrrole, pyridine, imidazole, pyrazole, triazole, pyrazine, pyrimidine, pyridazine, triazine (1,2,3-, 1,2,4- and 1,3,5-isomers), thiophene, furan, thiazole, isothiazole, oxazole, and isoxazole. Some other heteroaryl groups include those having from 9 to 12 ring members and from 1 to 3 heteroatoms, such as indole, isoindole, quinoline, isoquinoline, quinoxaline, quinazoline, phthalazine, cinnoline, benzothiophene, benzofuran and bipyridine. Still other heteroaryl groups include those having from 5 to 6 ring members and from 1 to 2 ring atoms including N, O or S, such as pyrrole, pyridine, imidazole, pyrazole, pyrazine, pyrimidine, pyridazine, thiophene, furan, thiazole, isothiazole, oxazole, and isoxazole.

The term "Heteroaryl" refers to a monocyclic or fused bicyclic or tricyclic aromatic ring assembly containing 5 to 16 ring atoms, where from 1 to 5 of the ring atoms are a heteroatom such as N, O or S. Additional heteroatoms can also be useful, including, but not limited to, B, Al, Si and P. The heteroatoms can also be oxidized, such as, but not limited to, —S(O)— and —S(O)$_2$—. Heteroaryl groups can include any number of ring atoms, such as, 3 to 6, 4 to 6, 5 to 6, 3 to 8, 4 to 8, 5 to 8, 6 to 8, 3 to 9, 3 to 10, 3 to 11, or 3 to 12 ring members. Any suitable number of heteroatoms can be included in the heteroaryl groups, such as 1, 2, 3, 4, or 5, or 1 to 2, 1 to 3, 1 to 4, 1 to 5, 2 to 3, 2 to 4, 2 to 5, 3 to 4, or 3 to 5. Heteroaryl groups can have from 5 to 8 ring members and from 1 to 4 heteroatoms, or from 5 to 8 ring members and from 1 to 3 heteroatoms, or from 5 to 6 ring members and from 1 to 4 heteroatoms, or from 5 to 6 ring members and from 1 to 3 heteroatoms. The heteroaryl group can include groups such as pyrrole, pyridine, imidazole, pyrazole, triazole, tetrazole, pyrazine, pyrimidine, pyridazine, triazine (1,2,3-, 1,2,4- and 1,3,5-isomers), thiophene, furan, thiazole, isothiazole, oxazole, and isoxazole. The heteroaryl groups can also be fused to aromatic ring systems, such as a phenyl ring, to form members including, but not limited to, benzopyrroles such as indole and isoindole, benzopyridines such as quinoline and isoquinoline, benzopyrazine (quinoxaline), benzopyrimidine (quinazoline), benzopyridazines such as phthalazine and cinnoline, benzothiophene, and benzofuran. Other heteroaryl groups include heteroaryl rings linked by a bond, such as bipyridine. Heteroaryl groups can be substituted or unsubstituted.

The heteroaryl groups can be linked via any position on the ring. Some heteroaryl groups include from 5 to 10 ring members and only nitrogen heteroatoms, such as pyrrole, pyridine, imidazole, pyrazole, triazole, pyrazine, pyrimidine, pyridazine, triazine (1,2,3-, 1,2,4- and 1,3,5-isomers), indole, isoindole, quinoline, isoquinoline. Other heteroaryl groups include from 5 to 10 ring members and only oxygen heteroatoms, such as furan and benzofuran. Some other heteroaryl groups include from 5 to 10 ring members and only sulfur heteroatoms, such as thiophene and benzothiophene. Still other heteroaryl groups include from 5 to 10 ring members and at least two heteroatoms, such as imidazole, pyrazole, triazole, pyrazine, pyrimidine, pyridazine, triazine (1,2,3-, 1,2,4- and 1,3,5-isomers), thiazole, isothiazole, oxazole, isoxazole.

The term "Haloalkyl" refers to alkyl, as defined above, where some or all of the hydrogen atoms are replaced with halogen atoms. As for alkyl group, haloalkyl groups can have any suitable number of carbon atoms, such as $C_{1-6}$. For example, haloalkyl includes trifluoromethyl, flouromethyl, etc. In some instances, the term "perfluoro" can be used to define a compound or radical where all the hydrogens are replaced with fluorine. For example, perfluoromethyl refers to 1,1,1-trifluoromethyl.

The term "silyl" as used herein includes —SiR$^d$R$^e$R$^f$ groups wherein R$^d$, R$^e$, and R$^f$ are $C_{1-30}$ alkyl or aryl. In some embodiments, R$^d$, R$^e$, and R$^f$ are $C_{1-10}$ alkyl or aryl. Particular "silyl" groups include, but are not limited to, trimethylsilyl, triethylsilyl, and tertbutyldimethylsilyl, tert-Butyldiphenylsilyl, and Triisopropylsilyl ether. The term "siloxy" refers to silyl ethers of formula —O—SiR$^d$R$^e$R$^f$, where R$^d$, R$^e$, and R$^f$ are as defined above.

III. Embodiments

A. Process 1

In one aspect, the present disclosure provides a process for preparing an electrolyte for an electrochemical device comprising the step of reacting active cations with a metal, metal hydride, or metal alkyl according to formulas i or ii

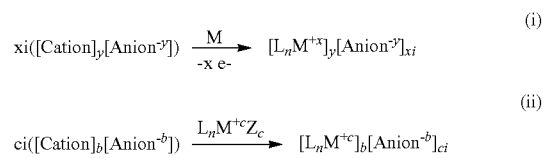

in a solvent, wherein,

M is a metal selected from the group consisting of Mg, Al, Ca, Na, and Li;

each Z is independently selected from the group consisting of H, $C_{1-8}$alkyl;

x and xi are equal integers from 1 to 3;

c and ci are equal integers from 1 to 3;

y and b are 1 or 2;

the solvent is L;

the cation is selected from the group consisting of NH$_4^+$, H$_3$NR$^{c+}$, H$_2$NR$^c_2{}^+$, HNR$^c_3{}^+$, H$^+$, and HOR$^c_2{}^+$.

each L is independently selected from OR$^b_2$, THF, hexane, dimethoxyethane (DME), diglyme, triyglyme, tetraglyme, pentaglyme, and mixtures thereof;

n is an integer from 0 to 6;

the anion is selected from the group consisting of formulas Ia, IIa, IIIa, VIIa, and VIIIa

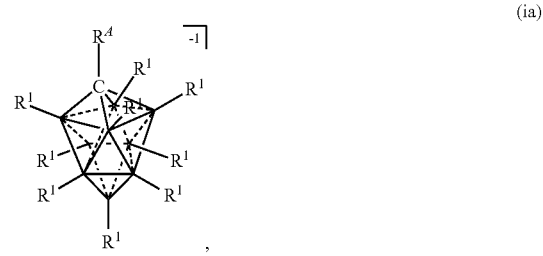

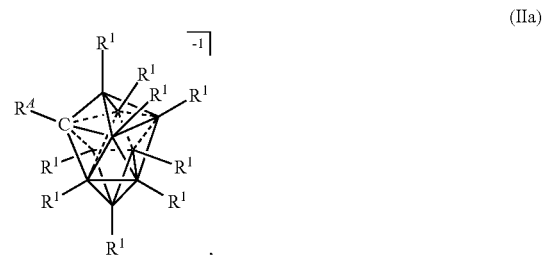

-continued

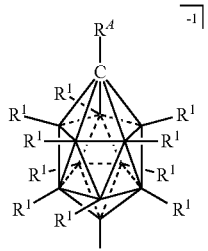
(IIIa)

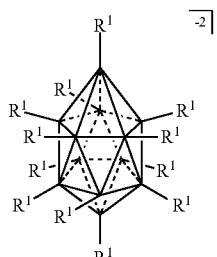
(VIIIa)

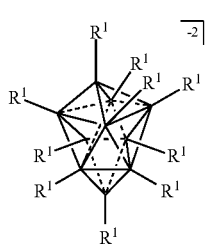

wherein, $R^A$ is selected from the group consisting of H, $C_{1-30}$ alkyl, aryl, $OR^a$, $SR^a$, $NR^a_2$, F, Cl, Br, I, $C_{1-30}$haloalkyl, and perfluoroaryl;

each $R^1$ is independently selected from the group consisting of H, $C_{1-30}$alkyl, aryl, $OR^a$, $SR^a$, $NR^a_2$, F, Cl, Br, I, $C_{1-30}$haloalkyl, and perfluoroaryl;

each $R^a$ is independently selected from the group consisting of H, $C_{1-30}$ alkyl, aryl, and silyl, each $R^b$ is $C_{1-8}$alkyl; and each $R^c$ is independently selected from the group consisting of $C_{1-8}$alkyl and aryl;

provided that when M is Mg or Ca and the anion is formula VIIa or VIIIa, x or c is 2 and xi or ci is 1.

In some embodiments, the anion is a carborane anion of formulas Ia

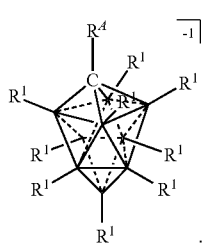
(Ia)

In some embodiments, the anion is a carborane anion of formulas IIa

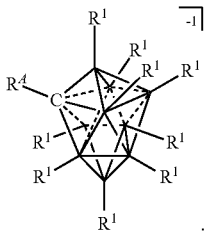
(IIa)

In some embodiments, the anion is a carborane anion of formulas IIIa

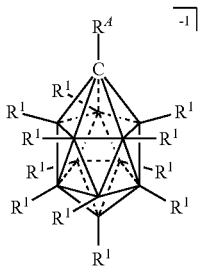
(IIIa)

In some embodiments, the anion is a borane anion of formulas VIIa

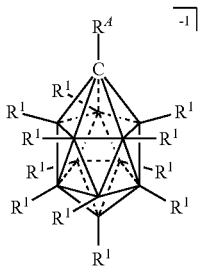
(VIIa)

In some embodiments, the anion is a borane anion of formulas VIIIa

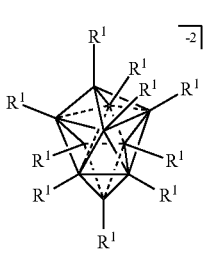
(VIIIa)

In some embodiments, the step of reactive active cations is performed according to formula i

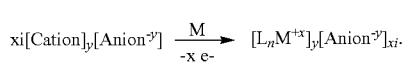 (i)

In some embodiments, the step of reactive active cations is performed according to formula ii

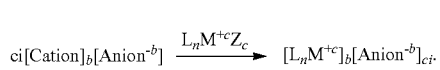 (ii)

In some embodiments, M is Mg and x is 2. In some embodiments, M is Mg and c is 2. In some embodiments, M is Ca and x is 2. In some embodiments, M is Ca and c is 2. In some embodiments, M is Na and x is 1. In some embodiments, M is Na and c is 1. In some embodiments, M is Li and x is 1. In some embodiments, M is Li and c is 1. In some embodiments, M is Al and x is 3. In some embodiments, M is Al and c is 3.

In some embodiments, the cation is $HNR_3^+$. In some embodiments, the cation is $HNMe_3^+$ or $HNEt_3^+$.

In some embodiments, the process is conducted in a volatile alkane solvent. In some embodiments the volatile a solvent is pentane, hexane, heptane, or octane. It is also understood that similar alkanes and aromatic hydrocarbons may be used without departing from the scope of the disclosure. In some embodiments, the solvent is DME, THF, or a combination thereof.

In some embodiments, the process is conducted in the absence of a solvent. It is understood that when the process is performed in the absence of a solvent, L is absent.

In another aspect, the invention is a process for the production of halide-free carborane based electrolytes for use in rechargeable Mg batteries, the process comprising the step of reducing reactive cations with Mg metal according to the following formula:

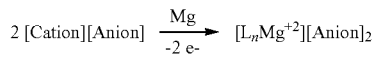

wherein: the cation is a $NH_4^+$, $HNMe_3^+$, $HNEt_3^+$, $HNAlkyl_3^+$, $H_2NAlkyl_2^+$, $H_3NAlkyl^+$, $HNR_3^+$, $NR_4^+$;
L is independently selected from $OR_2$, $OEt_2$, THF, dimethoxyethane, diglyme, triglyme, tetraglyme, pentaglyme, and or other solvent molecule;
n is equal to 0-6
the anion is an aluminate, borate, boron cluster anion and/or carborane anion;
R is independently selected from H, alkyl, aryl, silyl;
$R^A$ is independently selected from H, alkyl, aryl, OR, $NR_2$, F, Cl, Br, I or SR; and
$R^1$ is independently selected from H, alkyl, aryl, OR, $NR_2$, F, Cl, Br, I and/or SR;
Preferably the byproducts of the process are volatile, hence low molecular weight cations like $HNMe_3^+$ are preferred.

It is also preferable for the anion to be a carborane having either the general formula $R^ACB_9(R_1)_9^{-1}$ or $R^ACB_{11}(R_1)_{11}^{-1}$.

This aspect of this invention provides a novel and general strategy to produce halide free electrolytes for rechargeable Mg batteries via the direct chemical reduction of reactive cations with Mg metal.

Figure 3:
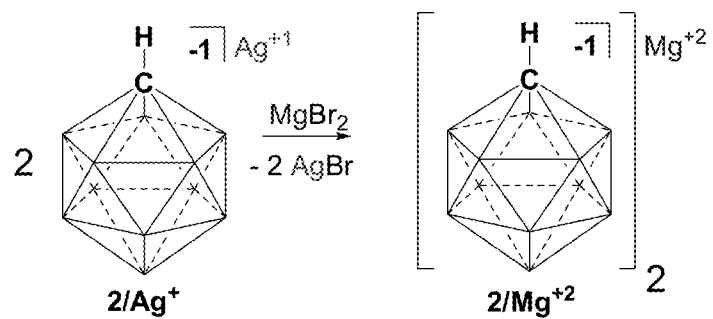
FIG. 3 shows the preparation of an electrolyte comprising chemical formula 2 complexed with $Mg^{2+}$ ($2/Mg^{2+}$) from chemical formula 2 complexed with $Ag^+$ ($2/Ag^+$).
Figure 4:
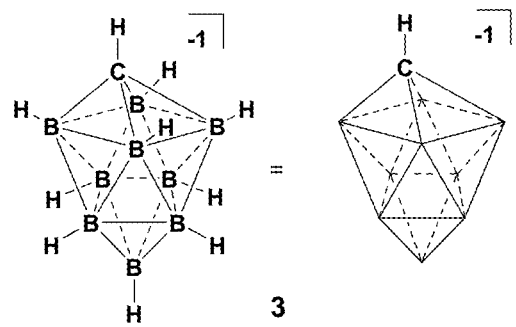
FIG. 4 shows a complete molecular structure of a 10-vertex carbaborane anion. As used herein, this compound is referred to as chemical formula 3 of "3." Chemical formula: 3 is $HCB_9H_9^{-1}$. On the left, chemical formula 3 is shown with the Boron at each vertex, and a simplified drawing of chemical formula 3 is shown on the right. Unlabeled vertices=B—H.
Figure 5:
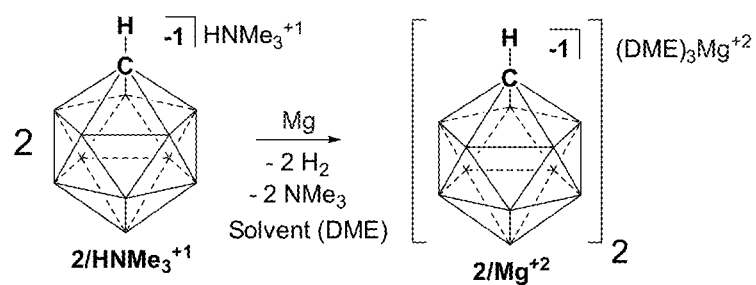
FIG. 5 shows the preparation of an electrolyte comprising chemical formula 2 complexed with $Mg^{2+}$ ($2/Mg^{+2}$) from chemical formula 2 complexed with $HNMe_3^{+1}$ in accordance with an embodiment.

An example of this strategy is illustrated in FIG. 5 and is the reaction of ammonium carborane salts $2/HNMe_3^{+1}$ to produce halide free Mg salts of the 12-vertex carborane anion $2/Mg^{+2}$. Utilizing this novel process, the metallic Mg transfers two electrons to two $HNMe_3^{+1}$ molecules with subsequent evolution of volatile $H_2$ and $NMe_3$ as the only byproducts. This method is superior to salt metathesis methodologies of FIG. 3 since no precious metal salt byproduct (i.e., AgBr) is produced. Moreover, the electrolyte $2/Me^{+2}$ prepared by the novel cation reduction methodology is sufficiently pure for battery applications without tedious purification procedures. One of skill and the art should realize that the novel cation reduction methodology is not limited to the preparation of $2/Mg^{+2}$ and can be implemented to produce a wide range of electrolytes from anions paired with reactive cations.

B. Compositions 1

In another aspect, the present disclosure provides an electrolyte for an electrochemical device comprising: a magnesium salt selected from formulas (I), (II), (III), (VII), and (VIII):

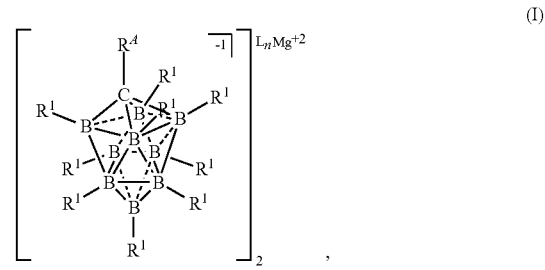 (I)

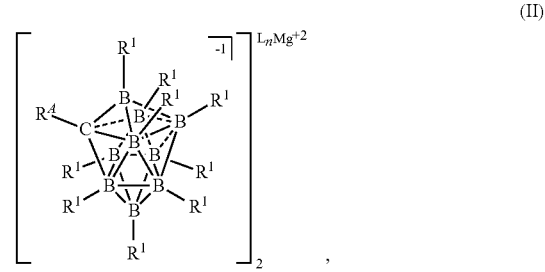 (II)

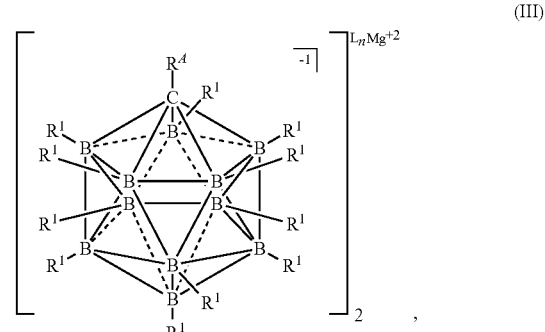 (III)

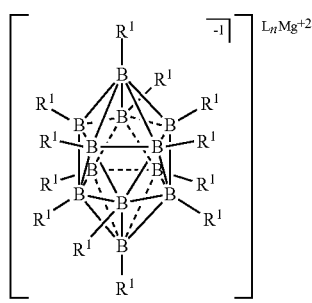
(VII)

In some embodiments, the magnesium salt is represented by formula (II)

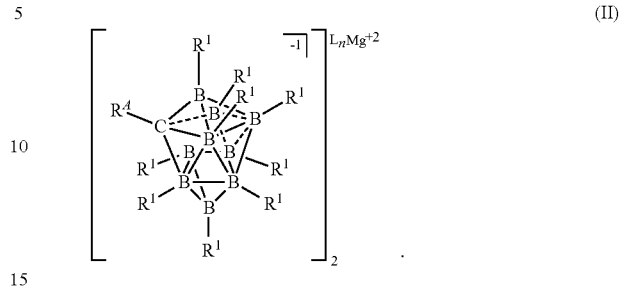
(II)

In some embodiments, the magnesium salt is represented by formula (III)

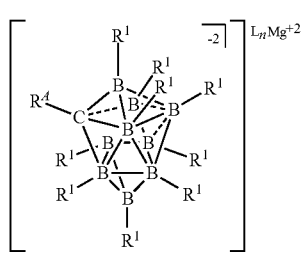
(VIII)

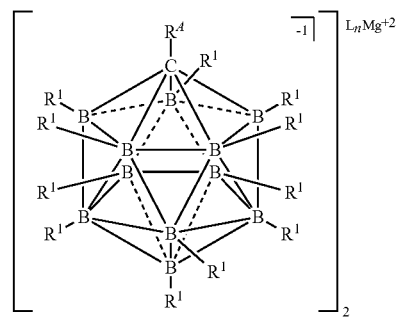
(III)

wherein each L is an ethereal solvent or other L-type ligands n is an integer from 0 to 6;

$R^A$ is selected from the group consisting of H, $C_{1-30}$alkyl, aryl, $OR^a$, $SR^a$, $NR^a_2$, F, Cl, Br, I, $C_{1-30}$haloalkyl, and perfluoroaryl;

each $R^1$ is independently selected from the group consisting of H, $C_{1-30}$alkyl, aryl, $OR^a$, $SR^a$, $NR^a_2$, F, Cl, Br, I, $C_{1-30}$haloalkyl, and perfluoroaryl; and each $R^a$ is independently selected from the group consisting of H, $C_{1-30}$alkyl, aryl, and silyl;

provided that when the magnesium salt has formula (III), at least one of $R^A$ and $R^1$ is other than H.

In some embodiments, the magnesium salt is represented by formula (I)

In some embodiments, the magnesium salt is represented by formula (VII)

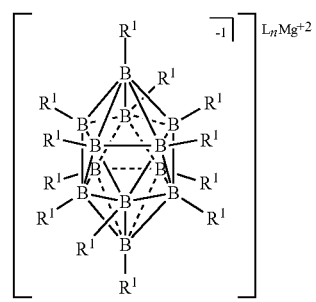
(VII)

In some embodiments, the magnesium salt is represented by formula (VIII)

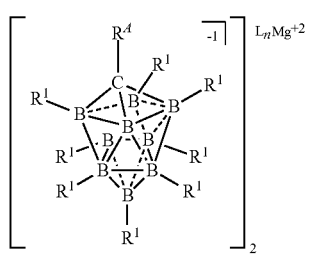
(I)

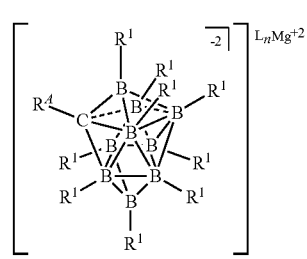
(VIII)

In some embodiments, the electrolytes of formulas I, II, III, VII, and VIII do not contain a solvent. That is, n=0. In some embodiments, L is absent. In some embodiments, the electrolytes are solid-state electrolytes. In some embodiments, the electrolytes are ionic liquids.

In some embodiments, each L is an ethereal solvent independently selected from the group consisting of $OR^b{}_2$, THF, dimethoxyethane, diglyme, triyglyme, tetraglyme and pentaglyme, wherein each $R^b$ is $C_{1-8}$alkyl. In some embodiments, each L is an L-type ligand independently selected from the group consisting of $NR^b{}_3$, $H_2O$, $R^bCN$, aryl, heteroaryl, nitromethane, $SO_2$, or $R^b$—C(O)—O—$R^b$, $SR^b{}_2$, wherein each $R^b$ is $C_{1-8}$alkyl.

In some embodiments, L is THF and DME. In some embodiments, L is THF. In some embodiments, L is DME.

In some embodiments, at least three of $R^A$ and $R^1$ are other than H. In some embodiments, at least four of $R^A$ and $R^1$ are other than H. In some embodiments, at least five of $R^A$ and $R^1$ are other than H. In some embodiments, at least six of $R^A$ and $R^1$ are other than H. In some embodiments, at least three $R^1$ are F, Cl, I, or a combination thereof. In some embodiments, at least six $R^1$ F, Cl, I, or a combination thereof. In some embodiments, all $R^1$ are F, Cl, I, or a combination thereof. It is understood that the foregoing embodiments may refer to any metal salt described herein, including the Mg salt of formula (III).

In some embodiments, the electrolyte of this aspect of the invention is dissolved in one or more polymers. The dissolved polymer-electrolyte solution can be deposited as a thin film and function as a dual ion conducting polymer electrolyte. Suitable polymes include, but are not limited to, polynorbornene, polystyrene, poly(ethylene oxide) (PEO), poly(acrylonitrile) (PAN), poly(methyl methacrylate), (PMMA) and poly(vinylidene fluoride) (PVdF). In some embodiments, one or more electoryltes of this aspect of the invention are dissolved in one or more polymers.

In some embodiments, the the electrolyte of this aspect of the invention is covalently attached to a polymer. The covalently attached polymer-electrolyte functions as single ion conductor. Covalent attachment of an electrolyte to a polymer can be achieved using known chemistry such as amid formation, ether formation, click chemistry, etc. Suitable polymes include, but are not limited to, polynorbornene, polystyrene, poly(ethylene oxide) (PEO), poly (acrylonitrile) (PAN), poly(methyl methacrylate), (PMMA) and poly(vinylidene fluoride) (PVdF). In some embodiments, one or more electoryltes of this aspect of the invention are covalently attached to a polymer.

In yet another aspect, the invention is an electrolyte suitable for rechargeable Mg batteries, the electrolyte having the general formula $[L_nMg^{+2}][R^ACB_9(R^1)_9{}^{-1}]_2$ or $[L_nMg^{+2}][R^ACB_{11}(R^1)_{11}{}^{-1}]_2$;

wherein: L is independently selected from $OR_2$, $OEt_2$, THF, dimethoxyethane, diglyme, triyglyme, tetraglyme pentaglyme and/or other L-type ligand;

n is equal to 0-6

R is independently selected from H, alkyl, aryl, silyl;

$R^A$ is independently selected from H, alkyl, aryl, OR, $NR_2$, F, Cl, Br, I, perfluoroalkyl, perfluoroaryl, or SR; and $R^1$ is independently selected from H, alkyl, aryl, OR, $NR_2$, F, Cl, Br, I, perfluoroalkyl, perfluoroaryl, or SR; and;

the electrolyte having one of the three general structures:

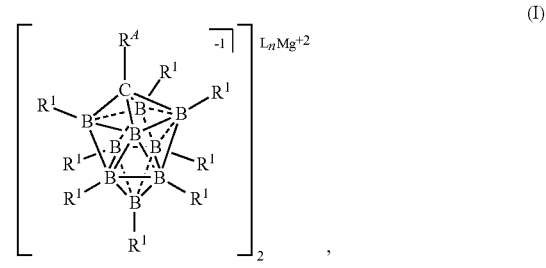

(I)

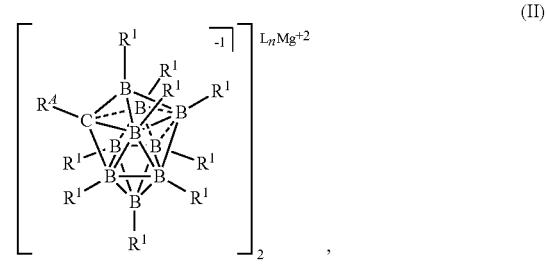

(II)

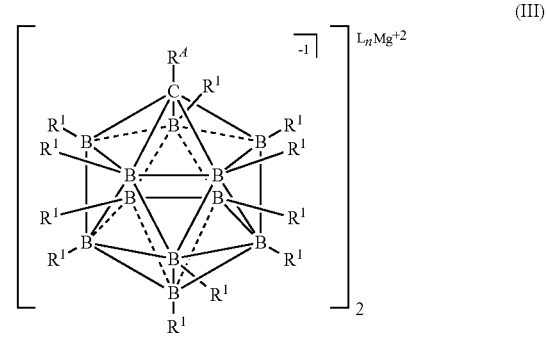

(III)

$R^A$ and $R^1$ being not all hydrogens in a 12-vertex carborane anion.

C. Process 2

In yet another aspect, the present disclosure provides a process for preparing an electrolyte for an electrochemical device comprising the step of comproportionating a Mg salt selected from formulas I, II, or III

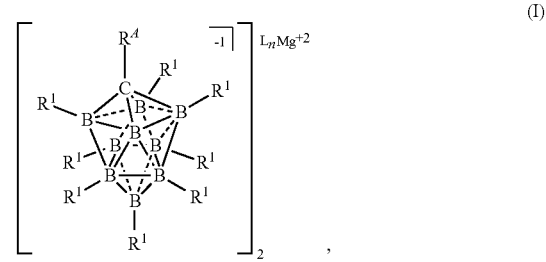

(I)

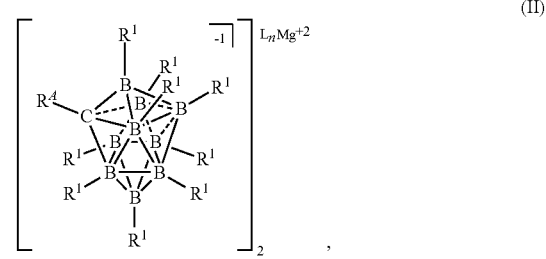

(II)

-continued

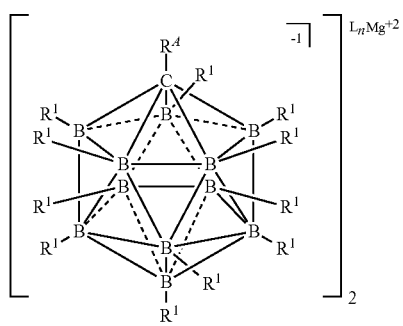

(III)

and a magnesium reagent of the general formula $MgR_2$ according to formula iii:

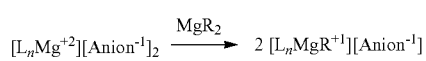

(iii)

in a solvent wherein, the solvent is L;

each L is independently selected from $OR^b{}_2$, THF, dimethoxyethane, diglyme, triyglyme, tetraglyme, pentaglyme, and mixtures thereof;

n is an integer from 0 to 6;

the anion is a carborane anion as shown in formulas I, II, and III;

each R is independently selected from $C_{1-30}$ alkyl and aryl;

$R^A$ is selected from the group consisting of H, $C_{1-30}$alkyl, aryl, $OR^a$, $SR^a$, $NR^a{}_2$, F, Cl, Br, I, $C_{1-30}$haloalkyl, and perfluoroaryl;

each $R^1$ is independently selected from H, $C_{1-30}$alkyl, aryl, $OR^a$, $NR^a{}_2$, F, Cl, Br, I, $C_{1-30}$ haloalkyl, and perfluoroaryl each $R^a$ is independently selected from the group consisting of H, $C_{1-30}$alkyl, aryl, and silyl; and each $R^b$ is $C_{1-8}$alkyl.

In some embodiments, the Mg salt is represented by formula I

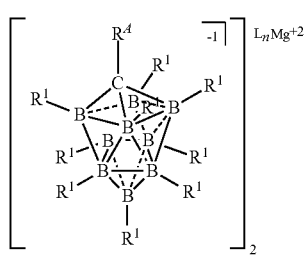

(I)

In some embodiments, the Mg salt is represented by formula II

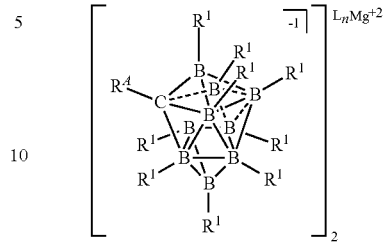

(II)

In some embodiments, the Mg salt is represented by formula III

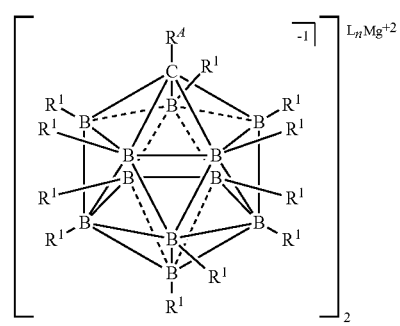

(III)

In some embodiments, L is DME.

In some embodiments, the Mg salt is represented in any of the figures and examples In some embodiments, the magnesium reagent is represented in any of the figures and examples.

In some embodiments each R group of the magnesium reagent is phenyl.

In still another aspect, the invention is a process for the production of a halide-free carborane based electrolyte for use in rechargeable Mg batteries, the process comprising the step of comproportionating Mg salts of either the general formulas $[L_nMg^{+2}][R^ACB_9(R^1)_9{}^{-1}]_2$ or $[L_nMg^{+2}][R^ACB_{11}(R^1)_{11}{}^{-1}]_2$ and a magnesium reagent of the general formula $MgR_2$ to produce electrolytes of either the general formulas $[L_nMgR^{+1}][R^ACB_9(R^1)_9{}^{-1}]$ or $[L_nMgR^{+1}][R^ACB_{11}(R^1)_{11}{}^{-1}]$ according to the following formula:

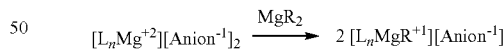

wherein: L independently selected from $OR_2$, $OEt_2$, THF, dimethoxyethane, diglyme, triyglyme, tetraglyme pentaglyme, and or other L-type ligand;

n is equal to 0-6

R is independently selected from H, alkyl, aryl, silyl, aryloxy, alkoxy, siloxy, amido;

$R^A$ is independently selected from H, alkyl, aryl, OR, $NR_2$, F, Cl, Br, I, perfluoroalkyl, perfluoroaryl, or SR; and; and $R^1$ is independently selected from H, alkyl, aryl, OR, $NR_2$, F, Cl, Br, I, perfluoroalkyl, perfluoroaryl, or SR; and;

the anion is an aluminate, borate, boron cluster anion and/or carborane anion; the anion is a carborane having either the general formula $R^ACB_9(R^1)_9{}^{-1}$ or $R^ACB_{11}(R^1)_{11}{}^{-1}$.

In one embodiment of this aspect of the invention, an electrolyte with the formula [(DME$_2$)(THF)MgPh$^{+1}$][HCB$_{11}$H$_{11}$$^{-1}$] is produced via comproportionation as follows:

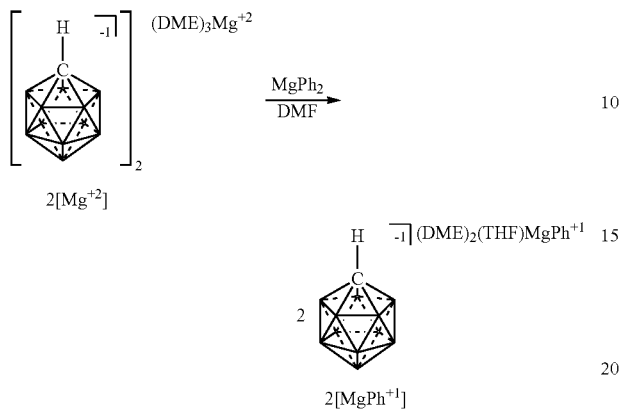

The inventive method of making the electrolyte was devised by the following thought process. Seeking to improve the solubility and conductivity of 2[Mg$^{+2}$] it was envisioned designing a system with reduced coulombic interactions. Furthermore, enhanced solubility might offer the possibility of utilizing more oxidatively stable solvents, which could lead to higher voltage electrolyte systems. It was hypothesized that attaching a suitable organic R-type ligand to the Mg$^{+2}$ ion in 2[Mg$^{+2}$] would produce unique carborane electrolytes 2[MgR$^{+1}$]. Also desired was a method that could potentially be used to rapidly create a library of electrochemically distinct Mg electrolytes, by varying the R-type ligand, without the introduction of potential contaminants, as in transmetalation reactions. It was reasoned that treatment of Lewis acidic 2[Mg$^{+2}$] with an equal molar amount of a halide free Lewis basic diorganomagnesium reagent MgR$_2$ would result in comproportionation to afford 2[MgR$^{+1}$] species. Inspired by the formulation of others of an all phenyl electrolyte (APC), which features an oxidation resistant phenyl substituent, it was predicted that readily available MgPh$_2$ would be an ideal reactant. Indeed, treatment of a suspension of 2[Mg$^{+2}$] in DME with a DME solution of MgPh$_2$ instantly solubilizes the mixture indicating that comproportionation occurred. One of skill and the art will realize that other embodiments of the invention can be easily made by, related processes, depending on the precise form of anion/cation, L/R type ligands, and diorgano magnesium reagents (MgR$_2$).

D. Compositions 2:

In another aspect, the present disclosure provides an electrolyte for an electrochemical device comprising: a magnesium salt selected from formulas (IV), (V), and (VI):

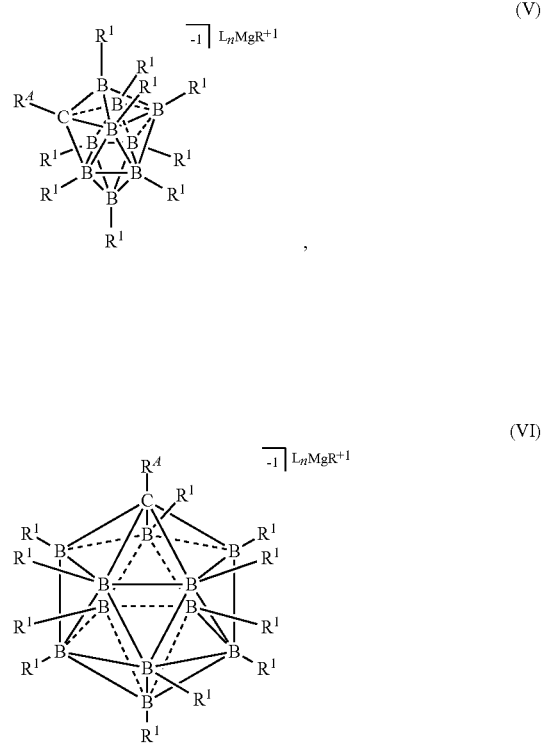

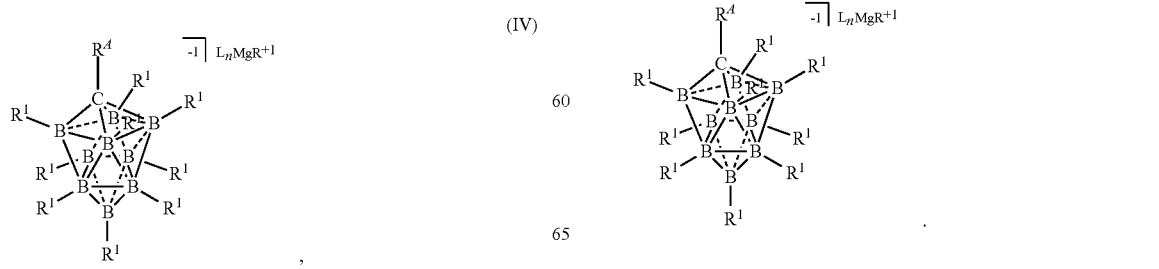

wherein
each L is an ethereal solvent or other L-type ligands
n is an integer from 0 to 6;
R$^A$ is selected from the group consisting of H, C$_{1-30}$alkyl, aryl, OR$^a$, SR$^a$, NR$^a{}_2$, F, Cl, Br, I, C$_{1-30}$haloalkyl, and perfluoroaryl;
each R$^1$ is independently selected from the group consisting of H, C$_{1-30}$alkyl, aryl, OR$^a$, SR$^a$, NR$^a{}_2$, F, Cl, Br, I, C$_{1-30}$haloalkyl, and perfluoroaryl;
each R$^a$ is independently selected from the group consisting of H, C$_{1-30}$alkyl, aryl, and silyl; and
each R is independently selected from the group consisting of C$_{1-30}$alkyl and aryl.

In some embodiments, the magnesium salt is represented by formula (IV)

In some embodiments, the magnesium salt is represented by formula (V)

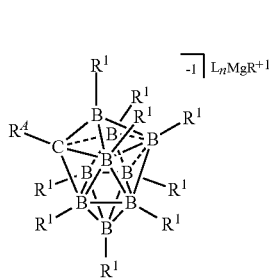
(V)

In some embodiments, the magnesium salt is represented by formula (VI)

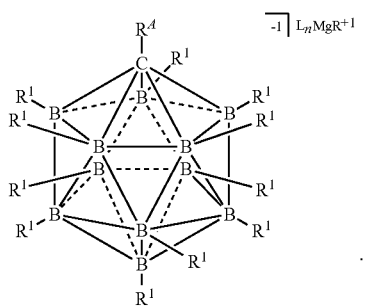
(VI)

In some embodiments, each L is an ethereal solvent independently selected from the group consisting of $OR^b{}_2$, THF, dimethoxyethane, diglyme, triyglyme, tetraglyme and pentaglyme, wherein each $R^b$ is $C_{1-8}$alkyl.

In some embodiments, L is THF and DME.

In some embodiments, the electrolytes of formulas IV, V, and VI do not contain a solvent. That is, n=0. In some embodiments, L is absent. In some embodiments, the electrolytes are solid-state electrolytes. In some embodiments, the electrolytes are ionic liquids.

In another aspect, the invention is an electrolyte suitable for rechargeable Mg batteries, the electrolyte having the general formula $[L_nMgR^{+1}][R^ACB_9(R^1)_9{}^{-1}]$ and $[L_n MgR^{+1}][R^ACB_{11}(R^1)_{11}{}^{-1}]$ wherein: L independently selected from $OR_2$, $OEt_2$, THF, dimethoxyethane, diglyme, triyglyme, tetraglyme pentaglyme, and or other L-type ligand;

n is equal to 0-6

R is independently selected from H, alkyl, aryl, silyl, aryloxy, alkoxy, siloxy, amido;

$R^A$ is independently selected from H, alkyl, aryl, OR, $NR_2$, F, Cl, Br, I, perfluoroalkyl, perfluoroaryl, or SR; and; and $R^1$ is independently selected from H, alkyl, aryl, OR, $NR_2$, F, Cl, Br, I, perfluoroalkyl, perfluoroaryl, or SR; and;

the anion is an aluminate, borate, boron cluster anion and/or carborane anion;

the anion is a carborane having either the general formula $R^ACB_9(R^1)_9{}^{-1}$ or $R^ACB_{11}(R^1)_{11}{}^{-1}$.

the electrolyte having one of the three structures:

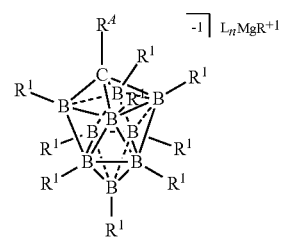
(IV)

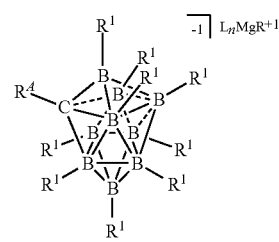
(V)

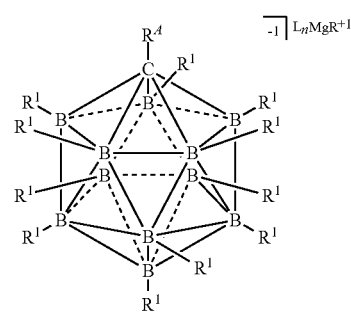
(VI)

Figure 6:
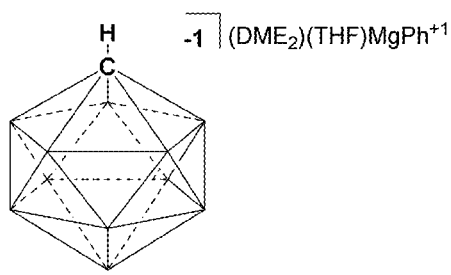
FIG. 6 illustrates the chemical structure of $[(DME)_2(THF)MgPh^{+1}][HCB_{11}H_{11}^{-1}]$ with a mixture of two DME and one THF L-Type ligands in accordance with an embodiment. As used herein, this compound is referred to by its chemical structure $[(DME)_2(THF)MgPh^{+1}][HCB_{11}H_{11}^{-1}]$ or as "$2[MgPh^{+1}]$."

In one embodiment, the electrolyte of this aspect of the invention has the formula $[(DME)_2(THF)MgPh^{+1}]$ $[HCB_{11}H_{11}{}^{-1}]$ with a mixture of two DME and one THF L-Type ligands. This compound is shown in FIG. 6.

In some embodiments, the electrolyte of this aspect of the invention is dissolved in one or more polymers. The dissolved polymer-electrolyte solution can be deposited as a thin film and function as a dual ion conducting polymer electrolyte. Suitable polymes include, but are not limited to, polynorbornene, polystyrene, poly(ethylene oxide) (PEO), poly(acrylonitrile) (PAN), poly(methyl methacrylate), (PMMA) and poly(vinylidene fluoride) (PVdF). In some embodiments, one or more electoryltes of this aspect of the invention are dissolved in one or more polymers.

In some embodiments, the the electrolyte of this aspect of the invention is covalently attached to a polymer. The covalently attached polymer-electrolyte functions as single ion conductor. Covalent attachment of an electrolyte to a polymer can be achieved using known chemistry such as amid formation, ether formation, click chemistry, etc. Suitable polymes include, but are not limited to, polynorbornene, polystyrene, poly(ethylene oxide) (PEO), poly (acrylonitrile) (PAN), poly(methyl methacrylate), (PMMA) and poly(vinylidene fluoride) (PVdF). In some embodiments, one or more electoryltes of this aspect of the invention are covalently attached to a polymer.

Figure 7:
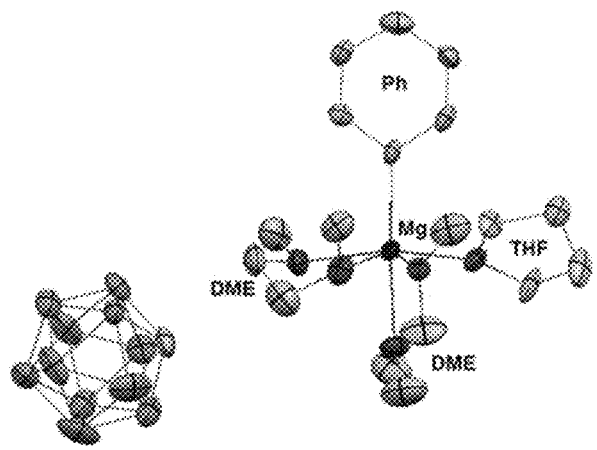
FIG. 7 illustrates the crystal structure of $2[MgPh^{+1}]$ in accordance with an embodiment. Hydrogen atoms and two molecules of cocrystalized toluene are omitted for clarity and thermal ellipsoids are drawn at the 50% probability level. Color code: blue=Mg; grey=carbon; brown=boron; red=oxygen.

Analysis of this embodiment of the electrolyte of the invention revealed that the $2[MgPh^{+1}]$ has the following solid-state structure determined by a single crystal X-ray diffraction study:

In FIG. 7, hydrogen atoms and two molecules of cocrystalized toluene are omitted for clarity and thermal ellipsoids are drawn at the 50% probability level. (Color code: blue=Mg; grey=carbon; brown=boron; red=oxygen.)

In this embodiment of the inventive electrolyte of FIGS. 6 and 7, the embodiment of the inventive electrolyte 2[MgPh$^{+1}$] illustrated, was produced by comproportionation of 2[Mg$^{+2}$] and MgPh$_2$ to yield 2[MgPh$^{+1}$]. The solid-state structure of 2[MgPh$^{+1}$] with a THF and two coordinated DME molecules. The electrolyte was also characterized in solution by multinuclear NMR and Infra-red spectroscopy.

Figures 8, 9:
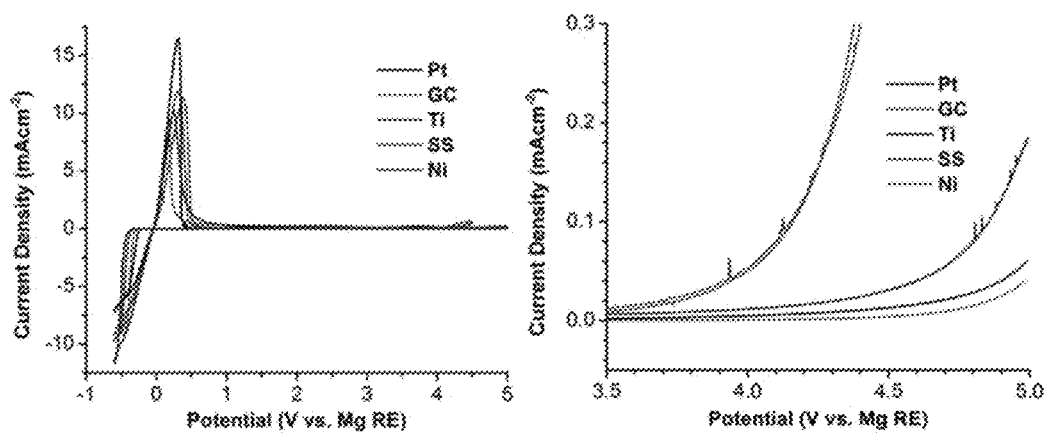
FIG. 8 illustrates cyclic voltammetry measurements for $2[MgPh^{+1}]$ in DME demonstrating Mg deposition and stripping on all working electrodes (WE) including platinum (Pt), titanium (Ti), nickel (Ni), 316 stainless steel (SS), and glassy carbon (GC) with low overpotentials (250 to 350 mV depending on different surface).
FIG. 9 shows an enlargement of the 3.0 to 5.0 V region of the anodic scan in FIG. 8. This figure illustrates the oxidative onset potentials. The working electrolytes are tested are the same as in FIG. 8: platinum (Pt), titanium (Ti), nickel (Ni), 316 stainless steel (SS), and glassy carbon (GC).

Electrochemical analysis of the electrolyte 2[MgPh$^{+1}$] demonstrates 4 times higher conductivity (1.24×10$^{-2}$ S cm$^{-1}$) even with a lower concentration (0.4 M, DME) compared to 2[Mg$^{+2}$] reported by others (maximum: 0.75 M, Triglyme, 3.0×10$^{-3}$ S cm$^{-1}$) O. Tutusaus, et al. Angew. Chem. Int. Ed. 2015 54(27):7900-7904. As demonstrated by cyclic voltammetry (CV), 2[MgPh$^{+1}$] also shows reversible Mg deposition/stripping and excellent anodic stability on various metal surfaces. As shown in FIGS. 8 and 9, scans show facile Mg deposition and stripping on all working electrodes (WE) including platinum (Pt), titanium (Ti), nickel (Ni), 316 stainless steel (SS), and glassy carbon (GC) with low overpotentials (250 to 350 mV depending on different surface). Mg deposition was confirmed by scanning electron microscopy and powder X-ray diffraction studies. The coulombic efficiency of the first CV cycle on Pt WE is 93.0%, which improves to greater than to 95.0% in the following 50 cycles. Impressively, anodic scans (FIGS. 8 and 9) demonstrate the unprecedented oxidative stability of the 2[MgPh$^{+1}$]. This electrolyte is stable up to 4.6 V vs. Mg$^{0/+2}$ on both Pt and GC, rendering it by far the most oxidatively stable Mg-ion electrolyte reported to date (previous most stable: 1[Mg$^{+2}$], 3.8 V/Al current collector). The anodic stability is 4.2 V on Ti and 3.5 V on both SS and Ni. The electrochemical stability of the novel electrolyte 2[MgPh$^{+1}$] containing an organic ligand is truly remarkable.

E. Compositions & Process 3:

Also provided herein are heterocyctes bearing the 10, 11, and 12 vertex carborane anions for application as catalyst and battery electrolyte components. The anions' non nucleophilic/weakly coordinating nature, and chemical/thermal stability makes the heterocycles featuring carborane anions described herein particularly advantageous. This allows for extreme electrochemical stability of electrolytes, leading to a generation of higher energy density batteries. In addition, these materials are non-pyrophoric, and hence safer to handle than the current state of the art technology. Heterocycles containing 10 and 11 vertex carborane anions have been synthesized and fully characterized. Experiments demonstrate their utility in various catalytic reactions, such as olefin metathesis and hydrogenation, and further indicate their suitability as electrolytes for various battery classes.

In still another aspect, the present disclosure provides a catalyst or battery component comprising a compound or complex selected from the formulas (XIV), (XIVa), and (XIVb)

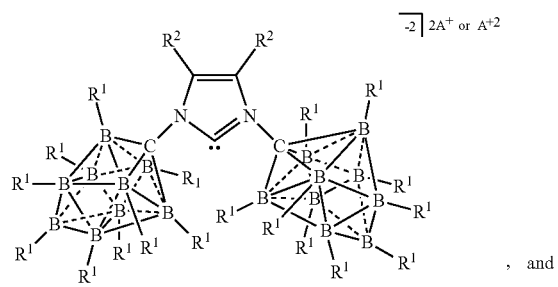

wherein

A is a cation;

each R$^1$ is independently selected from the group consisting of H, C$_{1-30}$alkyl, aryl, OR$^a$, SR$^a$, NR$^a{}_2$, F, Cl, Br, I, C$_{1-30}$haloalkyl, and perfluoroaryl;

each R$^2$ is H, F, Cl, Br, I, C$_{1-30}$ alkyl, C$_{1-30}$haloalkyl, C$_{1-30}$ alkoxy, OR$^a$, and SR$^a$;

and each R$^a$ is independently selected from the group consisting of H, C$_{1-30}$ alkyl, aryl, and silyl.

In some embodiments, the catalyst or battery component is represented by formula (XIV)

In some embodiments, the catalyst or battery component is represented by formula (XIVa)

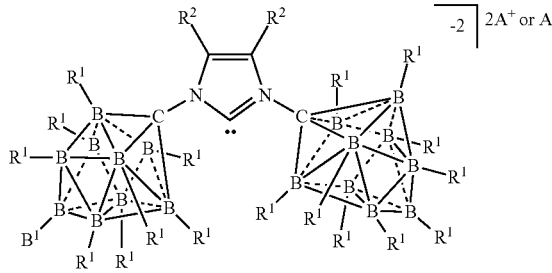
(XVIa)

In some embodiments, the catalyst or battery component is represented by formula (XIVb)

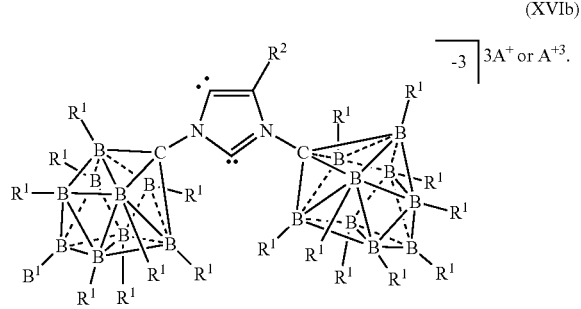
(XVIb)

In some embodiments, A is a metal selected from the group consisting of Mg, Ca, Al, Cs, Na, K, and Li. In some embodiments, A is a metal selected from the group consisting of K and Li. In some embodiments, A is $HN(CH_3)_3^+$.

In some embodiments, $R^2$ is H, F, Cl, Br, or I.

In some aspects, the present disclosure provides A catalyst or battery component comprising a compound or complex selected from the formulas (XV), (XVa), (XVb), and (XVc)

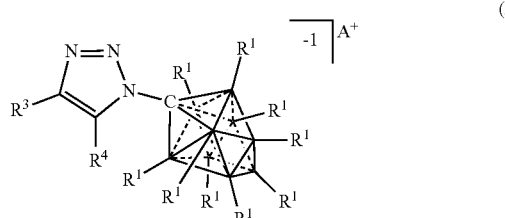
(XV)

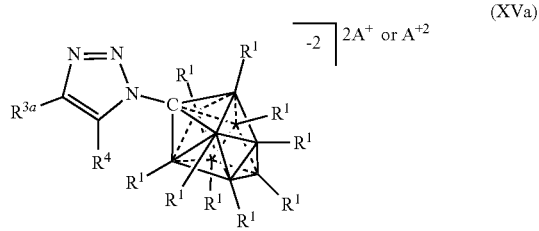
(XVa)

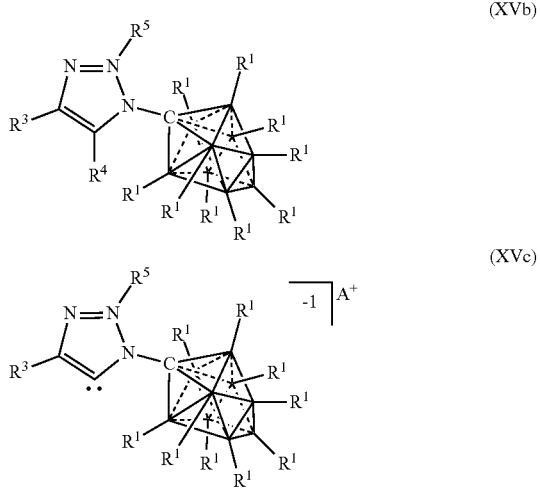
(XVb)

(XVc)

wherein

A is a cation;

each $R^1$ is independently selected from the group consisting of H, $C_{1-30}$alkyl, aryl, $OR^a$, $SR^a$, $NR^a_2$, F, Cl, Br, I, $C_{1-30}$haloalkyl, and perfluoroaryl; and $R^3$ is an optionally substituted aryl or an optionally substituted heteroaryl;

$R^{3a}$ is a twelve vertex carborane anion of Formula IIIa or a ten vertex carborane anion of Formula Ia or IIa

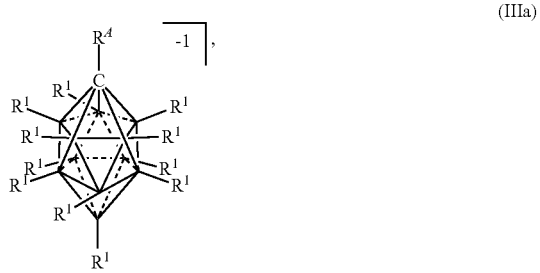
(IIIa)

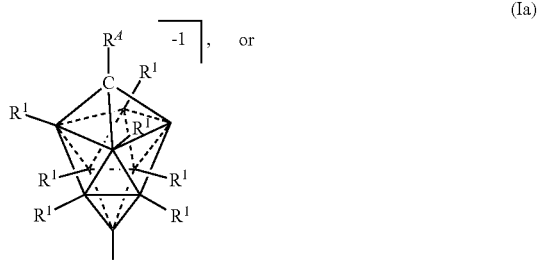
(Ia) or

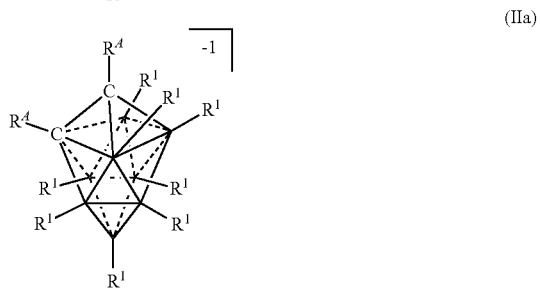
(IIa)

wherein each $R^1$ group of the twelve vertex carboarane anion or ten vertex carborane anion are selected from the $R^1$ groups shown above, $R^A$ is selected from the group consisting of H, $C_{1-30}$alkyl, aryl, $OR^a$, $SR^a$, $NR^a{}_2$, F, Cl, Br, I, $C_{1-30}$haloalkyl, and perfluoroaryl, and any $R^1$ or $R^A$ can serve as the point of attachment to the remainder of the compound;

$R^4$ is H, F, Cl, Br, I, $C_{1-30}$ alkyl, $C_{1-30}$ haloalkyl, $C_{1-30}$ alkoxy, $OR^a$, and $SR^a$;

$R^5$ is aryl, perflouoroaryl, $C_{1-30}$ alkyl or $C_{1-30}$haloalkyl; and each $R^a$ is independently selected from the group consisting of H, $C_{1-30}$alkyl, aryl, and silyl.

In some embodiments, the catalyst or battery component is represented by formula (XV)

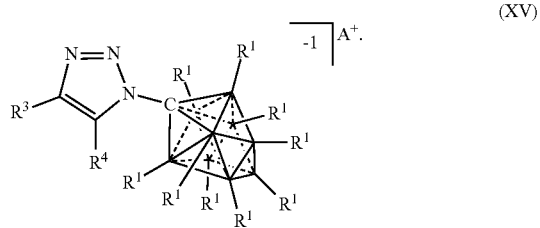

(XV)

In some embodiments, the catalyst or battery component is represented by formula (XVa)

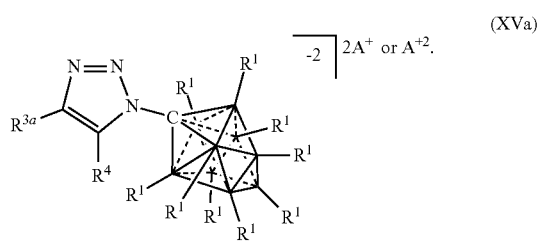

(XVa)

In some embodiments, the catalyst or battery component is represented by formula (XVb)

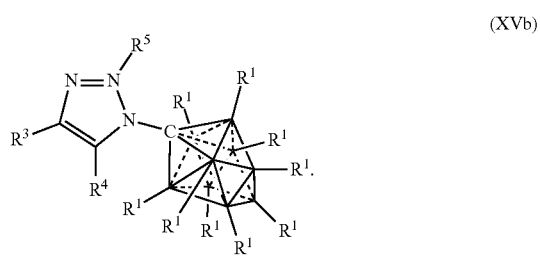

(XVb)

In some embodiments, the catalyst or battery component is represented by formula (XVc)

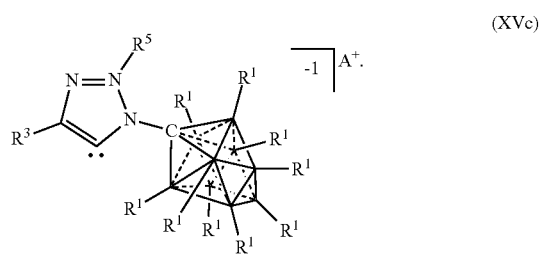

(XVc)

In some embodiments, A is a metal selected from the group consisting of Mg, Ca, Cs, Na, K, and Li. In some embodiments, A is a metal selected from the group consisting of K and Li. In some embodiments, A is $HN(CH_3)_3{}^+$.

In some embodiments, $R^4$ is H, F, Cl, Br, and I.

In some embodiments, $R^5$ is $C_{1-10}$alkyl.

In some embodiments, $R^3$ is optionally substituted phenyl.

In some aspects, the present disclosure provides a catalyst or battery component comprising a compound or complex selected from the formulas (XVI), (XVII), (XVIIa), (XVIIb), and (XVIIc)

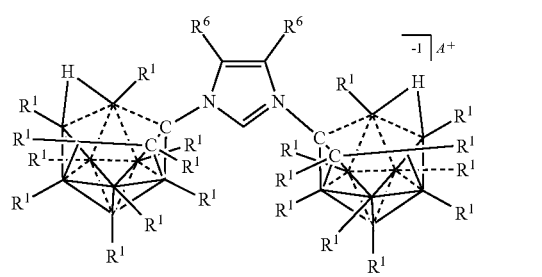

(XVI)

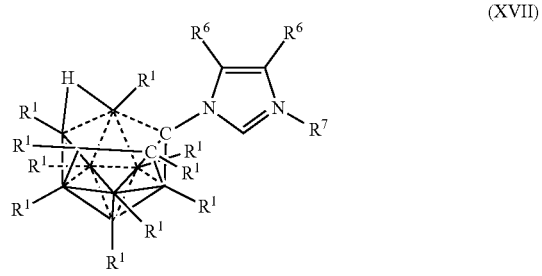

(XVII)

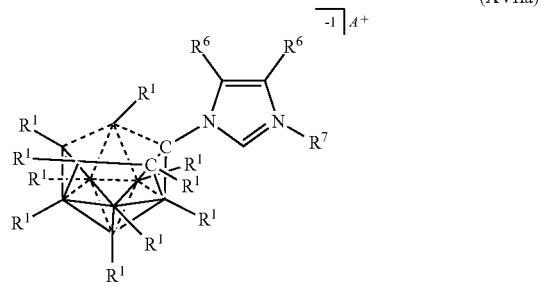

(XVIIa)

-continued (XVIIb)

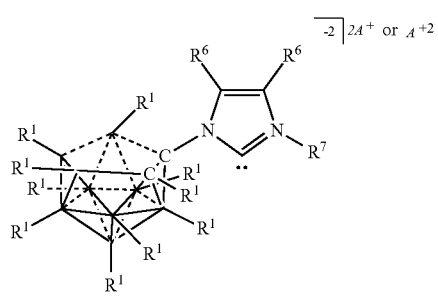

In some embodiments, the catalyst or battery component is represented by formula (XVII)

(XVII)

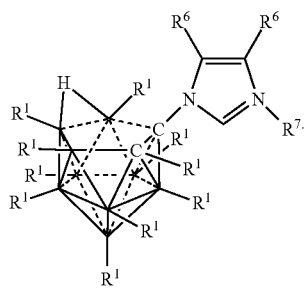

In some embodiments, the catalyst or battery component is represented by formula (XVIIa)

(XVIIa)

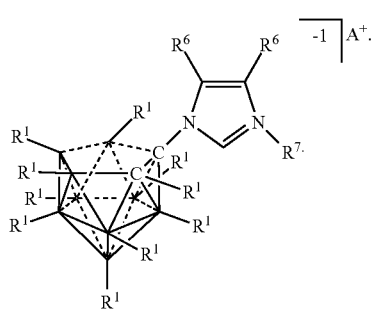

(XVIIc)

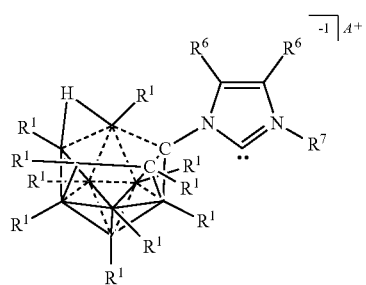

wherein

A is a cation;

each $R^1$ is independently selected from the group consisting of H, $C_{1-30}$alkyl, aryl, $OR^a$, $SR^a$, $NR^a{}_2$, F, Cl, Br, I, $C_{1-30}$haloalkyl, and perfluoroaryl; and each $R^6$ is H, F, Cl, Br, I, $C_{1-30}$ alkyl, $C_{1-30}$haloalkyl, $C_{1-30}$ alkoxy, $OR^a$, and $SR^a$;

$R^7$ is an optionally substituted aryl or an optionally substituted heteroaryl; and each $R^a$ is independently selected from the group consisting of H, $C_{1-30}$ alkyl, aryl, and silyl.

In some embodiments, the catalyst or battery component is represented by formula (XVI)

In some embodiments, the catalyst or battery component is represented by formula (XVIIb)

(XVIIb)

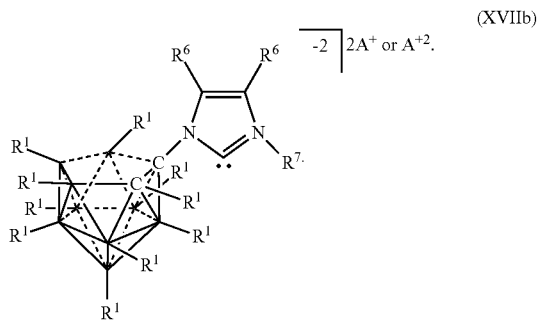

In some embodiments, the catalyst or battery component is represented by formula (XVIIc)

(XVI)

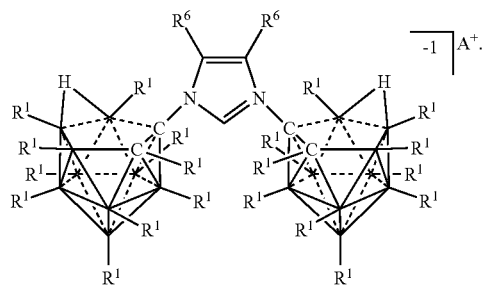

(XVIIc)

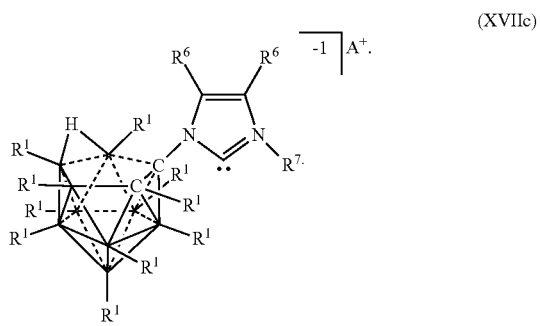

In some embodiments, A is a metal selected from the group consisting of Mg, Ca, Cs, Na, K, and Li. In some embodiments, A is a metal selected from the group consisting of Cs, K, and Li. In some embodiments, A is HN(CH$_3$)$_3$+.

In some embodiments R$^6$ is is H, F, Cl, Br, and I. In some embodiments, R$^6$ is is C$_{1-10}$alkyl In some embodiments, R$^7$ is optionally substituted phenyl. In some embodiments, R$^7$ is mesityl.

Methods of making the compounds described in this section are shown in the examples of this application. Most generally, heterocyclic rings are synthesized utilizing 10 and 11 vertex carbonyl amines to undergo a condensation reaction with ketones or aldehydes. Alternatively, heterocyclic rings with a carborane substituent can also be synthesized via Huisgen 1,3-dipolar cycloaddition. For catalysis, deprotonation of the heterocycle followed by complexation to a metal center affords the transition metal complex. Screening for catalytic activity is performed followed by optimization of reaction conditions.

Generally, the compounds of Formula (XIV), (XIVa), and (XIVb) are prepared by reacting two 10-vertex carboarane anions where R$^4$ is NH$_2$ under conditions sufficient to form a diimine linkage between the two 10-vertex carborane anions. The crude diamine is then converted to an imidazolium linkage. The various charges of the electrolytes of Formulas (XIVa) and (XIVb) are prepared by deprotonating particular carbons of imidazolium ring.

Typically, the compounds of Formula (XV), (XVa), (XVb), and (XVc) are prepared as shown in the diagram below:

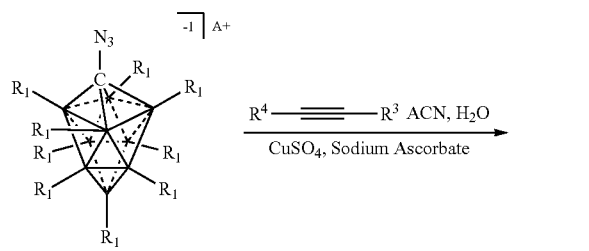

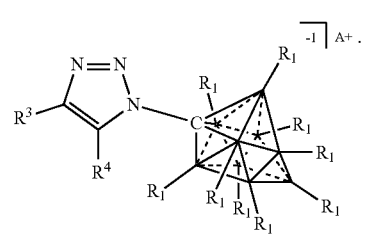

R$^1$, R$^3$, and R$^4$ in the diagram above are as defined herein. It is understood that R$^3$ shown above can be replaced when desired with R$^{3a}$. The various charges of the electrolytes of Formulas (XVa) and (XVc) are made by deprotonating particular carbons of the triazole ring, while the substitution of Formulas (XVb) and (XVc) can be made with an alkylating agent.

11-vertex Carbrane anions of the present disclosure can be prepared as shown the following diagram.

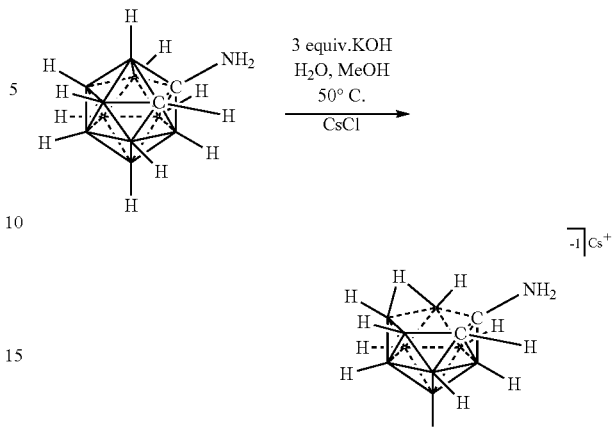

The compounds of formulas (XVI) are typically prepared as shown in the diagram below:

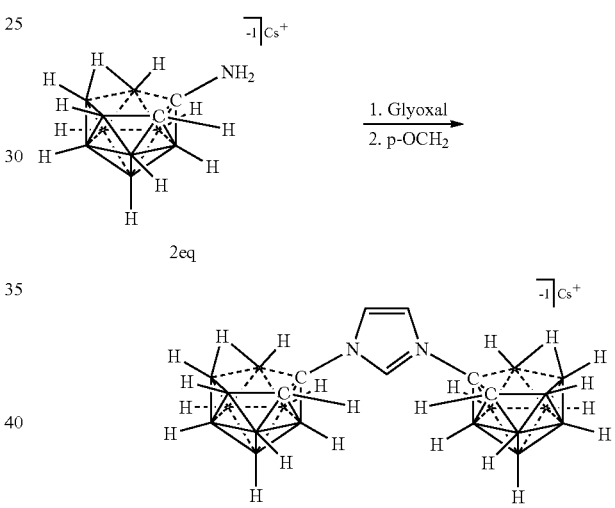

The compounds of formulas (XVII), (XVIIa), (XVIIb), and (XVIIc) can be prepared by reacting a nido carborane amine with an N-substituted 3-acetoxyazolinium under conditions to form an imidazolium linkage (An exemplary reaction scheme is shown below).

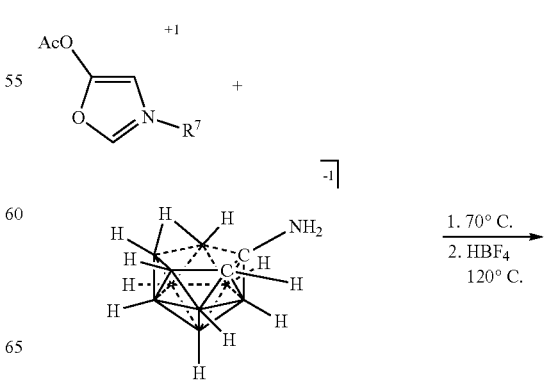

-continued

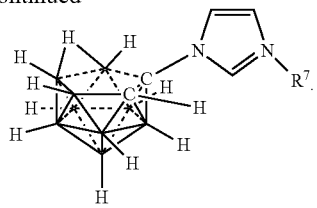

$R^7$ is as defined herein. The various charges of the electrolytes of Formulas (XVIIa), (XVIIb), and (XVIIc) are made by deprotonating particular carbons of the imidazolium ring with bases of appropriate strength as demonstrated herein.

For the synthesis of electrolyte components in batteries, a cation exchange is performed to obtain the desired ion. Depending on application the electrolyte is either dissolved for solution based, or dried for solid state electrolytes. The electrolyte is then incorporated into the corresponding device.

F. Electrochemical Device:

In another aspect, the present disclosure provides an electrochemical device, comprising:
an anode;
a cathode; and
an electrolyte of formula I, II, III, IV, V, VI, VII, VIII, IX, X, XI, XII, or XIII in contact with the anode and the cathode.

In some embodiments, the electrolyte is a compound or complex of formula (XIV), (XIVa), (XIVb), (XV), (XVa), (XVb), (XVc), (XVI), (XVII), (XVIIa), (XVIIb), or (XVIIc).

In some embodiments, the anode is Mg. In some embodiments, the anode comprises a magnesium-containing alloy. In some embodiments, the magnesium containing alloy comprises aluminum and zinc.

In some embodiments, the cathode is a sulfur-containing solid composite cathode. In some embodiments, the sulfur-containing solid composite cathode comprises elemental sulfur. In some embodiments, the sulfur-containing solid composite cathode comprises a surface modification. In some embodiments, the surface modification is a polymeric material. Examples of electronically conductive polymers used in sulfur-containing solid composite cathodes include polyanilines, polyacetylenes, polypyrroles, polythiophenes, polyphenylene-vinylenes, polythienylene-vinylenes, and polyphenylenes, as for example described in U.S. Pat. Nos. 5,529,860 and 5,690,702 to Skotheim et al. and in U.S. Pat. No. 5,686,201 to Chu.

In some embodiments, the cathode is selected from the group consisting of $MO_6S_8$, c-$TiS_2$, $FeSiO_4$, $MnO_2$, $MgFePO_4$. In some embodiments, the cathode is $MO_6S_8$ or c-$TiS_2$.

In some embodiments, the electrochemical device further comprising an aprotic solvent. In some embodiments, the aprotic solvent is selected from the group consisting of tetrahydrofuran (THF), dimethoxyethane (DME), and combinations thereof.

In some embodiments, the electrolyte is a solid-state electrolyte. In some embodiments the electrolyte is a solid that forms a stable ionic conducting interface with pure metal anodes. In some embodiments, the electrolyte is a solid powder. In some embodiments, the electrolyte is pressed into a solid pellet. A person of skill in the art will recognize that various known methods for preparing a solid-state electrolyte can be used with the electrolytes described herein.

In some embodiments, the electrolyte is stable towards electrochemical reduction at metal anodes.

In some embodiments the electrolyte is stable at an electrical potential greater than 0.5 V vs $Li^{0/+1}$. In some embodiments the electrolyte is stable at an electrical potential greater than 2 V vs $Li^{0/+1}$. In some embodiments the electrolyte is stable at an electrical potential greater than 4 V vs $Li^{0/+1}$. In some embodiments the electrolyte is stable at an electrical potential greater than 6 V vs $Li^{0/+1}$. In some embodiments the electrolyte is stable at an electrical potential greater than 7 V vs $Li^{0/+1}$.

In some embodiments, the electrolyte is stable at an electrical potential greater than 3 V vs $Mg^{0/+2}$. In some embodiments, the electrolyte is stable at an electrical potential greater than 3.5 V vs $Mg^{0/+2}$. In some embodiments, the electrolyte is stable at an electrical potential greater than 4 V vs $Mg^{0/+2}$. In some embodiments, the electrolyte is stable at an electrical potential greater than 4.5 V vs $Mg^{0/+2}$. In some embodiments, the electrolyte is stable at an electrical potential greater than 5 V vs $Mg^{0/+2}$.

In some embodiments the electrolyte is

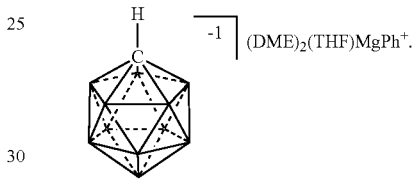

$(DME)_2(THF)MgPh^+$.

In another aspect of this invention, the electrolytes described above are coupled with suitable magnesium anodes, cathodes, and battery casing materials to produce rechargeable Mg battery power sources.

In one embodiment of this aspect of the invention, $2[MgPh^{+1}]$ is utilized as an electrolyte for a rechargeable Mg battery coin cell utilizing a Mg anode and a $Mo_6S_8$ cathode. The Mg—$Mo_6S_8$ batteries demonstrate performance consistent with other reported studies. Seeking a higher performance cathode material we next turned our attention to c-$TiS_2$, which was previously investigated by others because of its potential to store more Mg gravimetrically. Prior researchers reported that with organo-haloaluminate electrolytes, the reversible Mg intercalation-deintercalation in c-$TiS_2$ occurs only at elevated temperature (60° C.) and displayed only modest capacity and poor reversibility.

Figure 10:
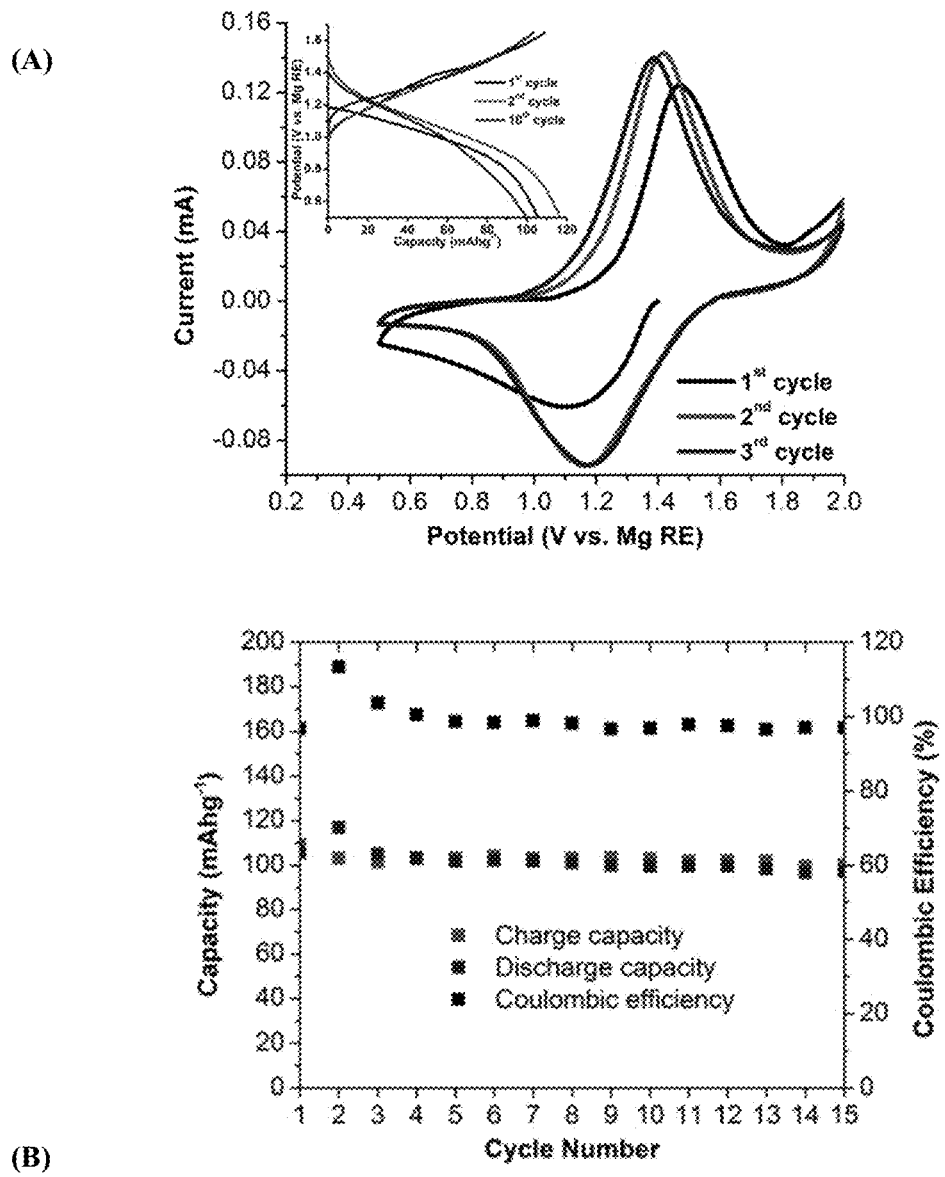
FIG. 10 (A) illustrates cyclic voltammetry cycling curves of c-$TiS_2$ vs. Mg with 0.1 $mVs^{-1}$ scan rate with $2[MgPh^{+1}]$ as the electrolyte; (A, insert) illustrates the galvanostatic charge-discharge potential curves; and (B) illustrates a cycle stability test.

Implementing $2[MgPh^{+1}]$ as an electrolyte overcomes this problem and for the first time reversible room temperature intercalation of Mg ions into c-$TiS_2$ is achieved. FIG. 10A shows the CV of c-$TiS_2$ vs. Mg with 0.1 mV s$^{-1}$ scan rate. It clearly reveals a cathodic peak at 1.2 V (Mg intercalation) and a corresponding anodic peak at 1.4 V (Mg deintercalation) with a narrow 200 mV peak separation. The galvanostatic charge-discharge potential curves also clearly demonstrate distinct plateaus with small charge-discharge hysteresis (FIG. 10A, inset). The cycle stability test shows stable capacity retention of 100 mA h g$^{-1}$ after 15 cycles (FIG. 10B).

Thus, the invention provides an electrolyte for practical high capacity Mg batteries. The reduction of reactive cations to form halide free electrolytes should be a broadly applicable method for the preparation of any electrolytes that will be suitable for Mg batteries. Since the anionic component of competent electrolytes must be chemically inert towards Mg, this method also serves as a chemical test to ensure electrolyte compatibility with the anode. The comproportionation strategy is an entry way into sophisticated highly oxidatively stable monocationic carborane salts containing organic or other anionic ligands, as exemplified by the preparation of 2[MgPh$^+$]. The observation that c-TiS$_2$ readily undergoes reversible Mg ion intercalation at ambient temperature when 2[MgPh$^+$] is utilized as an electrolyte demonstrates that cathode materials previously deemed unsuitable for Mg-batteries should be reinvestigated. Lastly, access to electrolytes that have oxidative stability beyond 4.5 V creates a novel paradigm for discovering entirely new high voltage cathode materials for the development of practical high capacity Mg-batteries.

In summary, the reduction of reactive cations and comproportionation, as routes to halide free electrolytes for rechargeable Mg batteries with unprecedented electrochemical stability. Reduction of [HNMe$_3^{+1}$][HCB$_{11}$H$_{11}^{-1}$] with metallic Mg affords the halide free carborane salt [Mg$^{+2}$][HCB$_{11}$H$_{11}^{-1}$]$_2$ without the formation of precious metal byproducts. Comproportionation with MgPh$_2$ affords the novel monocationic electrolyte [MgPh$^{+1}$][HCB$_{11}$H$_{11}^{-1}$], which displays enhanced solubility, conductivity, reversibly deposits/strips Mg with a low overpotential, and is oxidatively stable up to a remarkable 4.6 V vs. Mg$^{0/+2}$. The utility of this electrolyte is demonstrated by the preparation of efficient coin cells with Mo$_6$S$_8$, and for the first time cubic TiS$_2$, cathode materials.

Various aspects of the present disclosure are further illustrated with respect to the following Examples. It is to be understood that these Examples are provided to illustrate specific embodiments of the present disclosure and should not be construed as limiting the scope of the present disclosure in or to any particular aspect.

IV. Examples

Example 1

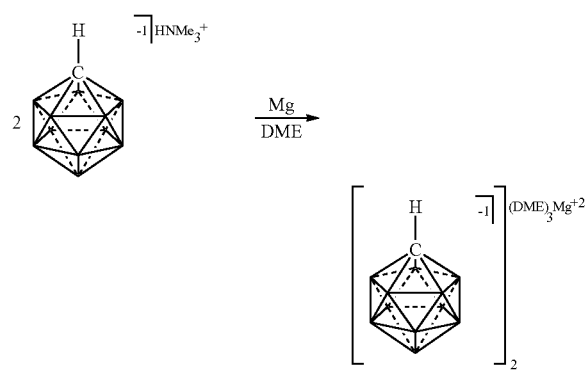

Trimethylammonium carba-closo-undecaborate [HCB$_{11}$H$_{11}^{-1}$][HNMe$_3^{+1}$] 2/HNMe$_3^+$ (2.0 g, 10.3 mmol) was added to a suspension of Mg powder (4.0 g, 165 mmol) in a minimal amount of THF (5 mL) and the resulting suspension was stirred for 1 hr. After 1 hr, additional THF (30 mL) was added and the suspension was left to stir for 24 hours. The THF solution was then filtered through a medium porosity fritted funnel. The collected precipitate of white powder and excess magnesium was washed with DME, dissolving the white powder of the collected precipitate. Unreacted magnesium powder was collected and reused. The DME solvent was removed under high vacuum, resulting in compound 2[Mg$^{+2}$] as a white powder in 91% yield (2.7 g 4.69 mmol). Once dried, compound 2[Mg$^{+2}$] is only soluble in DME at cold temperatures −30° C. (Note: Mg$^{2+}$ counter cation is coordinated by three DME molecules). $^1$H NMR (300 MHz, acetone-d$_6$, 25° C.): δ=3.46 (s, H), 3.28 (s, H), 2.50-0.75 (bm, 11H, B—H) ppm; $^{11}$B {$^1$H} NMR (96 MHz, acetone-d$_6$, 25° C.): δ=−3.2, −9.6, −12.6 ppm.

Example 2

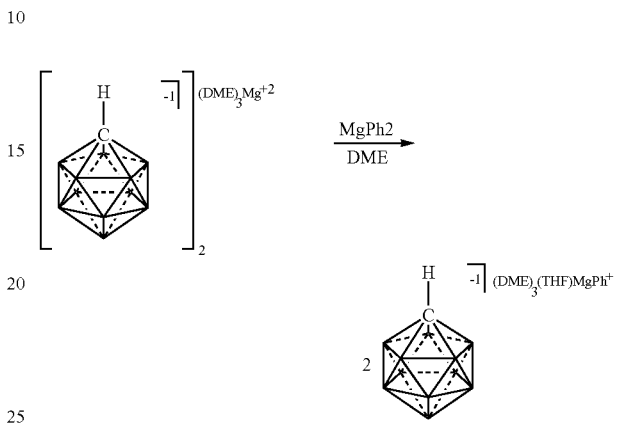

Crystalline Ph$_2$Mg (580 mg, 2.15 mmol) was dissolved in DME and added to a stirring suspension of 2[Mg$^{+2}$] (1.25 g, 2.15 mmol) in 10 mL DME. Addition of Ph$_2$Mg instantly solubilizes the suspension. DME is removed under high vacuum, affording 2[MgPh$^{+1}$] in 92% yield (1.97 g, 3.9 mmol). $^1$H NMR (400 MHz, THF-ds, 25° C.): δ=7.52 (d, $^3$J(H, H)=6.40 Hz, 2H), 6.95 (dd, $^3$J(H, H)=6.80, 8.61 Hz, 2H), 6.83 (t, $^3$J(H, H)=6.80 Hz, 1H), 2.2-0.85 (bm, 11H, B—H) ppm; $^{13}$C{$^1$H} NMR (300 MHz, THF-ds, 25° C.): δ=168.9 (ipso CH), 140.0, 124.9, 123.0 ppm; $^{11}$B{$^1$H} NMR (96 MHz, acetone-d$_6$, 25° C.): δ=−4.2, −10.6, −13.7 ppm. Reversible magnesium deposition and dissolution are successfully achieved using 2[MgPh$^{+1}$] in DME on a variety of current collectors in a three-electrode set up. The three-electrode set up are the same for all the following electrolytes. Counter and reference electrodes are both magnesium strips. The working electrode used include platinum (Pt), glassy carbon (GC), titanium (Ti), stainless steel (SS) and nickel (Ni). 2[MgPh$^{+1}$] demonstrates a conductivity of 1.24×10$^{-2}$ S cm$^{-1}$ with a concentration of 0.4M in DME. This electrolyte is stable up to 4.6 V vs. Mg$^{0/+2}$ on both Pt and GC. The anodic stability is 4.2 V on Ti and 3.5 V on both SS and Ni. Facile deposition and dissolution are achieved with small deposition overpotential ranging from 0.3-0.5 V and no dissolution overpotential with a coulombic efficiency higher than 95%.

Example 3

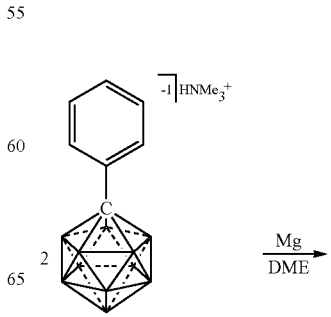

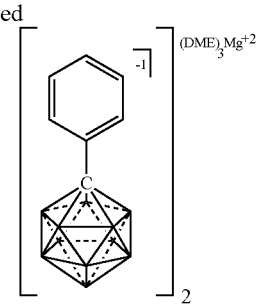

[C$_6$H$_5$CB$_{11}$H$_{11}$$^{-1}$][HNMe$_3$$^{+1}$] (2.0 g, 9.38 mmol) was added to a suspension of Mg powder (4.0 g, 165 mmol) in a minimal amount of THF (5 mL) and the resulting suspension was stirred for 1 hr. After 1 hr, additional THF (30 mL) was added and the suspension was left to stir for 24 hours. The THF solution was then filtered through a medium porosity fritted funnel. The collected precipitate of white powder and excess magnesium was washed with DME, dissolving the white powder of the collected precipitate. Unreacted magnesium powder was collected and reused. The DME solvent was removed under high vacuum, resulting in compound the magnesium salt as a white powder in 87% yield (3.6 g 8.16 mmol) (Note: Mg$^{2+}$ counter cation is coordinated to three DME molecules). This reaction is monitored by using $^1$HNMR by the loss of trimethyl ammonium counter cation peak at δ=3.19 ppm in acetone-d$_6$. $^{11}$B{$^1$H} NMR (96 MHz, acetone-d$_6$, 25° C.): δ=−3.8, −9.0 ppm.

Example 4

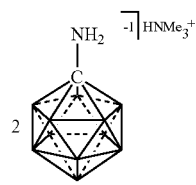

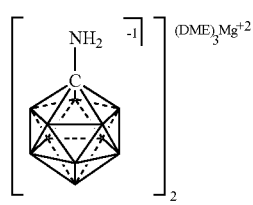

Magnesium 1-amino-1-carba-closo-undecaborate [H$_2$NCB$_{11}$H$_{11}$$^{-1}$][HNMe$_3$$^{+1}$] (1 g, 4.6 mmol) was added to a suspension of Mg powder (4.0 g, 165 mmol) in a minimal amount of THF (5 mL) and the resulting suspension was stirred for 1 hr. After 1 hr, additional THF (30 mL) was added and the suspension was left to stir for 24 hours. The THF solution was then filtered through a medium porosity fritted funnel. The collected precipitate of white powder and excess magnesium was washed with DME, dissolving the white powder of the collected precipitate. Unreacted magnesium powder was collected and reused. The DME solvent was removed under high vacuum, resulting in compound the magnesium salt as a white powder in 87% yield (0.4 g 2.0 mmol) (Note: Mg$^{2+}$ counter cation is coordinated to three DME molecules). This reaction is monitored by using $^1$HNMR by the loss of trimethyl ammonium counter cation peak at δ=3.19 ppm in acetone-d$_6$. Complex displays IR absorbance at 2541 cm$^{-1}$ corresponding to the product.

Example 5

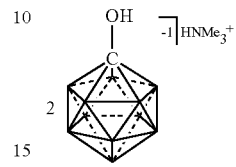

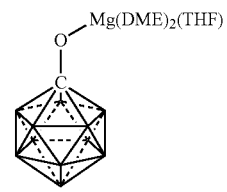

[HOCB$_{11}$H$_{11}$$^{-1}$][HNMe$_3$$^{+1}$] Trimethylammonium 1-hydroxy-1-carba-closo-undecaborate (1 g, 4.6 mmol) was added to a suspension of Mg powder (4.0 g, 165 mmol) in a minimal amount of THF (5 mL) and the resulting suspension was stirred for 1 hr. After 1 hr, additional THF (30 mL) was added and the suspension was left to stir for 24 hours. The THF solution was then filtered through a medium porosity fritted funnel. The collected precipitate of white powder and excess magnesium was washed with DME, dissolving the white powder of the collected precipitate. Unreacted magnesium powder was collected and reused. The DME solvent was removed under high vacuum, resulting in compound the magnesium salt as a white powder in 78% yield (0.3 g 1.8 mmol) (Note: Mg$^{2+}$ counter cation is coordinated to two DME and 1 THF molecules). This reaction is monitored by using $^1$HNMR by the loss of trimethyl ammonium counter cation peak at δ=3.19 ppm in acetone-d$_6$. Complex displays IR absorbance at 2543 cm$^{-1}$ corresponding to the product.

Example 6

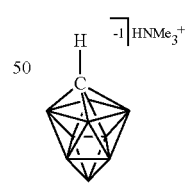

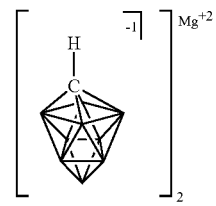

[HCB$_9$H$_9$$^{-1}$][HNMe$_3$$^{+1}$] 3/HNMe$_3$$^+$ (2.0 g, 11.1 mmol) was added to a glass shlenk with stir bar containing Mg powder (4.0 g, 165 mmol). Alternatively a ball mill can be used. The solid mixture was stirred and heated to 200° C.

under high vacuum and left to react for 1 week. Subsequent sieving of the mixture through a fine screen to remove any excess Mg resulted in the isolation of the magnesium carborane salt 3/Mg$^{+2}$ as a white powder in 85% yield (1.9 g 4.72 mmol) (Note: Mg$^{2+}$ is not coordinated by any solvent). $^{11}$B {$^{1}$H} NMR (96 MHz, acetone-d$_6$, 25° C.): δ=33.8, −15.4, −20.9 ppm. Electrochemical Impedance Spectroscopy shows that this material displays solid-state ionic conductivity of Mg-Ions and is thus useful for the construction of solid-state Mg batteries.

Example 7

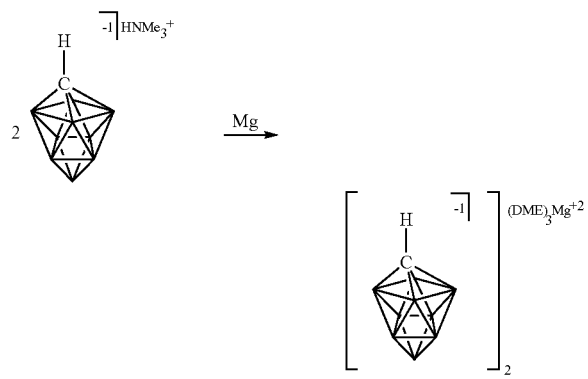

[HCB$_9$H$_9$$^{−1}$][HNMe$_3$$^{+1}$] 3/HNMe$_3$$^+$ (2.0 g, 11.1 mmol) was added to a suspension of Mg powder (4.0 g, 165 mmol) in a minimal amount of THF (5 mL) and the resulting suspension was stirred for 1 hr. After 1 hr, additional THF (30 mL) was added and the suspension was left to stir for 24 hours. The THF solution was then filtered through a medium porosity fritted funnel. The collected precipitate of white powder and excess magnesium was washed with DME, dissolving the white powder of the collected precipitate. Unreacted magnesium powder was collected and reused. The DME solvent was removed under high vacuum, resulting in the magnesium carborane salt 3/Mg$^{+2}$ as a white powder in 85% yield (1.9 g 4.72 mmol) (Note: Mg$^{2+}$ counter cation is coordinated to three DME molecules). This reaction is monitored by using $^1$HNMR by the loss of trimethyl ammonium counter cation peak at δ=3.19 ppm in acetone-d$_6$. $^{11}$B {$^{1}$H} NMR (96 MHz, acetone-d$_6$, 25° C.): δ=33.8, −15.4, −20.9 ppm. Reversible electrochemical deposition and dissolution are successfully achieved using this electrolyte with a concentration of 1M in tetraglyme on platinum working electrode.

Example 8

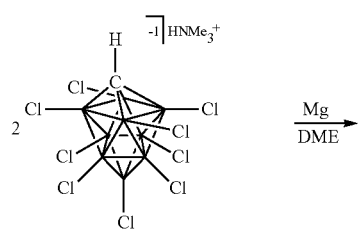

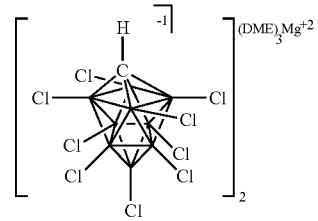

[HCB$_9$Cl$_9$$^{−1}$][HNMe$_3$$^{+1}$] (1.0 g, 2.0 mmol) was added to a suspension of Mg powder (4.0 g, 165 mmol) in a minimal amount of THF (5 mL) and the resulting suspension was stirred for 1 hr. After 1 hr, additional THF (30 mL) was added and the suspension was left to stir for 24 hours. The THF solution was then filtered through a medium porosity fritted funnel. The collected precipitate of white powder and excess magnesium was washed with DME, dissolving the white powder of the collected precipitate. Unreacted magnesium powder was collected and reused. The DME solvent was removed under high vacuum, resulting in the magnesium carborane salt as a white powder in 84% yield (0.6 g 0.86 mmol) (Note: Mg$^{2+}$ counter cation is coordinated to three DME molecules). This reaction is monitored by using $^1$HNMR by the loss of trimethyl ammonium counter cation peak at δ=3.19 ppm in acetone-d$_6$. $^{11}$B {$^{1}$H} NMR (96 MHz, acetone-d$_6$, 25° C.): δ=23.7, −0.9 ppm.

Example 9

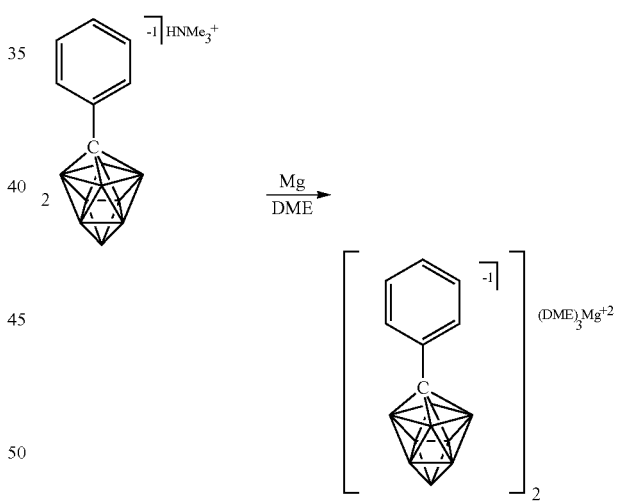

[C$_6$H$_5$CB$_9$H$_9$$^{−1}$][HNMe$_3$$^{+1}$] (2.0 g, 11.9 mmol) was added to a suspension of Mg powder (4.0 g, 165 mmol) in a minimal amount of THF (5 mL) and the resulting suspension was stirred for 1 hr. After 1 hr, additional THF (30 mL) was added and the suspension was left to stir for 24 hours. The THF solution was then filtered through a medium porosity fritted funnel. The collected precipitate of white powder and excess magnesium was washed with DME, dissolving the white powder of the collected precipitate. Unreacted magnesium powder was collected and reused. The DME solvent was removed under high vacuum, resulting in the magnesium salt as a white powder in 80% yield (2.3 g 4.76 mmol) (Note: Mg$^{2+}$ counter cation is coordinated to three DME molecules). This reaction is monitored by using $^1$HNMR by the loss of trimethyl ammonium counter cation peak at δ=3.19 ppm in acetone-$d_6$. $^{11}$B {$^1$H} NMR (96 MHz, acetone-$d_6$, 25° C.): δ=34.1, −10.8, −18.9 ppm.

Example 10

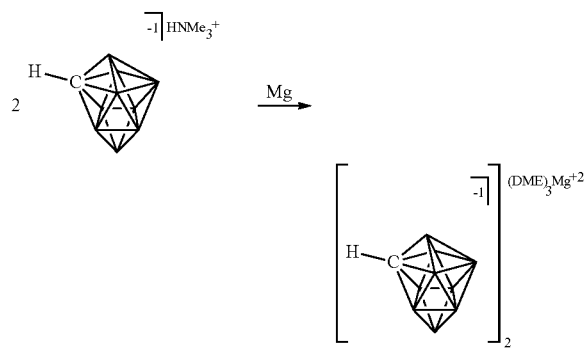

[closo-2-CB$_9$H$_{10}^{-1}$][HNMe$_3^{+1}$] (2.0 g, 11.1 mmol) was added to a suspension of Mg powder (4.0 g, 165 mmol) in a minimal amount of THF (5 mL) and the resulting suspension was stirred for 1 hr. After 1 hr, additional THF (30 mL) was added and the suspension was left to stir for 24 hours. The THF solution was then filtered through a medium porosity fritted funnel. The collected precipitate of white powder and excess magnesium was washed with DME, dissolving the white powder of the collected precipitate. Unreacted magnesium powder was collected and reused. The DME solvent was removed under high vacuum, resulting in the magnesium carborane salt as a white powder in 81% yield (1.8 g 4.50 mmol) (Note: Mg$^{2+}$ counter cation is coordinated to three DME molecules). This reaction is monitored by using $^1$HNMR by the loss of trimethyl ammonium counter cation peak at δ=3.19 ppm in acetone-$d_6$. Complex displays IR absobance at 2539 cm$^{-1}$ corresponding to the product.

Example 11

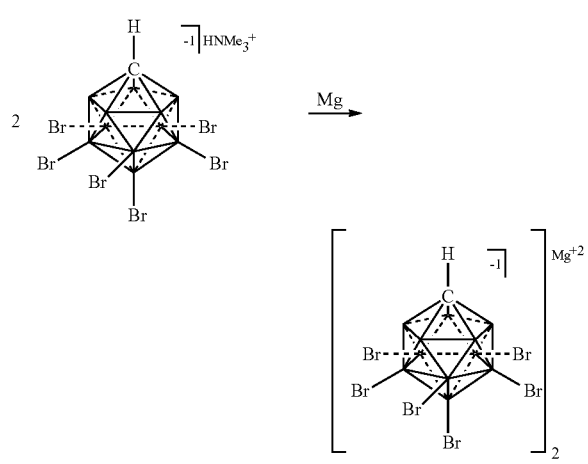

[HCB$_{10}$H$_5$Br$_6^{-1}$][HNMe$_3^{-1}$] (2.0 g, 2.9 mmol) was added to a suspension of Mg powder (4.0 g, 165 mmol) in a minimal amount of THF (5 mL) and the resulting suspension was stirred for 1 hr. After 1 hr, additional THF (30 mL) was added and the suspension was left to stir for 24 hours. The THF solution was then filtered through a medium porosity fritted funnel. The collected precipitate of white powder and excess magnesium was washed with DME, dissolving the white powder of the collected precipitate. Unreacted magnesium powder was collected and reused. The DME solvent was removed under high vacuum, resulting in the magnesium carborane salt as a white powder in 86% yield (1.2 g 1.3 mmol) (Note: Mg$^{2+}$ counter cation is coordinated to three DME molecules). This reaction is monitored by using $^1$HNMR by the loss of trimethyl ammonium counter cation peak at δ=3.19 ppm in acetone-$d_6$. Complex displays IR absobance at 2545 cm$^{-1}$ corresponding to the product.

Example 12

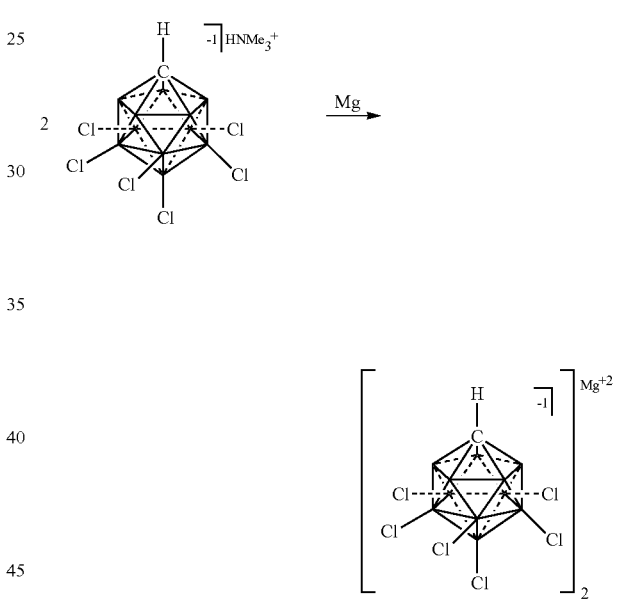

[HCB$_{10}$H$_5$Cl$_6^{-1}$][HNMe$_3^{+1}$] (2.0 g, 4.9 mmol) was added to a suspension of Mg powder (4.0 g, 165 mmol) in a minimal amount of THF (5 mL) and the resulting suspension was stirred for 1 hr. After 1 hr, additional THF (30 mL) was added and the suspension was left to stir for 24 hours. The THF solution was then filtered through a medium porosity fritted funnel. The collected precipitate of white powder and excess magnesium was washed with DME, dissolving the white powder of the collected precipitate. Unreacted magnesium powder was collected and reused. The DME solvent was removed under high vacuum, resulting in the magnesium carborane salt as a white powder in 88% yield (1.35 g 2.1 mmol) (Note: Mg$^{2+}$ counter cation is coordinated to three DME molecules). This reaction is monitored by using $^1$HNMR by the loss of trimethyl ammonium counter cation peak at δ=3.19 ppm in acetone-$d_6$. Complex displays IR absobance at 2535 cm$^{-1}$ corresponding to the product.

Example 13

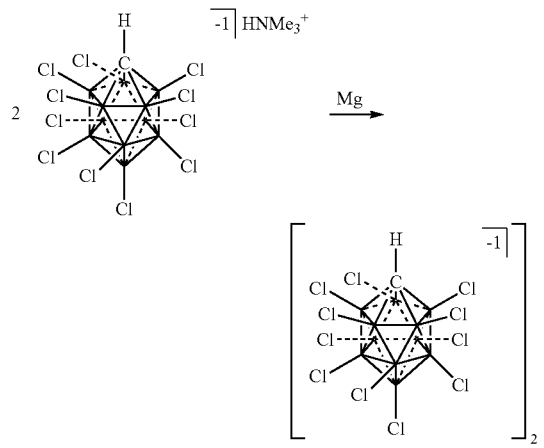

[HCB$_{10}$Cl$_{11}^{-1}$][HNMe$_3^{+1}$] (2.0 g, 3.4 mmol) was added to a suspension of Mg powder (4.0 g, 165 mmol) in a minimal amount of THF (5 mL) and the resulting suspension was stirred for 1 hr. After 1 hr, additional THF (30 mL) was added and the suspension was left to stir for 24 hours. The THF solution was then filtered through a medium porosity fritted funnel. The collected precipitate of white powder and excess magnesium was washed with DME, dissolving the white powder of the collected precipitate. Unreacted magnesium powder was collected and reused. The DME solvent was removed under high vacuum, resulting in the magnesium carborane salt as a white powder in 85% yield (1.2 g 1.5 mmol) (Note: Mg$^{2+}$ counter cation is coordinated to three DME molecules). This reaction is monitored by using $^1$HNMR by the loss of trimethyl ammonium counter cation peak at δ=3.19 ppm in acetone-d$_6$. $^{11}$B {$^1$H} NMR (96 MHz, acetone-d$_6$, 25° C.): δ=−2.1, −9.62, −12.7 ppm.

Example 14

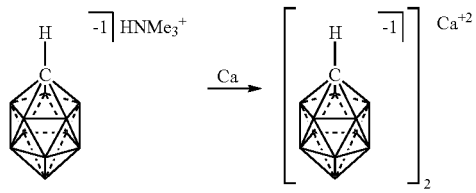

Figure 11:
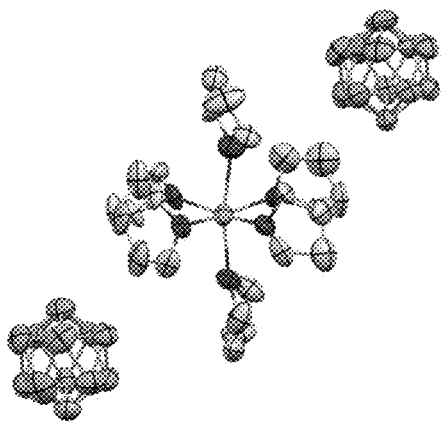
FIG. 11 shows the crystal structure of $Ca^{2+}$ when oxidized in accordance with an embodiment. Color code: teal=Ca; grey=carbon; brown=boron; red=oxygen.

Trimethylammonium carba-closo-undecaborate [HCB$_{11}$F$_{11}^{-1}$][HNMe$_3^{+1}$] 2/HNMe$_3^+$ (2.0 g, 10.3 mmol) was added to a suspension of Ca metal (4.0 g, 99.8 mmol) in a minimal amount of THF (5 mL) and the resulting suspension was stirred for 1 hr. After 1 hr, additional THF (30 mL) was added and the suspension was left to stir for 24 hours. The THF solution was then filtered through a medium porosity fritted funnel. The collected precipitate of white powder and excess calcium was washed with DME, dissolving the white powder of the collected precipitate. Unreacted calcium powder was collected and reused. The DME solvent was removed under high vacuum, resulting in compound [HCB$_{11}$H$_{11}^{-1}$]2[Ca$^{+2}$] as a white powder in 91% yield (3.4 g 4.48 mmol). FIG. 11 shows a crystal structure of the product, demonstrating that Ca$^{2+}$ counter cation is coordinated by six THF molecules.

Example 15

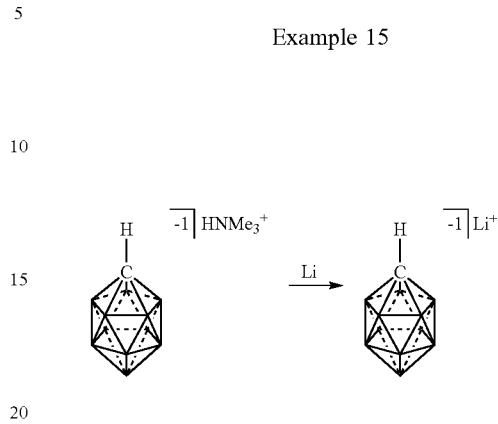

Trimethylammonium carba-closo-undecaborate [HCB$_{11}$H$_{11}^{-1}$][HNMe$_3^{+1}$] 2/HNMe$_3^+$ (2.0 g, 10.3 mmol) was added to a suspension of Li metal (4.0 g, 576.3 mmol) in a minimal amount of THF (5 mL) and the resulting suspension was stirred for 1 hr. After 1 hr, additional THF (30 mL) was added and the suspension was left to stir for 24 hours. The THF solution was then filtered through a medium porosity fritted funnel. Unreacted lithium powder was collected and reused. The THF solvent was removed under high vacuum, resulting in compound [HCB$_{11}$H$_{11}^{-1}$][Li$^+$] as a white powder in 94% yield (3.4 g 9.25 mmol). (Note: Li$^+$ counter cation is coordinated by three THF molecules). $^1$H NMR (300 MHz, acetone-d$_6$, 25° C.): δ=3.68 (s, H), 1.79 (s, H), 2.50-0.75 (bm, 11H, B—H) ppm; NMR (96 MHz, acetone-d$_6$, 25° C.): δ=−3.2, −9.6, −12.6 ppm.

Example 16

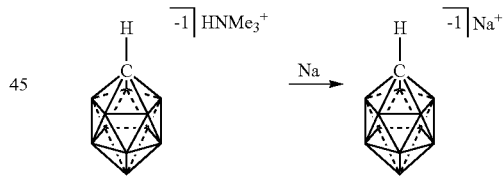

Trimethylammonium carba-closo-undecaborate [HCB$_{11}$H$_{11}^{-1}$][HNMe$_3^{+1}$] 2/HNMe$_3^+$ (2.0 g, 10.3 mmol) was added to a suspension of Na metal (4.0 g, 174.0 mmol) in a minimal amount of THF (5 mL) and the resulting suspension was stirred for 1 hr. After 1 hr, additional THF (30 mL) was added and the suspension was left to stir for 24 hours. The THF solution was then filtered through a medium porosity fritted funnel. Unreacted lithium powder was collected and reused. The THF solvent was removed under high vacuum, resulting in compound [HCB$_{11}$H$^{-1}$][Li$^+$] as a white powder in 90% yield (2.7 g 8.86 mmol). (Note: Na$^+$ counter cation is coordinated by two THF molecules). $^1$HNMR (300 MHz, acetone-d$_6$, 25° C.): δ=3.68 (s, H), 1.79 (s, H), 2.50-0.75 (bm, 11H, B—H) ppm; $^{11}$B {$^1$H} NMR (96 MHz, acetone-d$_6$, 25° C.): δ=−3.2, −9.6, −12.6 ppm.

Example 17

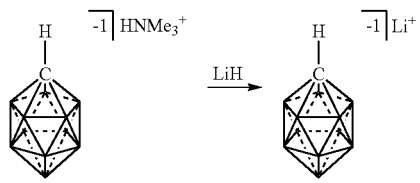

Trimethylammonium carba-closo-undecaborate [HCB$_{11}$H$_{11}$$^{-1}$][HNMe$_3$$^{+1}$] 2/HNMe$_3$$^+$ (2.0 g, 10.3 mmol) was added to a suspension of LiH powder (3.0 g, 377.4 mmol) in a minimal amount of THF (5 mL) and the resulting suspension was stirred for 1 hr. After 1 hr, additional THF (30 mL) was added and the suspension was left to stir for 24 hours. The THF solution was then filtered through a medium porosity fritted funnel. Unreacted lithium powder was collected and reused. The THF solvent was removed under high vacuum, resulting in compound [HCB$_{11}$H$_{11}$$^{-1}$][Li$^+$] as a white powder in 82% yield (3.0 g 8.07 mmol). (Note: Li$^+$ counter cation is coordinated by three THF molecules). $^1$HNMR (300 MHz, acetone-d$_6$, 25° C.): δ=3.68 (s, H), 1.79 (s, H), 2.50-0.75 (bm, 11H, B—H) ppm; NMR (96 MHz, acetone-d$_6$, 25° C.): δ=−3.2, −9.6, −12.6 ppm.

Example 18

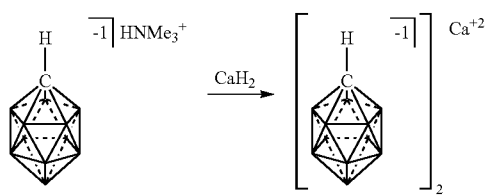

Trimethylammonium carba-closo-undecaborate [HCB$_{11}$H$_{11}$$^{-1}$][HNMe$_3$$^{+1}$] 2/HNMe$_3$$^+$ (2.0 g, 10.3 mmol) was added to a suspension of CaH$_2$ powder (4.0 g, 95.0 mmol) in a minimal amount of THF (5 mL) and the resulting suspension was stirred for 1 hr. After 1 hr, additional THF (30 mL) was added and the suspension was left to stir for 24 hours. The THF solution was then filtered through a medium porosity fritted funnel. The collected precipitate of white powder and excess calcium hydride was washed with DME, dissolving the white powder of the collected precipitate. Unreacted calcium hydride powder was collected and reused. The DME solvent was removed under high vacuum, resulting in compound [HCB$_{11}$H$_{11}$$^{-1}$]$_2$[Ca$^{+2}$] as a white powder in 86% yield (3.2 g 4.23 mmol). (Note: Ca$^{2+}$ counter cation is coordinated by six THF molecules). $^1$H NMR (300 MHz, acetone-d$_6$, 25° C.): δ=3.46 (s, H), 3.28 (s, H), 2.50-0.75 (bm, 11H, B—H) ppm; $^{11}$B {$^1$H} NMR (96 MHz, acetone-d$_6$, 25° C.): δ=−3.2, −9.6, −12.6 ppm.

Example 19

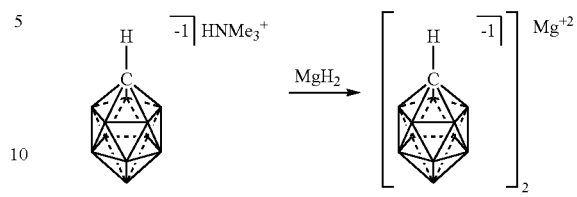

Trimethylammonium carba-closo-undecaborate [HCB$_{11}$H$_{11}$$^{-1}$][HNMe$_3$$^{+1}$] 2/HNMe$_3$$^+$ (2.0 g, 10.3 mmol) was added to a suspension of Mg Hydride (2.5 g, 95.0 mmol) in a minimal amount of THF (5 mL) and the resulting suspension was stirred for 1 hr. After 1 hr, additional THF (30 mL) was added and the suspension was left to stir for 24 hours. The THF solution was then filtered through a medium porosity fritted funnel. The collected precipitate of white powder and excess magnesium hydride was washed with DME, dissolving the white powder of the collected precipitate. Unreacted magnesium hydride powder was collected and reused. The DME solvent was removed under high vacuum, resulting in compound 2[Mg$^{+2}$] as a white powder in 80% yield (2.3 g 3.94 mmol). Once dried, compound 2[Mg$^{+2}$] is only soluble in DME at cold temperatures −30° C. (Note: Mg$^{2+}$ counter cation is coordinated by three DME molecules). $^1$HNMR (300 MHz, acetone-d$_6$, 25° C.): δ=3.46 (s, H), 3.28 (s, H), 2.50-0.75 (bm, 11H, B—H) ppm; $^{11}$B {$^1$H} NMR (96 MHz, acetone-d$_6$, 25° C.): δ=−3.2, −9.6, −12.6 ppm.

Example 20

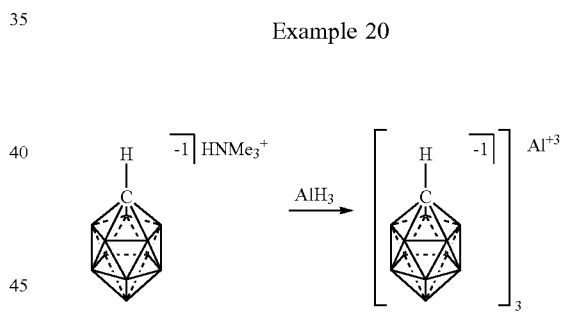

Trimethylammonium carba-closo-undecaborate [HCB$_{11}$H$_{11}$$^{-1}$][HNMe$_3$$^{+1}$] 2/HNMe$_3$$^+$ (2.0 g, 10.3 mmol) was added to a suspension of Aluminum Hydride (2.5 g, 83.4 mmol) in a minimal amount of THF (5 mL) and the resulting suspension was stirred for 1 hr. After 1 hr, additional THF (30 mL) was added and the suspension was left to stir for 24 hours. The THF solution was then filtered through a medium porosity fritted funnel. The precipitate of white powder and excess magnesium hydride was washed with DME, dissolving the white powder of the collected precipitate. Unreacted aluminum hydride powder was collected and reused. The DME solvent was removed under high vacuum, resulting in compound [HCB$_{11}$H$_{11}$$^{-1}$]$_3$[Al$^{+3}$] as a white powder in 76% yield (1.8 g 2.49 mmol). (Note: Al$^{+3}$ counter cation is coordinated by three DME molecules). $^1$H NMR (300 MHz, acetone-d$_6$, 25° C.): δ=3.46 (s, H), 3.28 (s, H), 2.50-0.75 (bm, 11H, B—H) ppm; {$^1$H} NMR (96 MHz, acetone-d$_6$, 25° C.): δ=−3.2, −9.6, −12.6 ppm.

Example 21

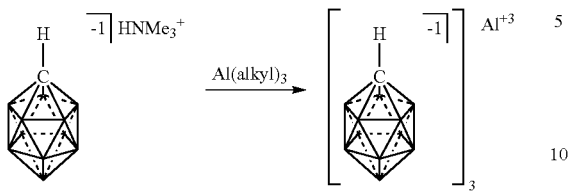

Trimethylammonium carba-closo-undecaborate [$HCB_{11}H_{11}^{-1}$][$HNMe_3^{+1}$] 2/$HNMe_3^+$ (2.0 g, 10.3 mmol) was added to a suspension of excess alkyl aluminum reagent of choice (examples include methyl aluminum and ethyl aluminum) in a minimal amount of THF (5 mL) and the resulting suspension was stirred for 1 hr. After 1 hr, additional THF (30 mL) was added and the suspension was left to stir for 24 hours. The THF solution was then filtered through a medium porosity fritted funnel. The collected precipitate of white powder and excess magnesium hydride was washed with DME, dissolving the white powder of the collected precipitate. Unreacted aluminum hydride powder was collected and reused. The DME solvent was removed under high vacuum, resulting in compound [$HCB_{11}H_{11}^{-1}$]$_3$ [$Al^{+3}$] as a white powder in 80% yield (1.9 g 2.63 mmol). (Note: $Al^{+3}$ counter cation is coordinated by three DME molecules). $^1H$ NMR (300 MHz, acetone-$d_6$, 25° C.): δ=3.46 (s, H), 3.28 (s, H), 2.50-0.75 (bm, 11H, B—H) ppm; $^{11}B$ {$^1H$} NMR (96 MHz, acetone-$d_6$, 25° C.): δ=-3.2, -9.6, -12.6

Example 22

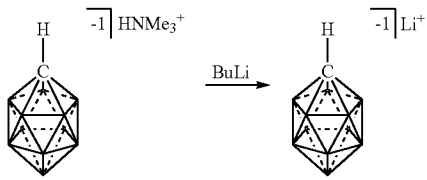

Trimethyl ammonium carba-closo-undecaborate [$HCB_{11}H_{11}^{-1}$][$HNMe_3^{+1}$] 2/$HNMe_3^+$ (2.0 g, 10.3 mmol) was added to vigorously stirring hexane. 2.5 M butyl lithium in hexane (3.9 mL) was added to the stirring suspension and was left stirring overnight (12 hours). The suspension was then filtered and the resulting white powder was placed on high vacuum for 3 hours resulting in [$HCB_{11}H_{11}^{-1}$][$Li^+$] 92% yield (1.4 g 9.06 mmol). (Note: $Li^+$ counter cation is not coordinated by any solvent molecules). $^1HNMR$ (300 MHz, acetone-$d_6$, 25° C.): 2.50-0.75 (bm, 11H, B—H) ppm; $^{11}B$ {$^1H$} NMR (96 MHz, acetone-$d_6$, 25° C.): δ=-3.2, -9.6, -12.6 ppm.

Example 23

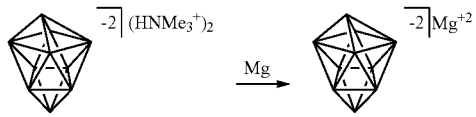

[$B_{10}H_{10}^{-2}$][$HNMe_3^{+1}$]$_2$ (1.0 g, 3.35 mmol) was added to vigorously stirring hexane. 2.5 M butyl lithium in hexane (1.34 mL) was added to the stirring suspension and was left stirring overnight (12 hours). The suspension was then filtered and the resulting white powder was placed on high vacuum for 3 hours resulting in [$B_{10}H_{10}^{-2}$][$Li^+$]$_2$ 88% yield (0.4 g 2.95 mmol). Complex displays IR absobance at 2535 $cm^{-1}$ corresponding to the product.

Example 24

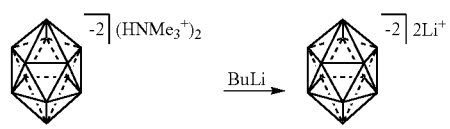

[$B_{12}H_{12}^{-2}$][$HNMe_3^{+1}$] (1.0 g, 1.36 mmol) was added to vigorously stirring hexane. 2.5 M butyl lithium in hexane (1.24 mL) was added to the stirring suspension and was left stirring overnight (12 hours). The suspension was then filtered and the resulting white powder was placed on high vacuum for 3 hours resulting in [$B_{12}H_{12}^{-2}$][$Li^+$]$_2$ 91% yield (0.4 g 2.86 mmol). (Note: $Li^+$ counter cation is not coordinated by any solvent molecules). $^1H$ NMR (300 MHz, acetone-$d_6$, 25° C.): δ=(s, H), 2.50-0.75 (bm, 11H, B—H) ppm.

Example 25

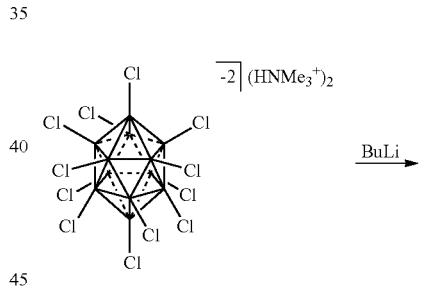

[$B_{12}Cl_{12}^{-2}$][$HNMe_3^{+1}$] (1.0 g, 1.36 mmol) was added to vigorously stirring hexane. 2.5 M butyl lithium in hexane (0.54 mL) was added to the stirring suspension and was left stirring overnight (12 hours). The suspension was then filtered and the resulting white powder was placed on high vacuum for 3 hours resulting in [$B_{12}Cl_{12}^{-2}$][$Li^+$]$_2$ 85% yield (0.7 g 1.16 mmol). (Note: $Li^+$ counter cation is not coordinated by any solvent molecules). $^1H$ NMR (300 MHz, acetone-$d_6$, 25° C.): δ=(s, H), 2.50-0.75 (bm, 11H, B—H) ppm; NMR (96 MHz, acetone-$d_6$, 25° C.): δ=-11.5 ppm.

Example 26

Figure 12:
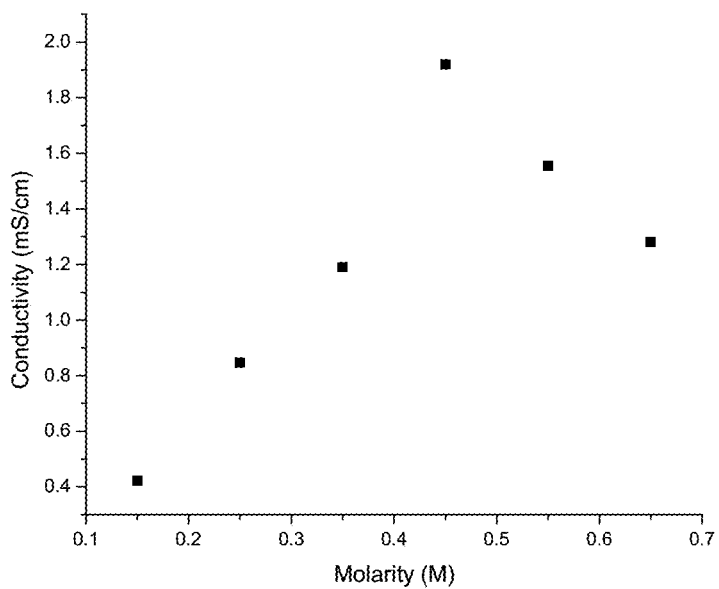
FIG. 12 illustrates the ionic conductivity of $Mg(CB_9H_9)_2$ in G4 as function of salt concentration.

Ionic Conductivity of Magnesium 1-carba closo decaborate(Mg(CB$_9$H$_9$)$_2$) in Tetraglyme The ionic conductivity of Mg(CB$_9$H$_9$)$_2$ in tetraglyme(G4) was first studied as the function of concentration. Conductivity of the electrolyte was measured using specially designed electrochemical cell with two 0.5 inch square Platinum (Pt) foil electrodes on either side of a cubical cell with 1 inch dimensions. 12 ml electrolyte was pipetted into the cell so as to completely immerse the Pt electrodes. Potentiostatic EIS program from Gamry reference 1000 potentiostat was used to measure the impedance across the cell for each concentration. Conductivity was calculated by using the following equation $$\sigma = \frac{l}{RA}$$

where σ is the conductivity, l is the distance between the electrodes, A is the cross sectional area and R is the resistance. The room temperature conductivity of Mg (CB$_9$H$_9$)$_2$ in G4 between 0.15-0.65M is shown in FIG. 12. A maximum conductivity of 1.9 mS·cm$^{-1}$ was achieved at 0.45M concentration, which is comparable to the optimal conductivity of Mg (CB$_{11}$H$_{12}$)$_2$ in tetraglyme (MMC/G4) of 1.8 mS·cm$^{-1}$ at a higher concentration of 0.75M proposed by Mohtadi et. al[1].

Example 27

Figure 13:
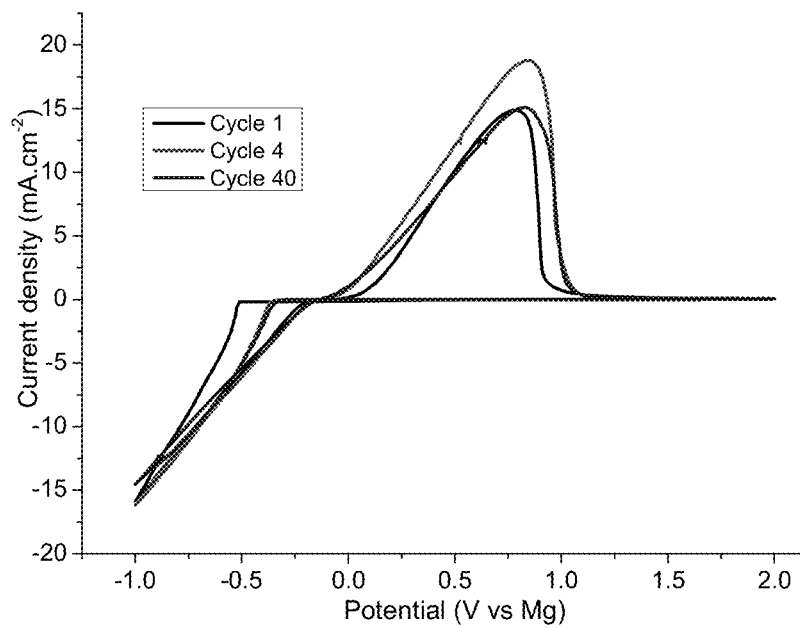
FIG. 13 illustrates circular voltammetry (CV) curves of Magnesium Deposition/Dissolution for 0.4M $Mg(CB_9H_9)_2$ in tetraglyme (G4) electrolyte
Figure 14:
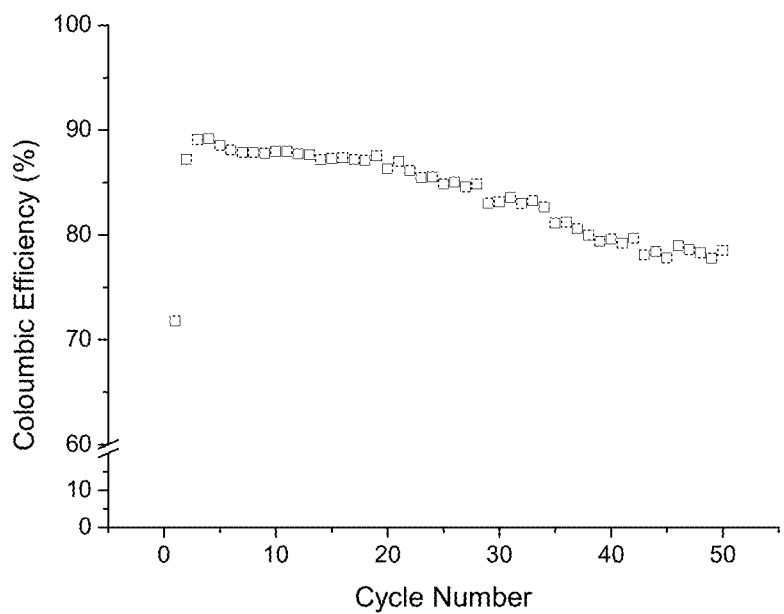
FIG. 14 illustrates the coulombic efficiency of 0.4M $Mg(CB_9H_9)_2$ in tetraglyme (G4) with respect to cycle number.

Mg deposition-dissolution, coulombic efficiency and anodic stability of the Mg (CB$_9$H$_9$)$_2$ in tetraglyme (G4) electrolyte were carried out in a 3-electrode cell system. Standard Pt electrode (3 mm dia) was used as working electrode with polished Mg foils as counter and reference electrodes respectively, Cyclic voltammetry was conducted between −1V to 2V for 50 cycles with a scan rate of 20 mV/s for coulombic efficiency measurements. The data from each cycle were manipulated and plotted to represent in the form of current (A) per inverse of time (s$^{-1}$). The area under the charge curve was calculated and was divided by the area under the discharge curve to get the coulombic efficiency for each cycle. FIG. 13 shows the cell performance at the first, fourth and fortieth cycle. The coulombic efficiency varied from 72% to 89 and down to 79% over the span of 50 cycles which is represented on FIG. 14.

Figure 15:
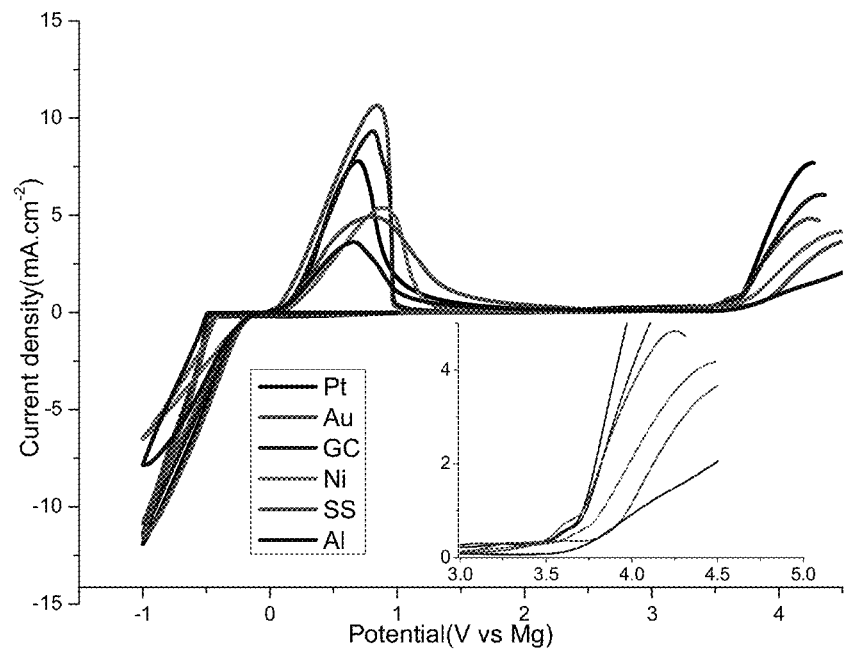
FIG. 15 illustrates circular voltammetry (CV) scans of 0.45M $Mg(CB_9H_9)_2$ in tetraglyme (G4) on various working electrodes (WE); (insert) enlargement of 3.0 to 5.0 V region of the anodic scan depicting the oxidative onset potentials.

Reversible Deposition/Dissolution was observed by conducting single cycle CV scan with extended anodic scan window to accommodate for the oxidative stability for six different working electrodes (W.E's) FIG. 15, namely Platinum (Pt), Gold (Au), Glassy Carbon (GC), Stainless Steel (SS), Nickel (Ni) and Aluminum (Al) with overpotentials ranging from 0.4 to 0.6 V depending on the working Electrode. High oxidative stability between 3.6 and 3.7V were observed for the above mentioned working electrodes. The anodic stability values of the Mg (CB$_9$H$_9$)$_2$ in G4 electrolyte is comparable to the MMC/G4 electrolyte reported by Mohtadi et. al (O. Tutusaus, R. Mohtadi, T. S. Arthur, F. Mizuno, E. G. Nelson and Y. V. Sevryugina, Angew. Chem., Int. Ed., 2015, 54, 7900).

Example 28

Figure 16:
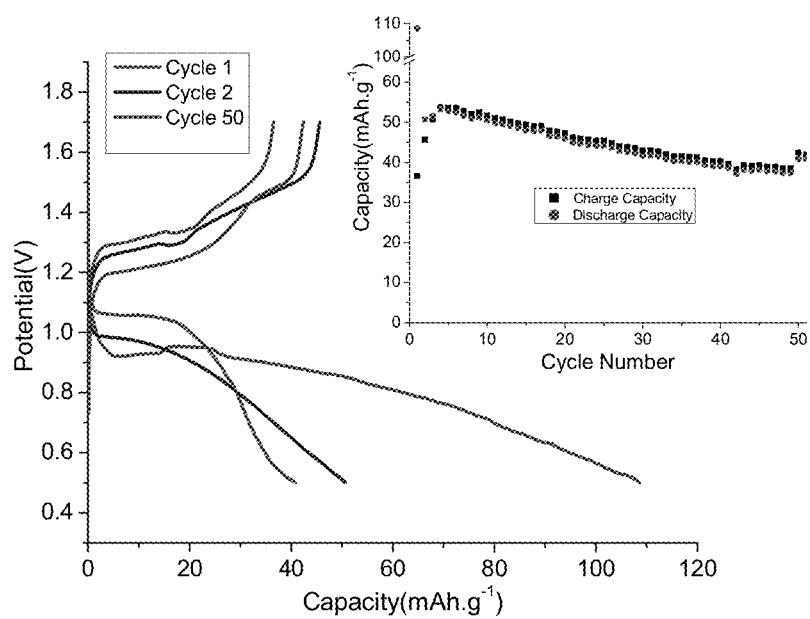
FIG. 16 illustrates charge/discharge profiles of selected cycles of a Mg-ion cell with 0.75M $Mg(CB_9H_9)_2$ in tetraglyme (G4) electrolyte and chevrel phase cathode. The current density was 12.9 $mA \cdot g^{-1}$; (inset) cycle stability of the cell over 50 cycles).

Mg-ion battery performances were demonstrated with coin cells with Mg anode and Chevrel phase Mo$_6$S$_8$ cathode (Note the electrolyte concentration used below is 0.75M). 304 stainless steel-CR2032 coin cells (20 mm diameter, 3.2 mm height) were used for Charge/Discharge performance of the electrolyte. Chevrel phase Mo$_6$S$_8$ (active material) was prepared by method previously established by Chevrel. et. al. (Chevrel, R., Sergent, M. & Prigent, J. Sur le nouvelles phases sulfurees ternaires du Molybdéne. I Solid State Chem. 3, 515-519 (1971). Mo$_6$S$_8$ electrodes were prepared by mixing 80 wt % active material, 10% carbon black and 10% Polyvinylidene fluoride (PVDF) in N-methyl-2-pyrrolidone (NMP). The mixed paste was then applied as a thin uniform coating on Nickel foil and the was dried in a vacuum oven overnight at about 50° C. 6 mm diameter disc were punched out as the cathode for the coin cells. Mo$_6$S$_8$ was placed on the bottom base of the CR2032 coin cells, 40 μl of the Mg (CB$_9$H$_9$)$_2$ in tetraglyme (G4) was pippeted onto the cathode. A polypropelene disc was carefully placed over the cathode and 60 μl electrolyte was added (total of 100 μl) to wet the seperator surface. A polished Mg disc of about 6 mm in diameter was placed on the wetted seperator the cell was then filled with two spacers and a washer to fill the base, the top cap was then placed on the top and the cell was hydraulically pressed to seal the cell. Prepared cells were cycled at a current density of 12.9 mA·g$^{-1}$. Initial discharge capacity of 108 mAh/g was observed, Discharge capacity of about 40 mAh/g was observed at the 50th cycle (FIG. 16).

Example 29

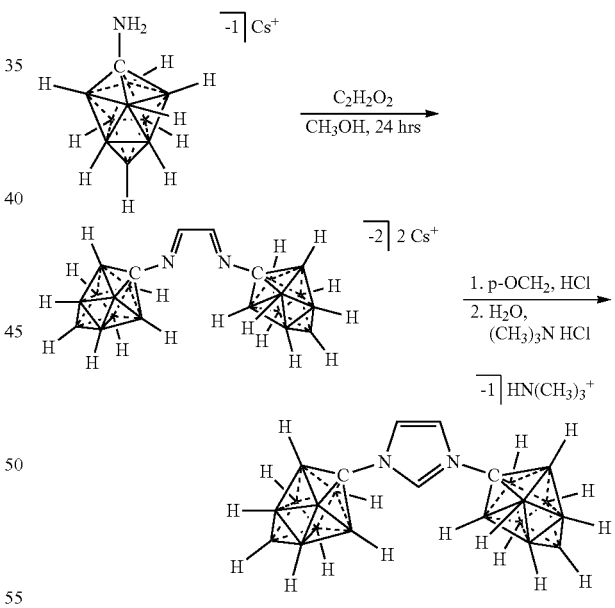

To a solution of CsNH$_2$CB$_9$H$_9$ (0.75 g, 2.8 mmol) in methanol (10 mL), 0.16 mL glyoxal (O$_2$C$_2$H$_2$) aqueous solution (40% w/w, 81.4 mg, 1.4 mmol) was added and the reaction mixture stirred for 24 hours. Volatiles were removed under vacuum to afford the crude diimine (Cs$^+$) as a brown powder. Crude diimine (Cs$^+$) was used for subsequent steps without further purification. A solution of HCl/dioxane (4.0 M, 1.85 mL) was added to paraformaldehyde (109 mg, 3.6 mmol) and stirred for 20 min. The mixture was then added to an EtOAc (7 mL) solution of the crude diimine (Cs$^+$) and the reaction mixture was stirred for 3 hours.

Subsequent removal of all volatiles under vacuum afforded the crude imidazolium salt $C_5N_2B_{18}H_{21}(Cs^+)$. The impurities are removed with boiling water, leaving the imidazolium as an insoluble precipitate. A salt exchange in room temperature $H_2O$ yields the corresponding $(HNMe_3^+)$ salt. Yield 67% (683 mg, 1.8 mmol) $^1$HNMR (300 MHz, acetone $d_6$, 25° C.): δ=10.26 (t, $^4$J (H, H)=1.7 Hz, 1H), 8.45 (d, $^4$J (H, H)=1.7 Hz, 2H), 3.18 (s, 9H, $Me_{HNMe3+}$), 3.25-0.05 (bm, 18H, B—H). $^{13}$C—($^1$H-dec) NMR (125 MHz, acetone-$d_6$, 25° C.): δ=139.3, 125.9, 45.5; $^{11}$B—($^1$Hdec) NMR (96 MHz, acetone-$d_6$, 25° C.): δ=31.0, −15.4, −21.2 ppm.

Example 30

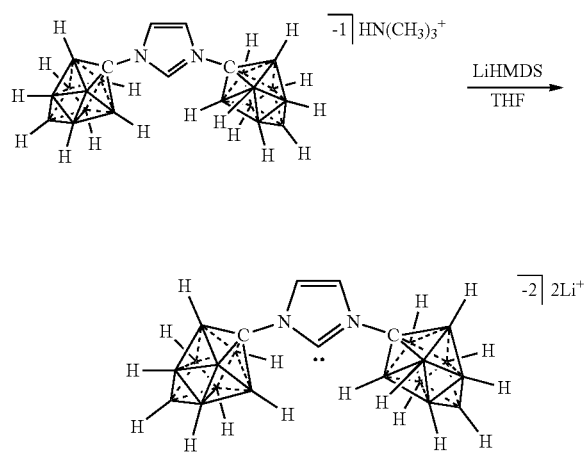

A vial with a stir bar was loaded with 210.0 mg (0.57 mmol) of imidazolium salt $C_5N_2B_{18}H_{21}(HNMe_3^+)$ and 2.1 equivalents (203 mg, 1.2 mmol) of LiHMDS. THF (10 mL) was subsequently added and the vial was capped and the mixture stirred for 1 hour. The reaction mixture was added dropwise to a stirring solution of diethyl ether, forming a suspension. After two hours, the solvent was decanted and remaining volatiles removed under vacuum, affording $C_5N_2B_{18}H_{20}(2Li^+)$ in 91% yield (462 mg, 0.52 mmol). (Note: Li$^+$ countercations contain 4 coordinated THF molecules). $^1$H NMR (500 MHz, THF-$d_8$, 25° C.): δ=7.75 (s, 2H), 3.25-0.05 (bm, 18H, B—H); $^{13}$C—($^1$H-dec) NMR (125 MHz, THF-$d_8$, 25° C.): δ=197.72, 121.58; $^{11}$B—($^1$H-dec) NMR (96 MHz, THF-ds, 25° C.): δ=31.4, −12.8, −22.2 ppm.

Example 31

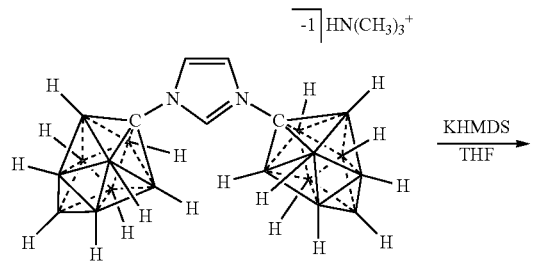

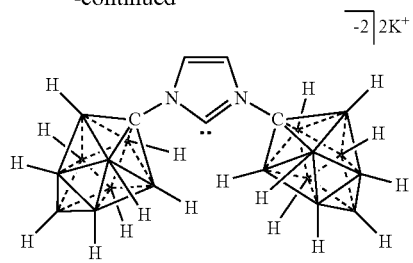

A vial with stir bar was loaded with 110.0 mg (0.30 mmol) of imidazolium salt $C_5N_2B_{18}H_{21}(HNMe_3^+)$ and 2.1 equivalents (0.126 mg, 0.62 mmol) of KHMDS. THF (10 mL) was subsequently added and the vial was capped and stirred for 1 hour. The reaction mixture was added dropwise to a stirring solution of diethyl ether, forming a suspension. After two hours, the solvent was decanted and remaining volatiles removed under high vacuum, affording $C_5N_2B_{18}H_{20}(2K^+)$ in 73% yield (210 mg, 2.19 mmol) (Note: K+ countercations contain 4 coordinated THF molecules). Crystals suitable for a single crystal X-ray diffraction study were grown from the diethyl ether wash by placing the solution in the freezer. $^1$H NMR (500 MHz, THF-$d_8$, 25° C.): δ=7.60 (s, 2H), 3.25-0.05 (bm, 18H, B—H); $^{11}$B—($^1$H-dec) NMR (96 MHz, THF-$d_8$, 25° C.): δ=30.5, −12.7, −22.1 ppm.

Example 32

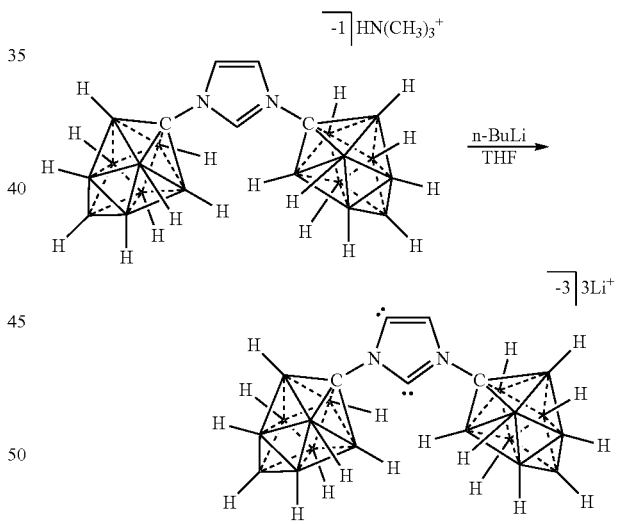

n-BuLi (2.5 M, in hexane, 0.62 mL, 1.59 mmol) was added to a vial and placed under vacuum for 30 minutes to remove the hexane solvent. The n-BuLi was redissolved in THF (10 mL) and added to a separate vial containing $C_5N_2B_{18}H_{21}(HNMe_3^+)$ (170 mg, 0.47 mmol). The mixture was stirred for 3 hours. The reaction mixture was added dropwise to a stirring solution of diethyl ether, forming a suspension. After two hours, the solvent was decanted, leaving $C_5N_2B_{18}H_{19}(3Li^+)$ as a precipitate. The remaining volatiles were removed from the precipitate under vacuum, resulting in 92% yield (514 mg, 0.43 mmol) (Note: Li+ countercations contain 4 coordinated THF molecules). $^1$H NMR (400 MHz, THF-ds, 25° C.): δ=7.06 (s, 1H), 2.60-0.50

(bm, 18H, B—H); $^{11}$B—($^{1}$H-dec) NMR (96 MHz, THF-ds, 25° C.): δ=23.2, −18.2, −27.3 ppm.

Example 33

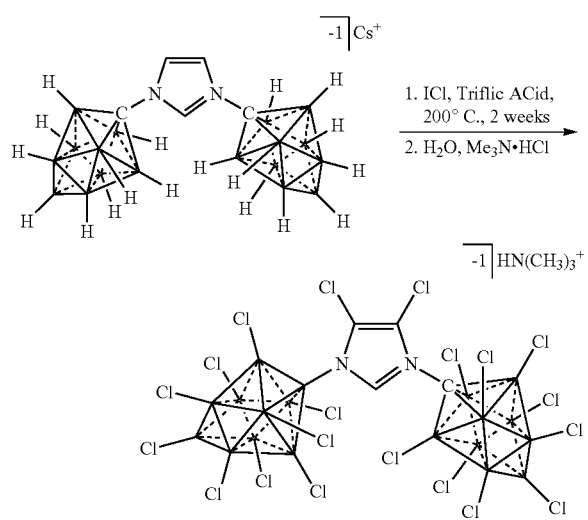

A Teflon lined reaction vessel was loaded with 920.0 mg (21 mmol) of $C_5N_2B_{18}H_{21}$ (Cs$^+$), excess ICl and 35 mL triflic acid. The reaction vessel was sealed and heated in a copper bath at 200° C. for two weeks. The solution of ICl and triflic acid were removed via distillation from the crude $C_5N_2HB_9Cl_{20}$(Cs$^+$). A cation exchange was performed in $H_2O$ yielding $C_5N_2HB_9Cl_{20}$(HNMe$_3$+), 90% (1.99 grams, 1.8 mmol). $^1$HNMR (400 MHz, THF-ds, 25° C.): δ=9.5 (s, 1H). $^{13}$C ($^1$H-dec) NMR (125 MHz, THF-ds, 25° C.): δ=141.7, 124.8; $^{11}$B NMR (96 MHz, THF-ds, 25° C.): δ=27.6, −0.05, −2.8 ppm.

Example 34

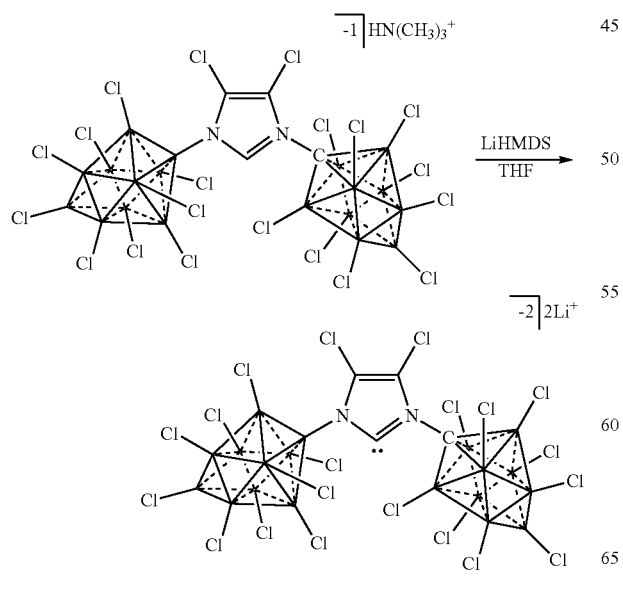

A vial with a stir bar was loaded with 130.0 mg (0.12 mmol) of $C_5N_2HB_9Cl_{20}$(HNMe$_3$$^+$) and 2.1 equivalents (43 mg, 0.26 mmol) of LiHMDS. THF (7 mL) was subsequently added and the vial was capped and the mixture stirred for 2 hours. The reaction mixture was added dropwise to a stirring solution of diethyl ether, forming a suspension. After two hours, the solution was decanted and remaining volatiles removed under high vacuum, affording Li$^+$ in 87% yield (206 mg, 0.11 mmol) (Note: Li+ countercations contain 4 coordinated THF molecules). Crystals suitable for a single crystal X-ray diffraction study were grown from the diethyl ether wash by placing the solution in the freezer. $^{13}$C ($^1$H dec) NMR (125 MHz, THF-ds, 25° C.): δ=238.96, 117.9; $^{11}$B—($^1$H-dec) NMR (96 MHz, THF-ds, 25° C.): δ=−10.1, −14.2 ppm.

Example 35

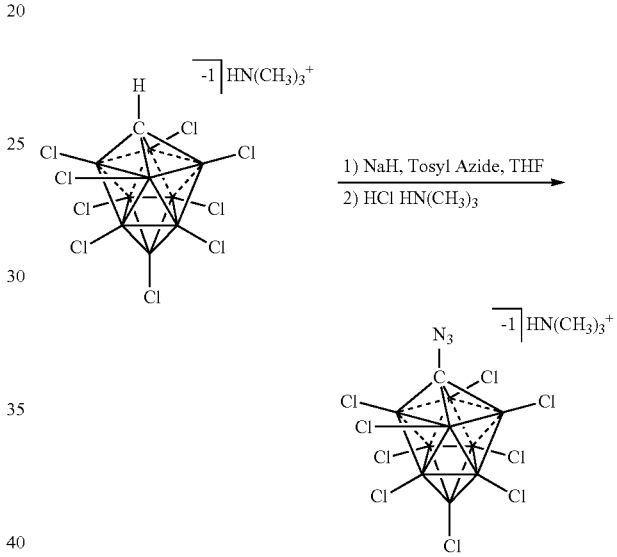

[HCB$_9$Cl$_9$]$^-$(HNMe$_3$)$^+$ (2.0 g, 4.1 mmol) was added to a suspension of NaH (0.3 g 12.5 mmol) in 10 mL THF. This mixture was stirred for 1 hour and then the solution was filtered and pumped to dryness. Tosyl azide (1.05 g, 5.3 mmol) dissolved in 10 ml of THF was then added to the dry solid and this mixture was stirred for 1 hour. Then the reaction was then pumped to dryness. 90% yield 1.6 g, 3.7 mmol $^{11}$B {$^1$H} NMR (193 MHz, acetone): δ=15.4, δ=−6.6, 6=−8.5.

Example 36

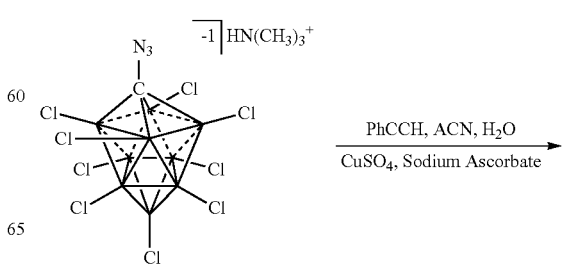

69

-continued

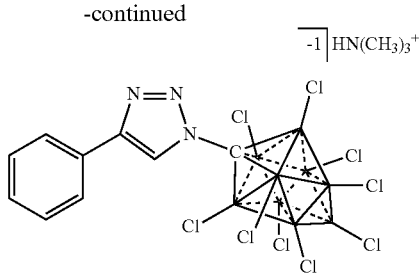

[N$_3$CB$_9$Cl$_9$]$^-$ (HNMe$_3$)+(1.0 g, 1.9 mmol) was dissolved in CH$_3$CN (20 mL) and phenylacetylene (0.29 g, 2.8 mmol), and a mixture of CuSO4.5H2O (0.79 g, 3.1 mmol) and sodium ascorbate (3.09 g, 15 mmol) in water (10 ml) were then added. This mixture was then stirred for 16 hours then filtered and pumped to dryness. 78% yield 0.94 g, 1.5 mmol. $^1$H NMR (300 MHz, acetone d$_6$): δ=8.88 (s, 1H), δ=8.12 (m, 2H), δ=7.50 (m, 2H), δ=7.40 (m, 1H).

Example 37

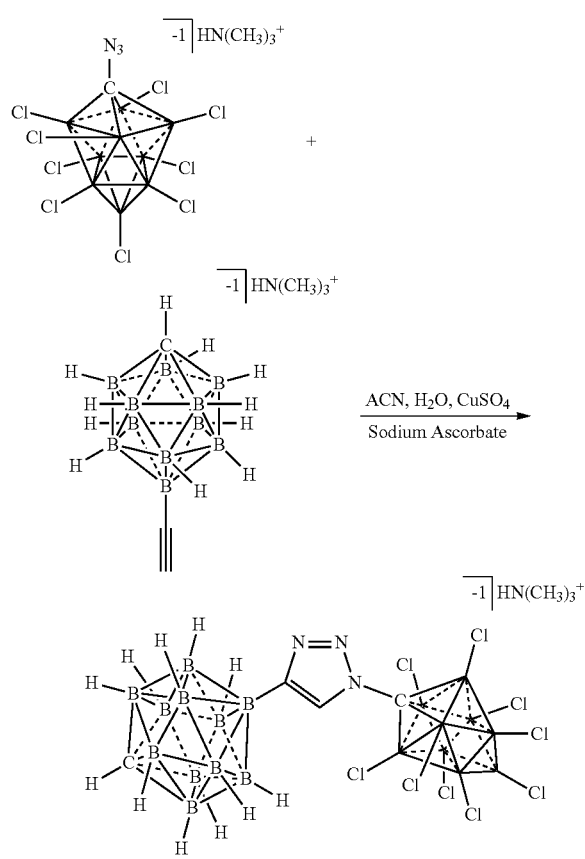

[N$_3$CB$_9$Cl$_9$]$^-$(HNMe$_3$)$^+$ (1.0 g, 1.9 mmol) was dissolved in CH$_3$CN (20 mL) and [HCB$_{11}$H$_{10}$C$_2$H](HNMe$_3$)$^+$(0.43 g, 1.9 mmol), and a mixture of CuSO4.5H2O (0.79 g, 3.1 mmol) and sodium ascorbate (3.09 g, 15 mmol) in water (10 ml) were then added. This mixture was then stirred for 16 hours then filtered and pumped to dryness. 60% yield 0.86 g, 1.1 mmol. $^{11}$B{$^1$H} NMR (193 MHz, acetone): δ=20.4, δ=4.2, δ−1.4, δ3.4, δ7.9, δ=−11.6.

70

Example 38

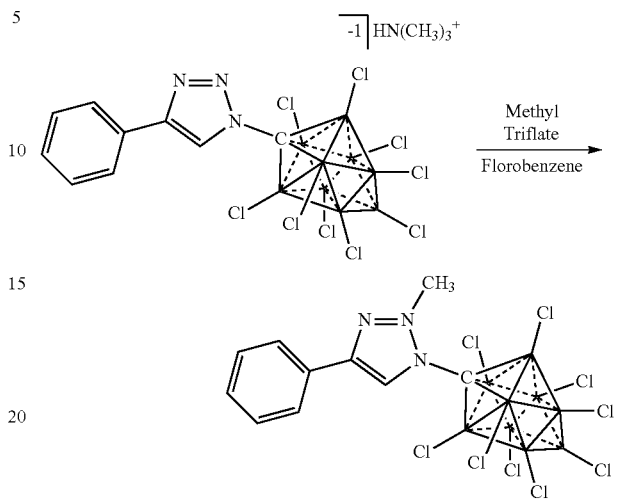

To a solution of triazol 1 (1.0 g, 1.6 mmol) in florobenzene (10 mL) methyl trifluoromethanesulfonate (0.29 g, 1.7 mmol) was added and the mixture was stirred for 12 hours. This mixture was pumped down and washed with hexane. 88% yield 0.83 g, 1.4 mmol. $^1$H NMR (300 MHz, THF d$_8$): δ=9.65 (s, 1H), δ=7.86 (m, 2H), δ=7.73. (m, 3H).

Example 39

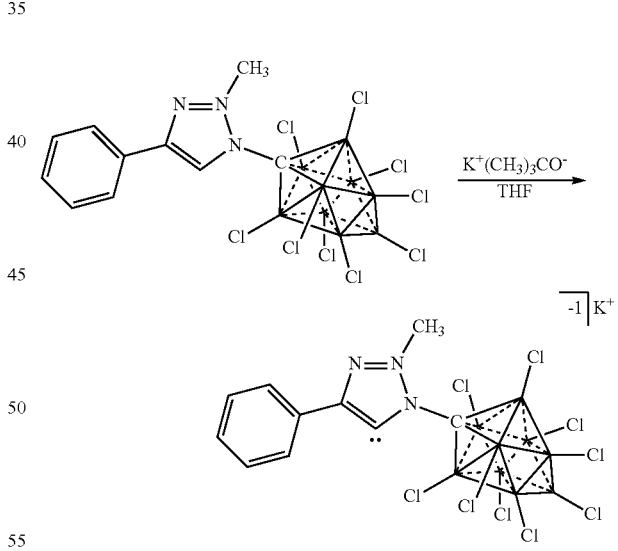

Methylated triazol 2 (0.1 g, 0.17 mmol) was dissolved in 5 mL of THF and potassium tert-butoxide (0.029 g, 0.26 mmol) was added and the reaction was stirred for 1 hour. The mixture was pumped down and dissolved in ether. 92% yield 0.13 g, 0.16 mmol. The solution was then placed in the freezer and crystals were obtained for x-ray diffraction study Showing one ether and two THF molecules coordinated to the potassium cation. $^{13}$C-(1H-dec) NMR (125 MHz, THF-d8, 25° C.): δ=197.81, δ=148.7, δ=132.0, δ=130.1, δ=129.5, δ=129.29, δ=36.7

Example 40

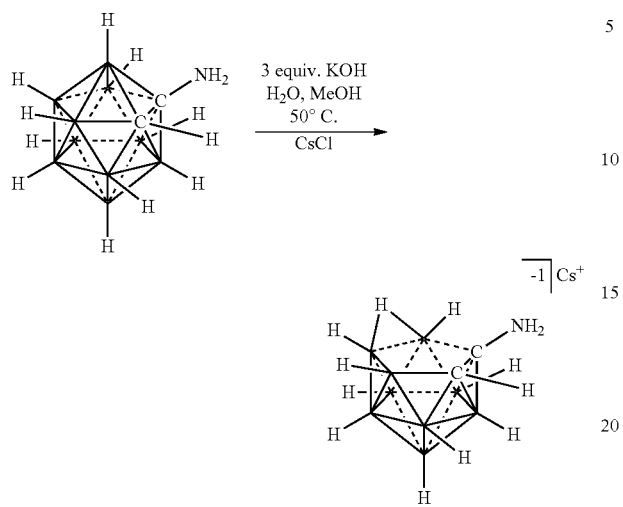

1.0 gram of $NH_2C_2B_{10}H_{11}$ was dissolved in 20 mL of MeOH and 20 mL of deionized water. After adding 3 equivalence of KOH (1.05 g) and refluxed overnight the reaction mixture was concentrated in vacuo and the resulting solid was recrystallized in deionized water containing 2 grams of CsCl (2 eq.) to afford the desired nido carborane amine $CsNH_2C_2B_9H_{11}$ in 90% yield (1.59 g, 0.56 mmol). $^1$H NMR (500 MHz, Acetonitrile-d3, 25° C.): 2.01 (bs, 2H, $NH_2$), 1.83 (bs, 1H, CH), −2.74 ppm (bs, 1H, bridging-H); $^{11}$B NMR (96 MHz, Acetonitrile-d3, 25° C.): −7.1, −8.9, −10.2, −13.5, −15.0, −19.6, −30.5, −33.4 ppm; $^{13}$C{$^1$H} NMR (126 MHz, Acetonitrile-d3, 25° C.): 74.6, 49.2 ppm.

Example 41

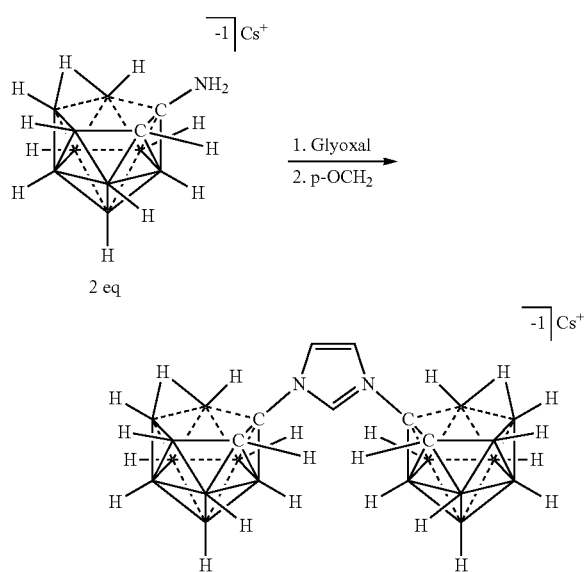

2 equivalents of nido carborane amine $CsNH_2C_2B_9H_{11}$ (1.0 gram, 3.5 mmol) were combined with glyoxal (0.103 g, 0.13 mL, 1.7 mmol) in 10 mL of MeOH affording the nido diimine which was concentrated in vacuo. The diimine was not isolated, but reacted further with the addition of 1 eq. of p-Formaldehyde (0.051 g, 1.7 mmol) in EtoAC with the addition of 1 eq. of HCl in ether. The resulting yellow solution was stirred for 3 hours at room temperature. Upon completion of the reaction, the yellow solution was concentrated in vacuo and recrystallized in acetonitrile to afford the cesium nido carborane symmetrical imidazolium $CsN_2C_7B_{18}H_{24}$ in 76% yield (0.591 g). $^1$HNMR (300 MHz, Acetonitrile-d3, 25° C.): 8.95 (t, 1H, CH) 7.43 (d, 2H, CH), −2.78 ppm (bs, 1H, bridging-H); $^{11}$B{$^1$H} NMR (96 MHz, Acetonitrile-d3, 25° C.): −4.9, −7.2, −9.5, −10.2, −17.5, −27.5, −31.9 ppm.

Example 42

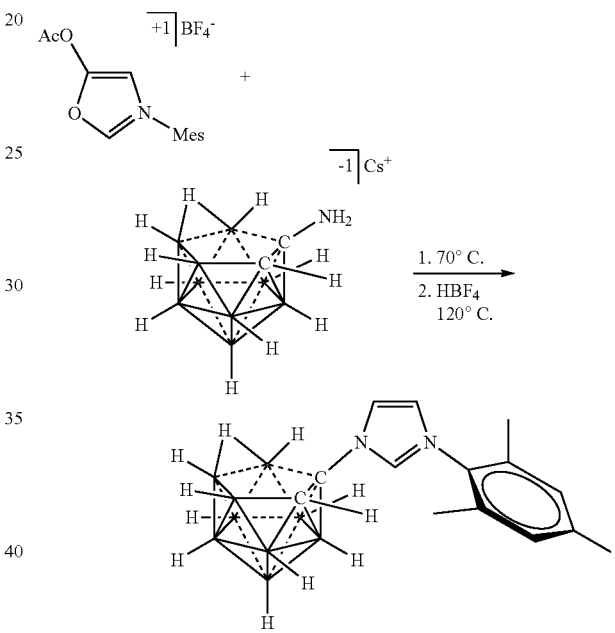

1 equivalent of nido carborane amine $CsNH_2C_2B_9H_{11}$ (1.0 gram, 3.5 mmol) was combined with the known 1-mesityl-3-acetoxyoxazolinium tetrafluoroborate (1.17 g, 3.5 mmol) in 15 mL of dry acetonitrile and heated under inert atmosphere overnight. To the resulting brown-yellow solution, $HBF_4$ was added (1 eq., 0.55 mL) and the resulting mixture was heated in a closed thick walled Teflon schlenk tube at 120° C. overnight. Upon completion of the reaction, the brown-yellow solution was filtered, then concentrated in vacuo, extracted with methylene chloride and filtered. The resulting product was recrystallized in acetonitrile to afford the desired product nido carborane unsymmetrical imidazolium in 75% yield (0.836 g). $^1$H NMR (500 MHz, THF-d8, 25° C.): 9.14 (dd, 1H, CH), 7.85 (dd, 1H, CH), 7.52 (dd, 1H, CH), 7.11 (s, 2H, meta-CH) 2.34 (s, 3H, $CH_3$) 2.03 (s, 6H, $CH_3$) 1.73 (bs, 1H, $CH_{carborane}$) −2.58 ppm (bs, 1H, bridging-H); $^{11}$B NMR (96 MHz, battery compd3, 25° C.): −4.9, −7.1, −9.7, −17.4, −27.7, −32.0 ppm; $^{13}$C{$^1$H} NMR (126 MHz, THF-d8, 25° C.): 141.8, 137.6, 135.2, 132.1, 130.1, 124.6, 123.9, 71.6, 42.1, 20.9, 17.0 ppm.

Example 43

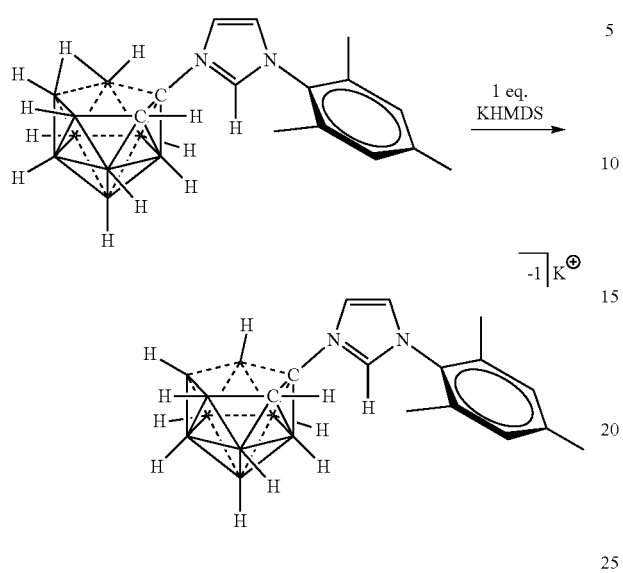

1.1 equivalents of KHMDS was added to a THF solution of the unsymmetrical imidazolium (0.50 g, 1.56 mmol), stirred for 15 minutes and pumped to dryness. The resulting residue was then washed with diethyl ether twice (2×4 mL) affording the desired carbollide imidazolium quantitatively. $^1$H NMR (300 MHz, THF-d8, 25° C.): 8.43 (bs, 1H, CH), 7.56 (s, 1H, CH), 7.08 (s, 1H, CH), 7.00 (s, 2H, meta-CH), 2.30 (s, 3H, CH$_3$), 1.99 (s, 6H, CH$_3$), 1.34 (bs, 1H, CH$_{carborane}$).

Example 44

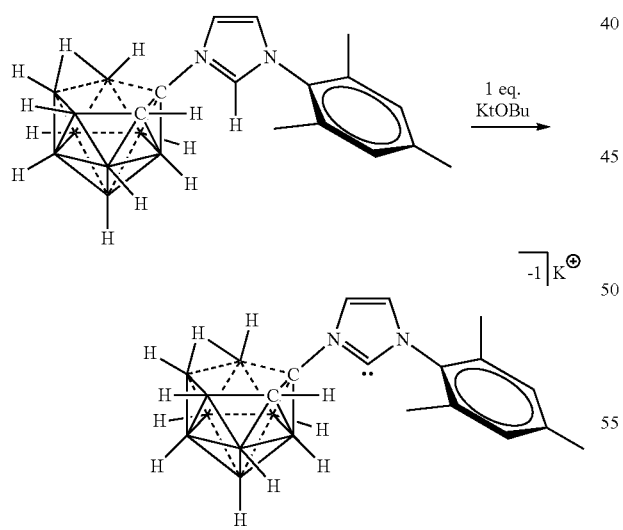

1.0 equivalent of KtOBu was added to a THF solution of the unsymmetrical imidazolium (0.50 g, 1.56 mmol), stirred for 30 minutes and pumped to dryness. The resulting residue was then washed with diethyl ether twice (2×4 mL) affording the desired nido carborane unsymmetrical NHC in quantitative yield. $^1$H NMR (300 MHz, THF-d8, 25° C.): 7.29 (bs, 1H, CH), 6.95 (s, 2H, meta-CH), 6.80 (bs, 1H, CH), 2.29 (s, 3H, CH$_3$), 1.96 (s, 6H, CH$_3$), 1.93 (bs, 1H, CH$_{carborane}$), 0.24 (bs, 1H, bridging-H).

Example 45

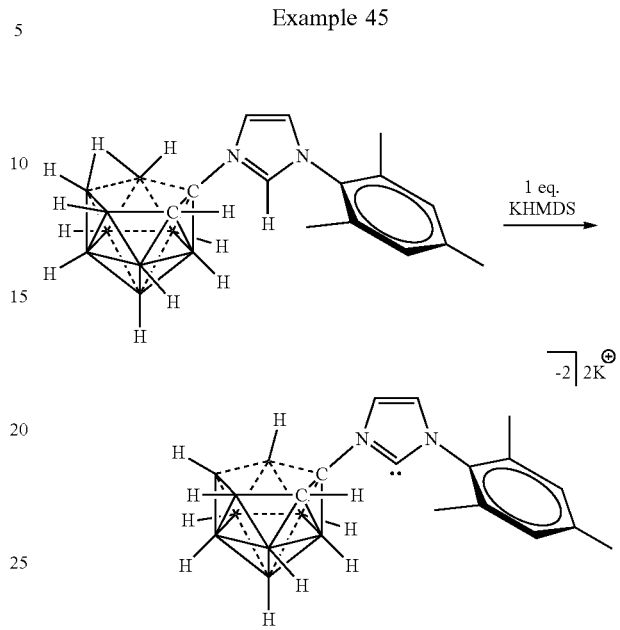

2.1 equivalents of KHMDS was added to a THF solution of the unsymmetrical imidazolium (0.50 g, 1.56 mmol), stirred for 25 minutes and pumped to dryness. The resulting residue was then washed with diethyl ether twice (2×4 mL) affording the desired carbollide NHC in quantitative yield. $^1$HNMR (300 MHz, THF-d8, 25° C.): 7.00 (d, 1H, CH), 6.87 (s, 2H, meta-CH), 6.41 (d, 1H, CH), 2.26 (s, 6H, CH$_3$), 1.91 (s, 3H, CH$_3$), 1.43 (bs, 1H, CH$_{carborane}$).

Although the foregoing invention has been described in some detail by way of illustration and example for purposes of clarity of understanding, one of skill in the art will appreciate that certain changes and modifications may be practiced within the scope of the appended claims. In addition, each reference provided herein is incorporated by reference in its entirety to the same extent as if each reference was individually incorporated by reference.

What is claimed is:

1. An electrolyte for an electrochemical device comprising: a metal salt selected from formulas (IX), (X), and (XIII):

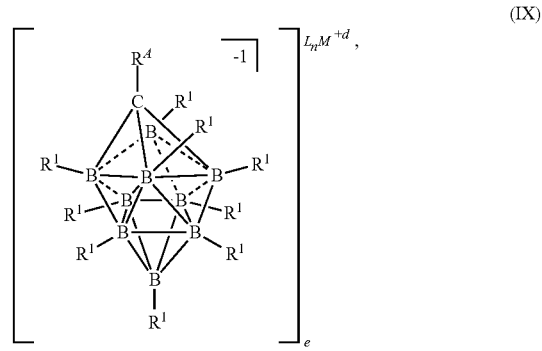

(IX)

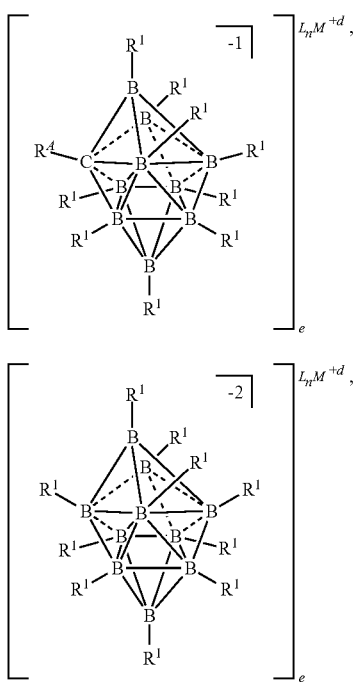

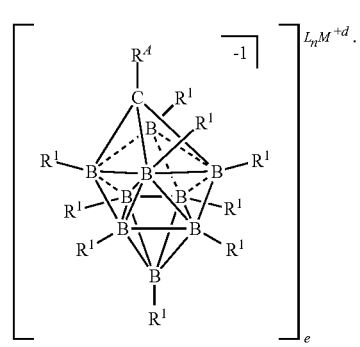

wherein
M is a metal selected from the group consisting of Mg, Ca, Al, Na, and Li;
d and e are integers from 0 to 3
each L is an ethereal solvent or other L-type ligands n is an integer from 0 to 6;
$R^A$ is selected from the group consisting of H, $C_{1-30}$alkyl, aryl, $OR^a$, $SR^a$, $NR^a{}_2$, F, Cl, Br, I, $C_{1-30}$haloalkyl, and perfluoroaryl;
each $R^1$ is independently selected from the group consisting of H, $C_{1-30}$alkyl, aryl, $OR^a$, $SR^a$, $NR^a{}_2$, F, Cl, Br, I, $C_{1-30}$haloalkyl, and perfluoroaryl; and
each $R^a$ is independently selected from the group consisting of H, $C_{1-30}$alkyl, aryl, and silyl.

2. The electrolyte of claim 1, wherein M is selected from the group consisting of Ca, Al, Li, and Na.

3. The electrolyte of claim 2, wherein M is Ca, d is 2, and e is 2.

4. The electrolyte of claim 2, wherein M is Al, d is 3, and e is 3.

5. The electrolyte of claim 2, wherein M is Na, d is 1, and e is 1.

6. The electrolyte of claim 2, wherein M is Li, d is 1, and e is 1.

7. The electrolyte of claim 1, wherein L is absent.

8. The electrolyte of claim 1, wherein the electrolyte is an ionic liquid.

9. The electrolyte of claim 8, characterized by a melting point of from −80° C. to 250° C.

10. The electrolyte of claim 1, characterized by an electrochemical stability from 1-7 V vs. $Li^{0/+1}$.

11. The electrolyte of claim 1 wherein the electrolyte is dissolved in one or more polymers.

12. The electrolyte of claim 1, wherein the electrolyte is covalently attached to a polymer.

13. The electrolyte of claim 1, having the formula (IX):

(IX)

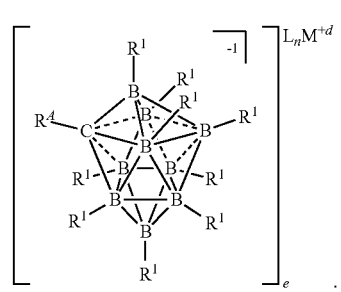

14. The electrolyte of claim 1, having the formula (X):

(X)

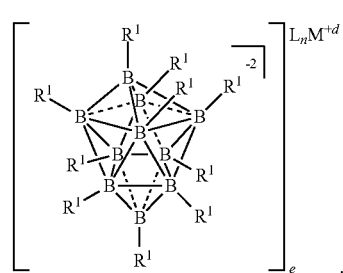

15. The electrolyte of claim 1, having the formula (XIII):

(XIII)

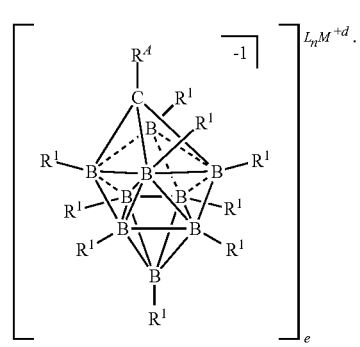

* * * * *